(12) United States Patent
Lim et al.

(10) Patent No.: US 11,503,286 B2
(45) Date of Patent: Nov. 15, 2022

(54) METHOD AND DEVICE FOR FILTERING

(71) Applicants: ELECTRONICS AND TELECOMMUNICATIONS RESEARCH INSTITUTE, Daejeon (KR); INDUSTRY-ACADEMIA COOPERATION GROUP OF SEJONG UNIVERSITY, Seoul (KR)

(72) Inventors: Sung-Chang Lim, Daejeon (KR); Jung-Won Kang, Daejeon (KR); Hyunsuk Ko, Daejeon (KR); Jin-Ho Lee, Daejeon (KR); Ha-Hyun Lee, Seoul (KR); Dong-San Jun, Daejeon (KR); Seung-Hyun Cho, Daejeon (KR); Hui-Yong Kim, Daejeon (KR); Yung-Lyul Lee, Seoul (KR); Jun-Woo Choi, Seoul (KR); Jin-Soo Choi, Daejeon (KR); Nam-Uk Kim, Seoul (KR); Myung-Jun Kim, Seoul (KR)

(73) Assignees: Electronics and Telecommunications Research Institute, Daejeon (KR); INDUSTRY-ACADEMIA COOPERATION GROUP OF SEJONG UNIVERSITY, Seoul (KR)

(*) Notice: Subject to any disclaimer, the term of this patent is extended or adjusted under 35 U.S.C. 154(b) by 0 days.

(21) Appl. No.: 16/461,943

(22) PCT Filed: Nov. 28, 2017

(86) PCT No.: PCT/KR2017/013728
§ 371 (c)(1),
(2) Date: May 17, 2019

(87) PCT Pub. No.: WO2018/097700
PCT Pub. Date: May 31, 2018

(65) Prior Publication Data
US 2019/0268594 A1 Aug. 29, 2019

(30) Foreign Application Priority Data

Nov. 28, 2016 (KR) .................. 10-2016-01559715
Feb. 17, 2017 (KR) .................. 10-2017-0021796
(Continued)

(51) Int. Cl.
*H04N 19/00* (2014.01)
*H04N 19/117* (2014.01)
(Continued)

(52) U.S. Cl.
CPC ......... *H04N 19/117* (2014.11); *H04N 19/122* (2014.11); *H04N 19/132* (2014.11);
(Continued)

(58) Field of Classification Search
CPC ........... H04N 7/00; H04N 11/00; H04N 19/00
See application file for complete search history.

(56) References Cited

U.S. PATENT DOCUMENTS 8,811,484 B2    8/2014   Motta et al.
9,179,146 B2    11/2015  Song et al.
(Continued)

FOREIGN PATENT DOCUMENTS

CN    102084655 A    6/2011
CN    103404151 A    11/2013
(Continued)

OTHER PUBLICATIONS

International Search Report dated Apr. 16, 2018 in International Patent Application No. PCT/KR2017/013728 (5 pages in English, 17 pages in Korean).

*Primary Examiner* — Maryam A Nasri
(74) *Attorney, Agent, or Firm* — NSIP Law

(57) ABSTRACT

Disclosed herein are a video decoding method and apparatus and a video encoding method and apparatus, and more
(Continued)

particularly, a method and apparatus for performing filtering in video encoding and decoding. An encoding apparatus may perform filtering on a target, and may generate filtering information indicating whether filtering has been performed on the target. Further, the encoding apparatus may generate a bitstream including filtering information. A decoding apparatus may determine, based on filtering information, whether to perform filtering on a target, and may perform filtering on the target. The decoding apparatus may receive filtering information from the encoding apparatus through a bitstream or may derive filtering information using additional information.

20 Claims, 20 Drawing Sheets

(30) Foreign Application Priority Data

Jun. 13, 2017 (KR) .................. 10-2017-0073948
Nov. 28, 2017 (KR) .................. 10-2017-0160978

(51) Int. Cl.
*H04N 19/132* (2014.01)
*H04N 19/44* (2014.01)
*H04N 19/80* (2014.01)
*H04N 19/70* (2014.01)
*H04N 19/513* (2014.01)
*H04N 19/19* (2014.01)
*H04N 19/122* (2014.01)
*H04N 19/176* (2014.01)

(52) U.S. Cl.
CPC .......... *H04N 19/176* (2014.11); *H04N 19/19* (2014.11); *H04N 19/44* (2014.11); *H04N 19/513* (2014.11); *H04N 19/70* (2014.11); *H04N 19/80* (2014.11)

(56) References Cited

U.S. PATENT DOCUMENTS

| | | | |
|---|---|---|---|
| 9,407,928 B2 | 8/2016 | Alshina et al. | |
| 9,998,759 B2 | 6/2018 | Jeon et al. | |
| 10,205,964 B2 | 2/2019 | Lee et al. | |
| 10,819,978 B2* | 10/2020 | Tamse ................. | H04N 19/117 |
| 10,931,946 B2 | 2/2021 | Minezawa et al. | |
| 2010/0002770 A1* | 1/2010 | Motta ................. | H04N 19/117 375/240.16 |
| 2013/0039421 A1* | 2/2013 | Lee ..................... | H04N 19/593 375/240.13 |
| 2016/0021382 A1 | 1/2016 | Lee et al. | |
| 2016/0165260 A1* | 6/2016 | Lee ..................... | H04N 19/176 375/240.12 |
| 2016/0191943 A1* | 6/2016 | Oh ...................... | H04N 19/176 375/240.16 |
| 2017/0302950 A1* | 10/2017 | Xu ...................... | H04N 19/463 |
| 2018/0192076 A1* | 7/2018 | Ikai .................... | H04N 19/44 |
| 2019/0037238 A1 | 1/2019 | Lee et al. | |
| 2020/0029071 A1* | 1/2020 | Kang ................... | H04N 19/186 |
| 2020/0128273 A1 | 4/2020 | Lee et al. | |
| 2021/0227256 A1 | 7/2021 | Lee et al. | |

FOREIGN PATENT DOCUMENTS

| | | |
|---|---|---|
| CN | 104994395 A | 10/2015 |
| CN | 105915926 A | 8/2016 |
| EP | 3 276 961 A1 | 1/2018 |
| KR | 10-2011-0026020 A | 3/2011 |
| KR | 10-2011-0112188 A | 10/2011 |
| KR | 10-2012-0140222 A | 12/2012 |
| KR | 10-2013-0002294 A | 1/2013 |
| KR | 10-2014-0146560 A | 12/2014 |
| KR | 10-1468078 B1 | 12/2014 |
| KR | 10-1530758 B1 | 7/2015 |
| KR | 10-1663764 B1 | 10/2016 |
| KR | 10-1666862 B1 | 10/2016 |

\* cited by examiner

METHOD AND DEVICE FOR FILTERING

CROSS REFERENCE TO RELATED APPLICATIONS

This application is a U.S. National Stage Application of International Application No. PCT/KR2017/013728, filed on Nov. 28, 2017, which claims the benefit under 35 USC 119(a) and 365(b) of Korean Patent Application No. 10-2017-0160978, filed on Nov. 28, 2017, Korean Patent Application No. 10-2017-0073948, filed on Jun. 13, 2017, Korean Patent Application No. 10-2017-0021796, filed on Feb. 17, 2017, Korean Patent Application No. 10-2016-0159716, filed Nov. 28, 2016, in the Korean Intellectual Property Office, the entire disclosure of which is incorporated herein by reference for all purposes.

TECHNICAL FIELD

The following embodiments relate generally to a video decoding method and apparatus and a video encoding method and apparatus, and more particularly, to a method and apparatus for performing filtering in video encoding and decoding.

BACKGROUND ART

With the continuous development of the information and communication industries, broadcasting services supporting High-Definition (HD) resolution have been popularized all over the world. Through this popularization, a large number of users have become accustomed to high-resolution and high-definition images and/or videos.

To satisfy users' demand for high definition, many institutions have accelerated the development of next-generation imaging devices. Users' interest in UHD TVs, having resolution that is more than four times as high as that of Full HD (FHD) TVs, as well as High-Definition TVs (HDTV) and FHD TVs, has increased. As interest therein has increased, image encoding/decoding technology for images having higher resolution and higher definition is continually required.

An image encoding/decoding apparatus and method may use inter-prediction technology, intra-prediction technology, entropy-coding technology, etc. so as to perform encoding/decoding on a high-resolution and high-definition image. Inter-prediction technology may be technology for predicting the value of a pixel included in a current picture using temporally previous pictures and/or temporally subsequent pictures. Intra-prediction technology may be technology for predicting the value of a pixel included in a current picture using information about pixels in the current picture. Entropy-coding technology may be technology for assigning short code words to frequently occurring symbols and assigning long code words to rarely occurring symbols.

In order to improve the efficiency and accuracy of intra prediction and/or inter prediction, various types of filtering technologies have been developed. Such filtering technologies may be technologies for applying a filter to the target to be filtered, and then adjusting the value of the target.

DISCLOSURE

Technical Problem

An embodiment is intended to provide an encoding apparatus and method and a decoding apparatus and method, which perform filtering on a reference sample.

An embodiment is intended to provide an encoding apparatus and method and a decoding apparatus and method, which use an interpolation filter.

Technical Solution

In accordance with an aspect, there is provided an encoding apparatus, including a processing unit for performing filtering on a target, generating filtering information that indicates whether filtering has been performed on the target, and generating a bitstream including the filtering information; and a communication unit for transmitting the bitstream to a decoding apparatus.

In accordance with another aspect, there is provided a decoding apparatus, including a communication unit for receiving a bitstream; and a processing unit for acquiring filtering information from the bitstream, determining, based on the filtering information, whether to perform filtering on a target, and then performing filtering on the target.

In accordance with a further aspect, there is provided a decoding method, including determining whether to perform filtering on a target; and performing filtering on the target if it is determined that filtering is to be performed on the target.

The decoding method may further include receiving a bitstream; and acquiring filtering information from the bitstream, Whether to perform filtering on the target may be determined based on the filtering information.

The decoding method may further include deriving filtering information.

Whether to perform filtering on the target may be determined based on the filtering information.

A filter for performing filtering may be a strong filter or a weak filter.

The strong filter may include a linear interpolation filter.

The target may be a reference sample of a reconstructed neighboring block adjacent to a target block.

The reference sample may include multiple reference samples.

The filtering may be selectively performed on a sample that satisfies a predefined condition, among the multiple reference samples.

When a linear relationship is present among the multiple reference samples, a strong filter may be used for the filtering.

When a linear relationship is not present among the multiple reference samples, a weak filter may be used for the filtering.

Whether to perform filtering may be determined based on one or more of a size of a target block, a prediction mode of the target block, and a type of the target block.

A target block may be a coding unit.

The filtering may be determined for each coding unit.

Whether to perform the filtering on a reference sample of the coding unit may be determined based on information about neighboring blocks adjacent to the coding unit.

A filter for performing the filtering may be determined based on a coding parameter related to intra prediction.

A filter for performing the filtering may be determined based on a prediction mode of intra prediction.

A filter for performing the filtering may be an interpolation filter.

The interpolation filter may be used for integer pixels, and thus sub-pixels may be generated.

The interpolation filter may be used for interpolation of a sub-pixel reference sample.

The interpolation filter may be used for motion compensation.

The interpolation filter may include multiple interpolation filters.

One or more of the multiple interpolation filters may be selected based on an attribute of a block or a coding parameter related to the block.

The interpolation filter may be selected based on a correlation between a target block and a reference block of the target block.

Advantageous Effects

There are provided an encoding apparatus and method and a decoding apparatus and method, which perform filtering on a reference sample.

There are provided an encoding apparatus and method and a decoding apparatus and method, which use an interpolation filter.

BEST MODE

Figure 1:
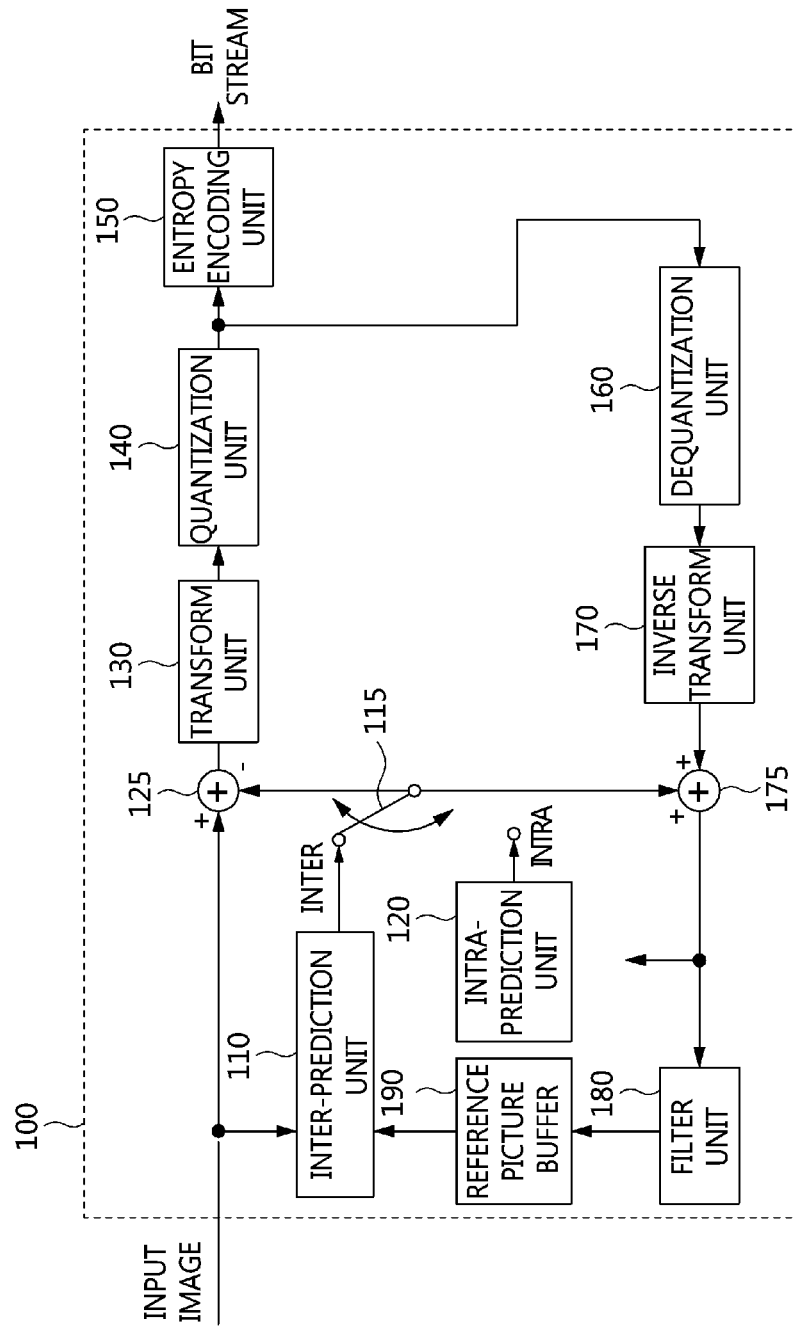
FIG. 1 is a block diagram illustrating the configuration of an embodiment of an encoding apparatus to which the present disclosure is applied.

The present invention may be variously changed, and may have various embodiments, and specific embodiments will be described in detail below with reference to the attached drawings. However, it should be understood that those embodiments are not intended to limit the present invention to specific disclosure forms, and that they include all changes, equivalents or modifications included in the spirit and scope of the present invention.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but do not need to be mutually exclusive of each other. For example, specific shapes, structures, and characteristics described here may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

Terms such as "first" and "second" may be used to describe various components, but the components are not restricted by the terms. The terms are used only to distinguish one component from another component. For example, a first component may be named a second component without departing from the scope of the present specification. Likewise, a second component may be named a first component. The terms "and/or" may include combinations of a plurality of related described items or any of a plurality of related described items.

It will be understood that when a component is referred to as being "connected" or "coupled" to another component, the two components may be directly connected or coupled to each other, or intervening components may be present between the two components. It will be understood that when a component is referred to as being "directly connected or coupled", no intervening components are present between the two components.

Also, components described in the embodiments are independently shown in order to indicate different characteristic functions, but this does not mean that each of the components is formed of a separate piece of hardware or software. That is, the components are arranged and included separately for convenience of description. For example, at least two of the components may be integrated into a single component. Conversely, one component may be divided into multiple components. An embodiment into which the components are integrated or an embodiment in which some components are separated is included in the scope of the present specification as long as it does not depart from the essence of the present specification.

Further, it should be noted that, in the exemplary embodiments, an expression describing that a component "comprises" a specific component means that additional components may be included within the scope of the practice or the technical spirit of exemplary embodiments, but does not preclude the presence of components other than the specific component.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Embodiments will be described in detail below with reference to the accompanying drawings so that those having ordinary knowledge in the technical field to which the embodiments pertain can easily practice the embodiments. In the following description of the embodiments, detailed descriptions of known functions or configurations which are deemed to make the gist of the present specification obscure will be omitted. Further, the same reference numerals are used to designate the same components throughout the drawings, and repeated descriptions of the same components will be omitted.

Hereinafter, "image" may mean a single picture constituting a video, or may mean the video itself. For example, "encoding and/or decoding of an image" may mean "encoding and/or decoding of a video", and may also mean "encoding and/or decoding of any one of images constituting the video".

Hereinafter, the terms "video" and "motion picture" may be used to have the same meaning, and may be used interchangeably with each other.

Hereinafter, a target image may be an encoding target image, which is the target to be encoded, and/or a decoding target image, which is the target to be decoded. Further, the target image may be an input image that is input to an encoding apparatus or an input image that is input to a decoding apparatus.

Hereinafter, the terms "image", "picture", "frame", and "screen" may be used to have the same meaning and may be used interchangeably with each other.

Hereinafter, a target block may be an encoding target block, i.e. the target to be encoded and/or a decoding target block, i.e. the target to be decoded. Further, the target block may be a current block, i.e. the target to be currently encoded and/or decoded. Here, the terms "target block" and "current block" may be used to have the same meaning, and may be used interchangeably with each other.

Hereinafter, the terms "block" and "unit" may be used to have the same meaning, and may be used interchangeably with each other. Alternatively, "block" may denote a specific unit.

Hereinafter, the terms "region" and "segment" may be used interchangeably with each other.

Hereinafter, a specific signal may be a signal indicating a specific block. For example, the original signal may be a signal indicating a target block. A prediction signal may be a signal indicating a prediction block. A residual signal may be a signal indicating a residual block.

In the following embodiments, specific information, data, a flag, an element, and an attribute may have their respective values. A value of "0" corresponding to each of the information, data, flag, element, and attribute may indicate a logical false or a first predefined value. In other words, the value of "0", false, logical false, and a first predefined value may be used interchangeably with each other. A value of "1" corresponding to each of the information, data, flag, element, and attribute may indicate a logical true or a second predefined value. In other words, the value of "1", true, logical true, and a second predefined value may be used interchangeably with each other.

When a variable such as i or j is used to indicate a row, a column, or an index, the value of i may be an integer of 0 or more or an integer of 1 or more. In other words, in the embodiments, each of a row, a column, and an index may be counted from 0 or may be counted from 1.

Below, the terms to be used in embodiments will be described.

Encoder: An encoder denotes a device for performing encoding.

Decoder: A decoder denotes a device for performing decoding.

Unit: A unit may denote the unit of image encoding and decoding. The terms "unit" and "block" may be used to have the same meaning, and may be used interchangeably with each other.

"Unit" may be an M×N array of samples. M and N may be positive integers, respectively. The term "unit" may generally mean a two-dimensional (2D) array of samples.

In the encoding and decoding of an image, "unit" may be an area generated by the partitioning of one image. A single image may be partitioned into multiple units. Alternatively, one image may be partitioned into sub-parts, and the unit may denote each partitioned sub-part when encoding or decoding is performed on the partitioned sub-part.

In the encoding and decoding of an image, predefined processing may be performed on each unit depending on the type of the unit.

Depending on functions, the unit types may be classified into a macro unit, a Coding Unit (CU), a Prediction Unit (PU), a residual unit, a Transform Unit (TU), etc. Alternatively, depending on functions, the unit may denote a block, a macroblock, a coding tree unit, a coding tree block, a coding unit, a coding block, a prediction unit, a prediction block, a residual unit, a residual block, a transform unit, a transform block, etc.

The term "unit" may mean information including a luminance (luma) component block, a chrominance (chroma) component block corresponding thereto, and syntax elements for respective blocks so that the unit is designated to be distinguished from a block.

The size and shape of a unit may be variously implemented. Further, a unit may have any of various sizes and shapes. In particular, the shapes of the unit may include not only a square, but also a geometric figure that can be represented in two dimensions (2D), such as a rectangle, a trapezoid, a triangle, and a pentagon.

Further, unit information may include one or more of the type of unit, which indicates a coding unit, a prediction unit, a residual unit or a transform unit, the size of a unit, the depth of a unit, the order of encoding and decoding of a unit, etc.

One unit may be partitioned into sub-units, each having a smaller size than that of the relevant unit.

Unit depth: A unit depth may denote the degree to which the unit is partitioned. Further, the unit depth may indicate the level at which the corresponding unit is present when units are represented in a tree structure.

Unit partition information may include a unit depth indicating the depth of a unit. A unit depth may indicate the number of times the unit is partitioned and/or the degree to which the unit is partitioned.

In a tree structure, it may be considered that the depth of a root node is the smallest, and the depth of a leaf node is the largest.

A single unit may be hierarchically partitioned into multiple sub-units while having depth information based on a tree structure. In other words, the unit and sub-units, generated by partitioning the unit, may correspond to a node and child nodes of the node, respectively. Each of the partitioned sub-units may have a unit depth. Since the unit depth indicates the number of times the unit is partitioned and/or the degree to which the unit is partitioned, the partition information of the sub-units may include information about the sizes of the sub-units.

In a tree structure, the top node may correspond to the initial node before partitioning. The top node may be referred to as a "root node". Further, the root node may have a minimum depth value. Here, the top node may have a depth of level '0'.

A node having a depth of level '1' may denote a unit generated when the initial unit is partitioned once. A node having a depth of level '2' may denote a unit generated when the initial unit is partitioned twice.

A leaf node having a depth of level 'n' may denote a unit generated when the initial unit has been partitioned n times.

The leaf node may be a bottom node, which cannot be partitioned any further. The depth of the leaf node may be the maximum level. For example, a predefined value for the maximum level may be 3.

Sample: A sample may be a base unit constituting a block. A sample may be represented by values from 0 to $2^{Bd}-1$ depending on the bit depth (Bd).

A sample may be a pixel or a pixel value.

Hereinafter, the terms "pixel" and "sample" may be used to have the same meaning, and may be used interchangeably with each other.

A Coding Tree Unit (CTU): A CTU may be composed of a single luma component (Y) coding tree block and two chroma component (Cb, Cr) coding tree blocks related to the luma component coding tree block. Further, a CTU may mean information including the above blocks and a syntax element for each of the blocks.

Each coding tree unit (CTU) may be partitioned using one or more partitioning methods, such as a quad tree and a binary tree, so as to configure sub-units, such as a coding unit, a prediction unit, and a transform unit.

"CTU" may be used as a term designating a pixel block, which is a processing unit in an image-decoding and encoding process, as in the case of partitioning of an input image.

Coding Tree Block (CTB): "CTB" may be used as a term designating any one of a Y coding tree block, a Cb coding tree block, and a Cr coding tree block.

Neighbor block: A neighbor block (or neighboring block) means a block adjacent to a target block. The block adjacent to the target block may mean a block, the boundary of which is in contact with the target block, or a block located within a predetermined distance from the target block. The neighbor block may mean a block adjacent to the vertex of the target block. Here, the block adjacent to the vertex of the target block may mean a block vertically adjacent to a neighbor block which is horizontally adjacent to the target block or a block horizontally adjacent to a neighbor block which is vertically adjacent to the target block. A neighbor block may be a reconstructed neighbor block.

Prediction unit: A prediction unit may be a base unit for prediction, such as inter prediction, intra prediction, inter compensation, intra compensation, and motion compensation.

A single prediction unit may be divided into multiple partitions having smaller sizes or sub-prediction units. The multiple partitions may also be base units in the performance of prediction or compensation. The partitions generated by dividing the prediction unit may also be prediction units.

Prediction unit partition: A prediction unit partition may be the shape into which a prediction unit is divided.

Reconstructed neighboring unit: A reconstructed neighboring unit may be a unit which has already been decoded and reconstructed around a target unit.

A reconstructed neighboring unit may be a unit that is spatially adjacent to the target unit or that is temporally adjacent to the target unit.

A reconstructed spatially neighboring unit may be a unit which is included in a current picture and which has already been reconstructed through encoding and/or decoding.

A reconstructed temporally neighboring unit may be a unit which is included in a reference image and which has already been reconstructed through encoding and/or decoding. The location of the reconstructed temporally neighboring unit in the reference image may be identical to that of the target unit in the current picture, or may correspond to the location of the target unit in the current picture.

Parameter set: A parameter set may be header information in the structure of a bitstream. For example, a parameter set may include a sequence parameter set, a picture parameter set, an adaptation parameter set, etc.

Rate-distortion optimization: An encoding apparatus may use rate-distortion optimization so as to provide high coding efficiency by utilizing combinations of the size of a coding unit (CU), a prediction mode, the size of a prediction unit (PU), motion information, and the size of a transform unit (TU).

A rate-distortion optimization scheme may calculate rate-distortion costs of respective combinations so as to select an optimal combination from among the combinations. The rate-distortion costs may be calculated using the following Equation 1. Generally, a combination enabling the rate-distortion cost to be minimized may be selected as the optimal combination in the rate-distortion optimization scheme.

$$D+\lambda *R \qquad \text{[Equation 1]}$$

D may denote distortion. D may be the mean of squares of differences (i.e. mean square error) between original transform coefficients and reconstructed transform coefficients in a transform unit.

R may denote the rate, which may denote a bit rate using related-context information.

λ denotes a Lagrangian multiplier. R may include not only coding parameter information, such as a prediction mode, motion information, and a coded block flag, but also bits generated due to the encoding of transform coefficients.

An encoding apparatus may perform procedures, such as inter prediction and/or intra prediction, transform, quantization, entropy encoding, inverse quantization (dequantization), and inverse transform so as to calculate precise D and R. These procedures may greatly increase the complexity of the encoding apparatus.

Bitstream: A bitstream may denote a stream of bits including encoded image information.

Parameter set: A parameter set may be header information in the structure of a bitstream.

The parameter set may include at least one of a video parameter set, a sequence parameter set, a picture parameter set, and an adaptation parameter set. Further, the parameter set may include information about a slice header and information about a tile header.

Parsing: Parsing may be the decision on the value of a syntax element, made by performing entropy decoding on a bitstream. Alternatively, the term "parsing" may mean such entropy decoding itself.

Symbol: A symbol may be at least one of the syntax element, the coding parameter, and the transform coefficient of an encoding target unit and/or a decoding target unit. Further, a symbol may be the target of entropy encoding or the result of entropy decoding.

Reference picture: A reference picture may be an image referred to by a unit so as to perform inter prediction or motion compensation. Alternatively, a reference picture may be an image including a reference unit referred to by a target unit so as to perform inter prediction or motion compensation.

Hereinafter, the terms "reference picture" and "reference image" may be used to have the same meaning, and may be used interchangeably with each other.

Reference picture list: A reference picture list may be a list including one or more reference images used for inter prediction or motion compensation.

The types of a reference picture list may include List Combined (LC), List 0 (L0), List 1 (L1), List 2 (L2), List 3 (L3), etc.

For inter prediction, one or more reference picture lists may be used.

Inter-prediction indicator: An inter-prediction indicator may indicate the inter-prediction direction of a target unit. Inter prediction may be one of unidirectional prediction and bidirectional prediction. Alternatively, the inter-prediction indicator may denote the number of reference images used to generate a prediction unit of a target unit. Alternatively, the inter-prediction indicator may denote the number of prediction blocks used for inter prediction or motion compensation of a target unit.

Reference picture index: A reference picture index may be an index indicating a specific reference image in a reference picture list.

Motion vector (MV): A motion vector may be a 2D vector used for inter prediction or motion compensation. A motion vector may mean an offset between an encoding target image/decoding target image and a reference image.

For example, a MV may be represented in a form such as $(mv_x, mv_y)$. $mv_x$ may indicate a horizontal component, and $mv_y$ may indicate a vertical component.

Search range: A search range may be a 2D area in which a search for a MV is performed during inter prediction. For example, the size of the search range may be M×N. M and N may be respective positive integers.

Motion vector candidate: A motion vector candidate may be a block that is a prediction candidate or the motion vector of the block that is a prediction candidate when a motion vector is predicted.

A motion vector candidate may be included in a motion vector candidate list.

Motion vector candidate list: A motion vector candidate list may be a list configured using one or more motion vector candidates.

Motion vector candidate index: A motion vector candidate index may be an indicator for indicating a motion vector candidate in the motion vector candidate list. Alternatively, a motion vector candidate index may be the index of a motion vector predictor.

Motion information: Motion information may be information including at least one of a reference picture list, a reference image, a motion vector candidate, a motion vector candidate index, a merge candidate, and a merge index, as well as a motion vector, a reference picture index, and an inter-prediction indicator.

Merge candidate list: A merge candidate list may be a list configured using merge candidates.

Merge candidate: A merge candidate may be a spatial merge candidate, a temporal merge candidate, a combined merge candidate, a combined bi-prediction merge candidate, a zero-merge candidate, etc. A merge candidate may include motion information such as an inter-prediction indicator, a reference picture index for each list, and a motion vector.

Merge index: A merge index may be an indicator for indicating a merge candidate in a merge candidate list.

A merge index may indicate a reconstructed unit used to derive a merge candidate between a reconstructed unit spatially adjacent to a target unit and a reconstructed unit temporally adjacent to the target unit.

A merge index may indicate at least one of pieces of motion information of a merge candidate.

Transform unit: A transform unit may be the base unit of residual signal encoding and/or residual signal decoding, such as transform, inverse transform, quantization, dequantization, transform coefficient encoding, and transform coefficient decoding. A single transform unit may be partitioned into multiple transform units having smaller sizes.

Scaling: Scaling may denote a procedure for multiplying a factor by a transform coefficient level.

As a result of scaling of the transform coefficient level, a transform coefficient may be generated. Scaling may also be referred to as "dequantization".

Quantization Parameter (QP): A quantization parameter may be a value used to generate a transform coefficient level for a transform coefficient in quantization. Alternatively, a quantization parameter may also be a value used to generate a transform coefficient by scaling the transform coefficient level in dequantization. Alternatively, a quantization parameter may be a value mapped to a quantization step size.

Delta quantization parameter: A delta quantization parameter is a differential value between a predicted quantization parameter and the quantization parameter of an encoding/decoding target unit.

Scan: Scan may denote a method for aligning the order of coefficients in a unit, a block or a matrix. For example, a method for aligning a 2D array in the form of a one-dimensional (1D) array may be referred to as a "scan". Alternatively, a method for aligning a 1D array in the form of a 2D array may also be referred to as a "scan" or an "inverse scan".

Transform coefficient: A transform coefficient may be a coefficient value generated as an encoding apparatus performs a transform. Alternatively, the transform coefficient may be a coefficient value generated as a decoding apparatus performs at least one of entropy decoding and dequantization.

A quantized level or a quantized transform coefficient level in which quantization is applied to a transform coefficient or a residual signal may also be included in the meaning of the term "transform coefficient".

Quantized level: A quantized level may be a value generated as the encoding apparatus performs quantization on a transform coefficient or a residual signal. Alternatively, the quantized level may be a value that is the target of dequantization as the decoding apparatus performs dequantization.

A quantized transform coefficient level, which is the result of transform and quantization, may also be included in the meaning of a quantized level.

Non-zero transform coefficient: A non-zero transform coefficient may be a transform coefficient having a value other than 0 or a transform coefficient level having a value other than 0. Alternatively, a non-zero transform coefficient may be a transform coefficient, the magnitude of the value of which is not 0, or a transform coefficient level, the magnitude of the value of which is not 0.

Quantization matrix: A quantization matrix may be a matrix used in a quantization or dequantization procedure so as to improve the subjective image quality or objective image quality of an image. A quantization matrix may also be referred to as a "scaling list".

Quantization matrix coefficient: A quantization matrix coefficient may be each element in a quantization matrix. A quantization matrix coefficient may also be referred to as a "matrix coefficient".

Default matrix: A default matrix may be a quantization matrix predefined by the encoding apparatus and the decoding apparatus.

Non-default matrix: A non-default matrix may be a quantization matrix that is not predefined by the encoding apparatus and the decoding apparatus. The non-default matrix may be signaled by the encoding apparatus to the decoding apparatus.

FIG. 1 is a block diagram illustrating the configuration of an embodiment of an encoding apparatus to which the present disclosure is applied.

An encoding apparatus 100 may be an encoder, a video encoding apparatus or an image encoding apparatus. A video may include one or more images (pictures). The encoding apparatus 100 may sequentially encode one or more images of the video.

Referring to FIG. 1, the encoding apparatus 100 includes an inter-prediction unit 110, an intra-prediction unit 120, a switch 115, a subtractor 125, a transform unit 130, a quantization unit 140, an entropy encoding unit 150, a dequantization (inverse quantization) unit 160, an inverse transform unit 170, an adder 175, a filter unit 180, and a reference picture buffer 190.

The encoding apparatus 100 may perform encoding on a target image using an intra mode and/or an inter mode.

Further, the encoding apparatus 100 may generate a bitstream, including information about encoding, via encoding on the target image, and may output the generated bitstream. The generated bitstream may be stored in a computer-readable storage medium and may be streamed through a wired/wireless transmission medium.

When the intra mode is used as a prediction mode, the switch 115 may switch to the intra mode. When the inter mode is used as a prediction mode, the switch 115 may switch to the inter mode.

The encoding apparatus 100 may generate a prediction block of a target block. Further, after the prediction block has been generated, the encoding apparatus 100 may encode a residual between the target block and the prediction block.

When the prediction mode is the intra mode, the intra-prediction unit 120 may use pixels of previously encoded/decoded neighboring blocks around the target block as reference samples. The intra-prediction unit 120 may perform spatial prediction on the target block using the reference samples, and may generate prediction samples for the target block via spatial prediction.

The inter-prediction unit 110 may include a motion prediction unit and a motion compensation unit.

When the prediction mode is an inter mode, the motion prediction unit 111 may search a reference image for the area most closely matching the target block in a motion prediction procedure, and may derive a motion vector for the target block and the found area based on the found area.

The reference image may be stored in the reference picture buffer 190. More specifically, the reference image may be stored in the reference picture buffer 190 when the encoding and/or decoding of the reference image have been processed.

The motion compensation unit 112 may generate a prediction block for the target block by performing motion compensation using a motion vector. Here, the motion vector may be a two-dimensional (2D) vector used for inter-prediction. Further, the motion vector may indicate an offset between the target image and the reference image.

The motion prediction unit 111 and the motion compensation unit 112 may generate a prediction block by applying an interpolation filter to a partial area of a reference image when the motion vector has a value other than an integer. In order to perform inter prediction or motion compensation, it may be determined which one of a skip mode, a merge mode, an advanced motion vector prediction (AMVP) mode, and a current picture reference mode corresponds to a method for predicting the motion of a PU included in a CU, based on the CU, and compensating for the motion, and inter prediction or motion compensation may be performed depending on the mode.

The subtractor 125 may generate a residual block, which is the differential between the target block and the prediction block. A residual block may also be referred to as a "residual signal".

The residual signal may be the difference between an original signal and a prediction signal. Alternatively, the residual signal may be a signal generated by transforming or quantizing the difference between an original signal and a prediction signal or by transforming and quantizing the difference. A residual block may be a residual signal for a block unit.

The transform unit 130 may generate a transform coefficient by transforming the residual block, and may output the generated transform coefficient. Here, the transform coefficient may be a coefficient value generated by transforming the residual block.

When a transform skip mode is used, the transform unit 130 may omit transforming the residual block.

By applying quantization to the transform coefficient, a quantized transform coefficient level or a quantized level may be generated. Hereinafter, in the embodiments, each of the quantized transform coefficient level and the quantized level may also be referred to as a 'transform coefficient'.

The quantization unit 140 may generate a quantized transform coefficient level or a quantized level by quantizing the transform coefficient depending on quantization parameters. The quantization unit 140 may output the quantized transform coefficient level or the quantized level that is generated. In this case, the quantization unit 140 may quantize the transform coefficient using a quantization matrix.

The entropy encoding unit 150 may generate a bitstream by performing probability distribution-based entropy encoding based on values, calculated by the quantization unit 140, and/or coding parameter values, calculated in the encoding procedure. The entropy encoding unit 150 may output the generated bitstream.

The entropy encoding unit 150 may perform entropy encoding on information about the pixels of the image and information required to decode the image. For example, the information required to decode the image may include syntax elements or the like.

The coding parameters may be information required for encoding and/or decoding. The coding parameters may include information encoded by the encoding apparatus 100 and transferred from the encoding apparatus 100 to a decoding apparatus, and may also include information that may be derived in the encoding or decoding procedure. For example, information transferred to the decoding apparatus may include syntax elements.

For example, the coding parameters may include values or statistical information, such as a prediction mode, a motion vector, a reference picture index, an encoding block pattern, the presence or absence of a residual signal, a transform coefficient, a quantized transform coefficient, a quantization parameter, a block size, and block partition information. The prediction mode may be an intra-prediction mode or an inter-prediction mode.

The residual signal may denote the difference between the original signal and a prediction signal. Alternatively, the residual signal may be a signal generated by transforming the difference between the original signal and the prediction signal. Alternatively, the residual signal may be a signal generated by transforming and quantizing the difference between the original signal and the prediction signal.

When entropy encoding is applied, fewer bits may be assigned to more frequently occurring symbols, and more bits may be assigned to rarely occurring symbols. As symbols are represented by means of this assignment, the size of a bit string for target symbols to be encoded may be reduced. Therefore, the compression performance of video encoding may be improved through entropy encoding.

Further, for entropy encoding, the entropy encoding unit 150 may use a coding method such as exponential Golomb, Context-Adaptive Variable Length Coding (CAVLC), or Context-Adaptive Binary Arithmetic Coding (CABAC). For example, the entropy encoding unit 150 may perform entropy encoding using a Variable Length Coding/Code (VLC) table. For example, the entropy encoding unit 150 may derive a binarization method for a target symbol. Further, the entropy encoding unit 150 may derive a probability model for a target symbol/bin. The entropy encoding unit 150 may perform arithmetic coding using the derived binarization method, a probability model, and a context model.

The entropy encoding unit 150 may transform the coefficient of the form of a 2D block into the form of a 1D vector through a transform coefficient scanning method so as to encode a transform coefficient level.

The coding parameters may include not only information (or a flag or an index), such as a syntax element, which is encoded by the encoding apparatus and is signaled by the encoding apparatus to the decoding apparatus, but also information derived in an encoding or decoding process. Further, the coding parameters may include information required so as to encode or decode images. For example, the coding parameters may include at least one or combinations of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree structure, the partitioning direction of a binary tree structure (horizontal direction or vertical direction), the partitioning form of a binary tree structure (symmetrical partitioning or asymmetrical partitioning), a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a primary transform is used, information indicating whether an additional (secondary) transform is used, a primary transform index, a secondary transform index, information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal.

Here, signaling a flag or an index may mean that the encoding apparatus 100 includes an entropy-encoded flag or an entropy-encoded index, generated by performing entropy encoding on the flag or index, in a bitstream, and that the decoding apparatus 200 acquires a flag or an index by performing entropy decoding on the entropy-encoded flag or the entropy-encoded index, extracted from the bitstream.

Since the encoding apparatus 100 performs encoding via inter prediction, the encoded target image may be used as a reference image for additional image(s) to be subsequently processed. Therefore, the encoding apparatus 100 may reconstruct or decode the encoded target image and store the reconstructed or decoded image as a reference image in the reference picture buffer 190. For decoding, dequantization and inverse transform on the encoded target image may be processed.

The quantized level may be inversely quantized by the dequantization unit 160, and may be inversely transformed by the inverse transform unit 170. The coefficient that has been inversely quantized and/or inversely transformed may be added to the prediction block by the adder 175. The inversely quantized and/or inversely transformed coefficient and the prediction block are added, and then a reconstructed block may be generated. Here, the inversely quantized and/or inversely transformed coefficient may denote a coefficient on which one or more of dequantization and inverse transform are performed, and may also denote a reconstructed residual block.

The reconstructed block may be subjected to filtering through the filter unit 180. The filter unit 180 may apply one or more of a deblocking filter, a Sample Adaptive Offset (SAO) filter, and an Adaptive Loop Filter (ALF) to the reconstructed block or a reconstructed picture. The filter unit 180 may also be referred to as an "in-loop filter".

The deblocking filter may eliminate block distortion occurring at the boundaries between blocks. In order to determine whether to apply the deblocking filter, the number of columns or rows which are included in a block and which include pixel(s) based on which it is determined whether to apply the deblocking filter to a target block may be decided on. When the deblocking filter is applied to the target block, the applied filter may differ depending on the strength of the required deblocking filtering. In other words, among different filters, a filter decided on in consideration of the strength of deblocking filtering may be applied to the target block.

The SAO may add a suitable offset to the values of pixels to compensate for coding error. The SAO may perform, for the image to which deblocking is applied, correction that uses an offset in the difference between an original image and the image to which deblocking is applied, on a pixel basis. A method for dividing the pixels included in the image into a certain number of regions, determining a region to which an offset is to be applied, among the divided regions, and applying an offset to the determined region may be used, and a method for applying an offset in consideration of edge information of each pixel may also be used.

The ALF may perform filtering based on a value obtained by comparing a reconstructed image with an original image. After pixels included in an image have been divided into a predetermined number of groups, filters to be applied to the groups may be determined, and filtering may be differentially performed for respective groups. Information related to whether to apply an adaptive loop filter may be signaled for each CU. The shapes and filter coefficients of ALFs to be applied to respective blocks may differ for respective blocks.

The reconstructed block or the reconstructed image subjected to filtering through the filter unit 180 may be stored in the reference picture buffer 190. The reconstructed block subjected to filtering through the filter unit 180 may be a part of a reference picture. In other words, the reference picture may be a reconstructed picture composed of reconstructed blocks subjected to filtering through the filter unit 180. The stored reference picture may be subsequently used for inter prediction.

Figure 2:
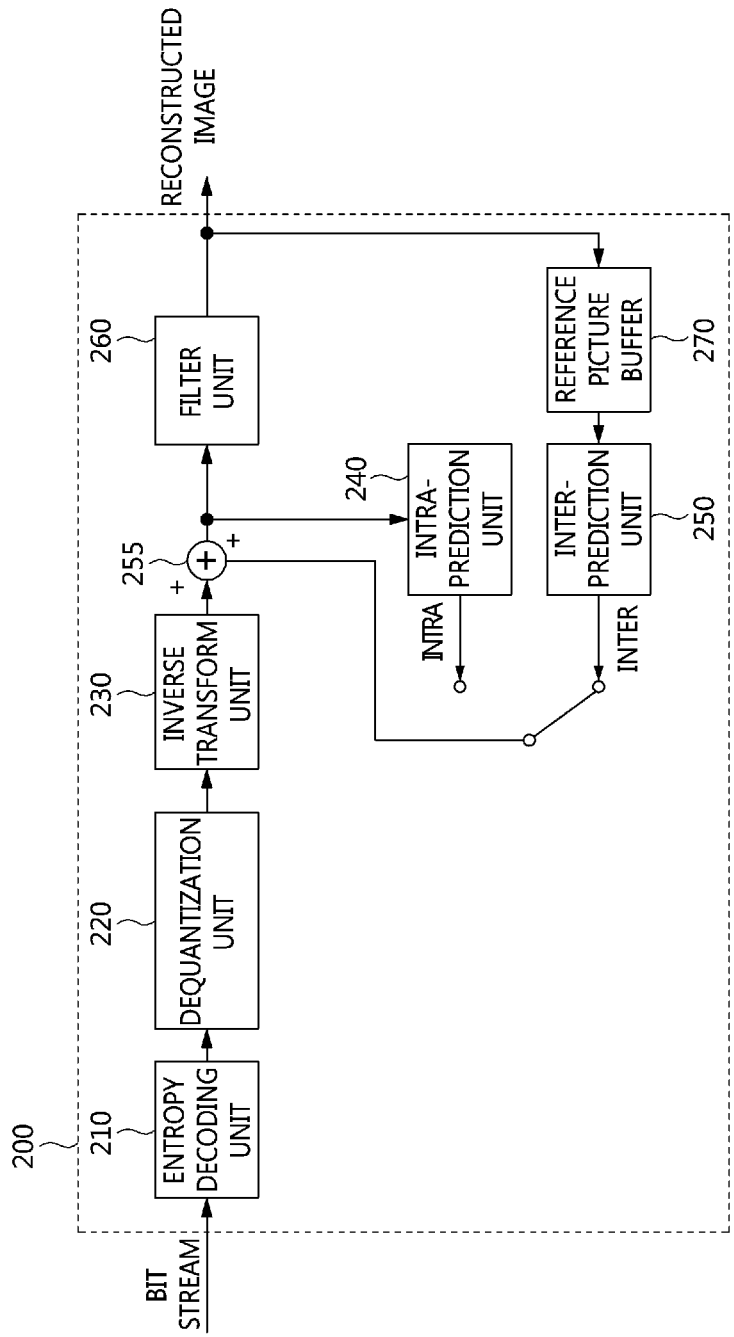
FIG. 2 is a block diagram illustrating the configuration of an embodiment of a decoding apparatus to which the present disclosure is applied.

FIG. 2 is a block diagram illustrating the configuration of an embodiment of a decoding apparatus to which the present disclosure is applied.

A decoding apparatus 200 may be a decoder, a video decoding apparatus or an image decoding apparatus.

Referring to FIG. 2, the decoding apparatus 200 may include an entropy decoding unit 210, a dequantization (inverse quantization) unit 220, an inverse transform unit 230, an intra-prediction unit 240, an inter-prediction unit 250, an adder 255, a filter unit 260, and a reference picture buffer 270.

The decoding apparatus 200 may receive a bitstream output from the encoding apparatus 100. The decoding apparatus 200 may receive a bitstream stored in a computer-readable storage medium, and may receive a bitstream that is streamed through a wired/wireless transmission medium.

The decoding apparatus 200 may perform decoding on the bitstream in an intra mode and/or an inter mode. Further, the decoding apparatus 200 may generate a reconstructed image or a decoded image via decoding, and may output the reconstructed image or decoded image.

For example, switching to an intra mode or an inter mode based on the prediction mode used for decoding may be performed by a switch. When the prediction mode used for decoding is an intra mode, the switch may be operated to switch to the intra mode. When the prediction mode used for decoding is an inter mode, the switch may be operated to switch to the inter mode.

The decoding apparatus 200 may acquire a reconstructed residual block by decoding the input bitstream, and may generate a prediction block. When the reconstructed residual block and the prediction block are acquired, the decoding apparatus 200 may generate a reconstructed block, which is the target to be decoded, by adding the reconstructed residual block to the prediction block.

The entropy decoding unit 210 may generate symbols by performing entropy decoding on the bitstream based on the probability distribution of a bitstream. The generated symbols may include quantized level-format symbols. Here, the entropy decoding method may be similar to the above-described entropy encoding method. That is, the entropy decoding method may be the reverse procedure of the above-described entropy encoding method.

The quantized coefficient may be inversely quantized by the dequantization unit 220. The dequantization unit 220 may generate an inversely quantized coefficient by performing dequantization on the quantized coefficient. Further, the inversely quantized coefficient may be inversely transformed by the inverse transform unit 230. The inverse transform unit 230 may generate a reconstructed residual block by performing an inverse transform on the inversely quantized coefficient. As a result of performing dequantization and the inverse transform on the quantized coefficient, the reconstructed residual block may be generated. Here, the dequantization unit 220 may apply a quantization matrix to the quantized coefficient when generating the reconstructed residual block.

When the intra mode is used, the intra-prediction unit 240 may generate a prediction block by performing spatial prediction that uses the pixel values of previously decoded neighboring blocks around a target block.

The inter-prediction unit 250 may include a motion compensation unit. Alternatively, the inter-prediction unit 250 may be designated as a "motion compensation unit".

When the inter mode is used, the motion compensation unit may generate a prediction block by performing motion compensation that uses a motion vector and a reference image stored in the reference picture buffer 270.

The motion compensation unit may apply an interpolation filter to a partial area of the reference image when the motion vector has a value other than an integer, and may generate a prediction block using the reference image to which the interpolation filter is applied. In order to perform motion compensation, the motion compensation unit may determine which one of a skip mode, a merge mode, an Advanced Motion Vector Prediction (AMVP) mode, and a current picture reference mode corresponds to the motion compensation method used for a PU included in a CU, based on the CU, and may perform motion compensation depending on the determined mode.

The reconstructed residual block and the prediction block may be added to each other by the adder 255. The adder 255 may generate a reconstructed block by adding the reconstructed residual block to the prediction block.

The reconstructed block may be subjected to filtering through the filter unit 260. The filter unit 260 may apply at least one of a deblocking filter, an SAO filter, and an ALF to the reconstructed block or the reconstructed picture.

The reconstructed block subjected to filtering through the filter unit 260 may be stored in the reference picture buffer 270. The reconstructed block subjected to filtering through the filter unit 260 may be a part of a reference picture. In other words, the reference image may be an image composed of reconstructed blocks subjected to filtering through the filter unit 260. The stored reference image may be subsequently used for inter prediction.

Figure 3:
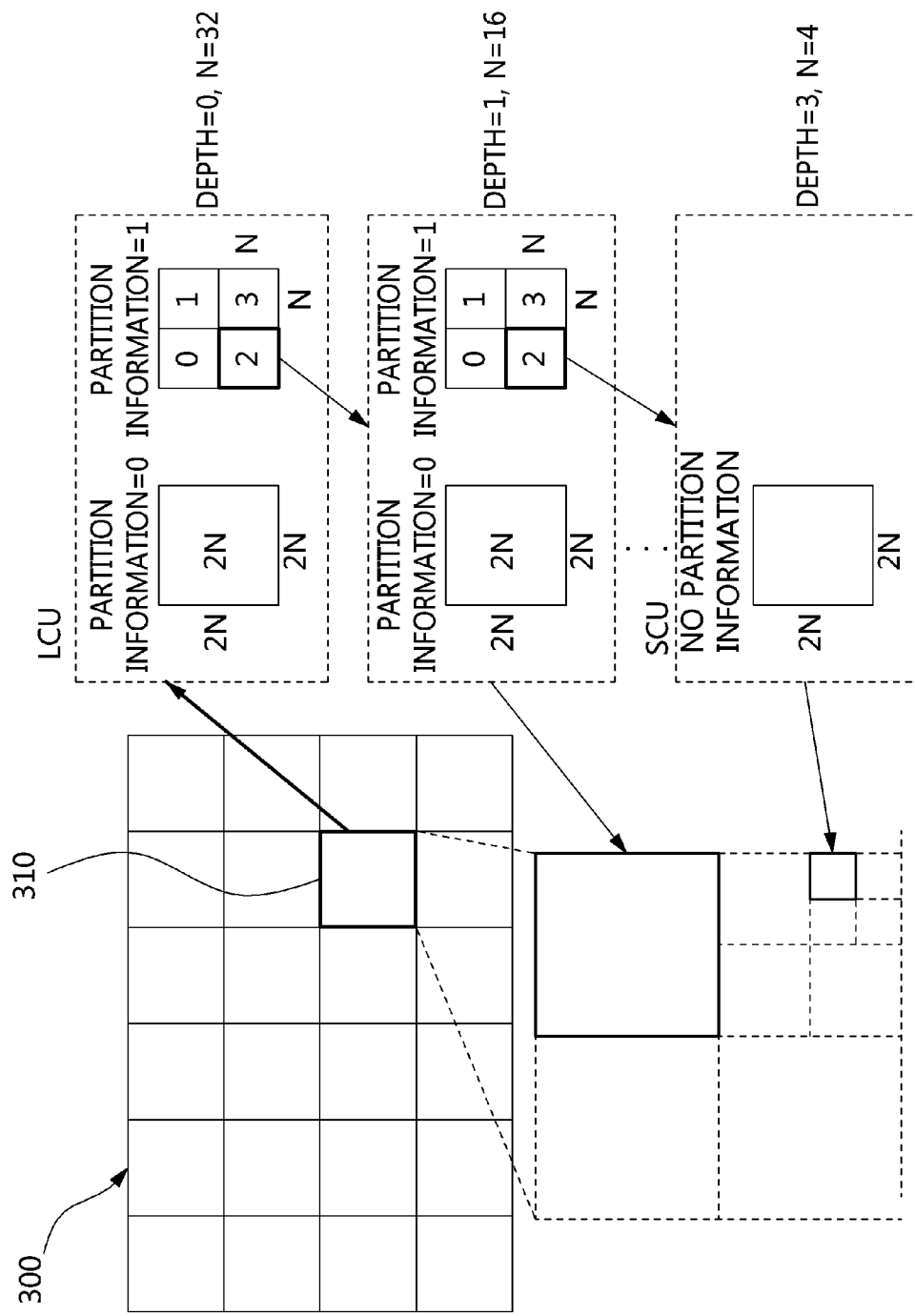
FIG. 3 is a diagram schematically illustrating the partition structure of an image when the image is encoded and decoded.

FIG. 3 is a diagram schematically illustrating the partition structure of an image when the image is encoded and decoded.

FIG. 3 may schematically illustrate an example in which a single unit is partitioned into multiple sub-units.

In order to efficiently partition the image, a Coding Unit (CU) may be used in encoding and decoding. The term "unit" may be used to collectively designate 1) a block including image samples and 2) a syntax element. For example, the "partitioning of a unit" may mean the "partitioning of a block corresponding to a unit".

A CU may be used as a base unit for image encoding/decoding. A CU may be used as a unit to which one mode selected from an intra mode and an inter mode in image encoding/decoding is applied. In other words, in image encoding/decoding, which one of an intra mode and an inter mode is to be applied to each CU may be determined.

Further, a CU may be a base unit in prediction, transform, quantization, inverse transform, dequantization, and encoding/decoding of transform coefficients.

Referring to FIG. 3, an image 200 may be sequentially partitioned into units corresponding to a Largest Coding Unit (LCU), and the partition structure of the image 300 may be determined according to the LCU. Here, the LCU may be used to have the same meaning as a Coding Tree Unit (CTU).

The partitioning of a unit may mean the partitioning of a block corresponding to the unit. Block partition information may include depth information about the depth of a unit. The depth information may indicate the number of times the unit is partitioned and/or the degree to which the unit is partitioned. A single unit may be hierarchically partitioned into sub-units while having depth information based on a tree structure. Each of partitioned sub-units may have depth information. The depth information may be information indicating the size of a CU. The depth information may be stored for each CU. Each CPU may have depth information.

The partition structure may mean the distribution of Coding Units (CUs) to efficiently encode the image in an LCU 310. Such a distribution may be determined depending on whether a single CU is to be partitioned into multiple CUs. The number of CUs generated by partitioning may be a positive integer of 2 or more, including 2, 4, 8, 16, etc. The horizontal size and the vertical size of each of CUs generated by the partitioning may be less than the horizontal size and the vertical size of a CU before being partitioned, depending on the number of CUs generated by partitioning.

Each partitioned CU may be recursively partitioned into four CUs in the same way. Via the recursive partitioning, at least one of the horizontal size and the vertical size of each partitioned CU may be reduced compared to at least one of the horizontal size and the vertical size of the CU before being partitioned.

The partitioning of a CU may be recursively performed up to a predefined depth or a predefined size. For example, the depth of an LCU may be 0, and the depth of a Smallest Coding Unit (SCU) may be a predefined maximum depth. Here, as described above, the LCU may be the CU having the maximum coding unit size, and the SCU may be the CU having the minimum coding unit size.

Partitioning may start at the LCU 310, and the depth of a CU may be increased by 1 whenever the horizontal and/or vertical sizes of the CU are reduced by partitioning.

For example, for respective depths, a CU that is not partitioned may have a size of 2N×2N. Further, in the case of a CU that is partitioned, a CU having a size of 2N×2N may be partitioned into four CUs, each having a size of N×N. The value of N may be halved whenever the depth is increased by 1.

Referring to FIG. 3, an LCU having a depth of 0 may have 64×64 pixels or 64×64 blocks. 0 may be a minimum depth. An SCU having a depth of 3 may have 8×8 pixels or 8×8 blocks. 3 may be a maximum depth. Here, a CU having 64×64 blocks, which is the LCU, may be represented by a depth of 0. A CU having 32×32 blocks may be represented by a depth of 1. A CU having 16×16 blocks may be represented by a depth of 2. A CU having 8×8 blocks, which is the SCU, may be represented by a depth of 3.

Information about whether the corresponding CU is partitioned may be represented by the partition information of the CU. The partition information may be 1-bit information. All CUs except the SCU may include partition information. For example, the value of the partition information of a CU that is not partitioned may be 0. The value of the partition information of a CU that is partitioned may be 1.

For example, when a single CU is partitioned into four CUs, the horizontal size and vertical size of each of four CUs generated by partitioning may be half the horizontal size and the vertical size of the CU before being partitioned. When a CU having a 32×32 size is partitioned into four CUs, the size of each of four partitioned CUs may be 16×16. When a single CU is partitioned into four CUs, it may be considered that the CU has been partitioned in a quad-tree structure.

For example, when a single CU is partitioned into two CUs, the horizontal size or the vertical size of each of two CUs generated by partitioning may be half the horizontal size or the vertical size of the CU before being partitioned. When a CU having a 32×32 size is vertically partitioned into two CUs, the size of each of four partitioned CUs may be 16×32. When a single CU is partitioned into two CUs, it may be considered that the CU has been partitioned in a binary-tree structure.

Both quad-tree partitioning and binary-tree partitioning have been applied to the LCU 320 of FIG. 3.

Figure 4:
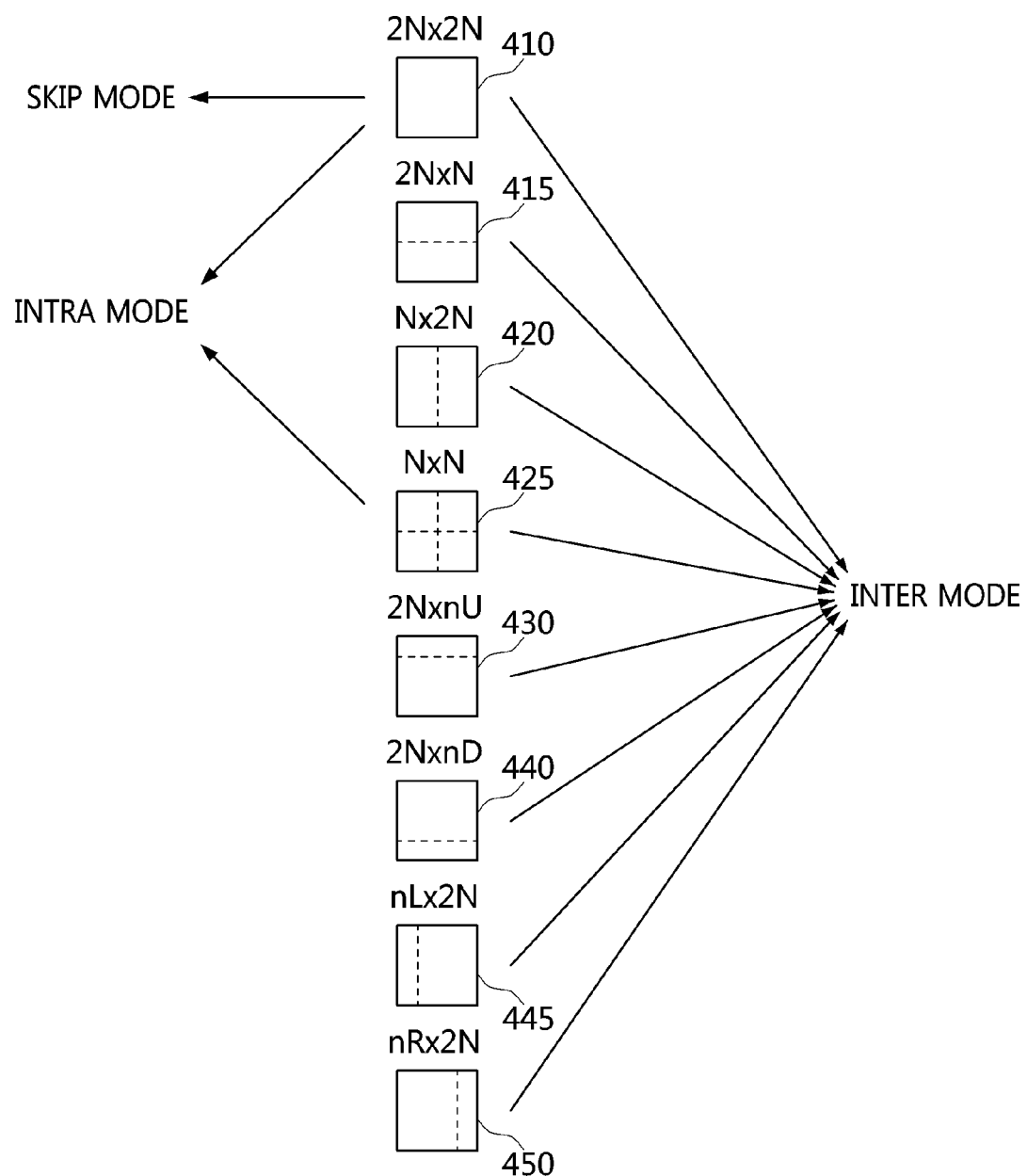
FIG. 4 is a diagram illustrating the form of a Prediction Unit (PU) that a Coding Unit (CU) can include.

FIG. 4 is a diagram illustrating the form of a Prediction Unit (PU) that a Coding Unit (CU) can include.

When, among CUs partitioned from an LCU, a CU, which is not partitioned any further, may be divided into one or more Prediction Units (PUs). Such division is also referred to as "partitioning".

A PU may be a base unit for prediction. A PU may be encoded and decoded in any one of a skip mode, an inter mode, and an intra mode. A PU may be partitioned into various shapes depending on respective modes. For example, the target block, described above with reference to FIG. 1, and the target block, described above with reference to FIG. 2, may each be a PU.

In a skip mode, partitioning may not be present in a CU. In the skip mode, a 2N×2N mode 410, in which the sizes of a PU and a CU are identical to each other, may be supported without partitioning.

In an inter mode, 8 types of partition shapes may be present in a CU. For example, in the inter mode, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 may be supported.

In an intra mode, the 2N×2N mode 410 and the N×N mode 425 may be supported.

In the 2N×2N mode 410, a PU having a size of 2N×2N may be encoded. The PU having a size of 2N×2N may mean a PU having a size identical to that of the CU. For example, the PU having a size of 2N×2N may have a size of 64×64, 32×32, 16×16 or 8×8.

In the N×N mode 425, a PU having a size of N×N may be encoded.

For example, in intra prediction, when the size of a PU is 8×8, four partitioned PUs may be encoded. The size of each partitioned PU may be 4×4.

When a PU is encoded in an intra mode, the PU may be encoded using any one of multiple intra-prediction modes. For example, HEVC technology may provide 35 intra-prediction modes, and the PU may be encoded in any one of the 35 intra-prediction modes.

Which one of the 2N×2N mode 410 and the N×N mode 425 is to be used to encode the PU may be determined based on rate-distortion cost.

The encoding apparatus 100 may perform an encoding operation on a PU having a size of 2N×2N. Here, the encoding operation may be the operation of encoding the PU in each of multiple intra-prediction modes that can be used by the encoding apparatus 100. Through the encoding operation, the optimal intra-prediction mode for a PU having a size of 2N×2N may be derived. The optimal intra-prediction mode may be an intra-prediction mode in which a minimum rate-distortion cost occurs upon encoding the PU having a size of 2N×2N, among multiple intra-prediction modes that can be used by the encoding apparatus 100.

Further, the encoding apparatus 100 may sequentially perform an encoding operation on respective PUs obtained from N×N partitioning. Here, the encoding operation may be the operation of encoding a PU in each of multiple intra-prediction modes that can be used by the encoding apparatus 100. By means of the encoding operation, the optimal intra-prediction mode for the PU having a size of N×N may be derived. The optimal intra-prediction mode may be an intra-prediction mode in which a minimum rate-distortion cost occurs upon encoding the PU having a size of N×N, among multiple intra-prediction modes that can be used by the encoding apparatus 100.

The encoding apparatus 100 may determine which one of the PU having a size of 2N×2N and PUs having a size of N×N is to be encoded based on the result of a comparison between the rate-distortion cost of the PU having a size of 2N×2N and the rate-distortion costs of PUs having a size of N×N.

Figure 5:
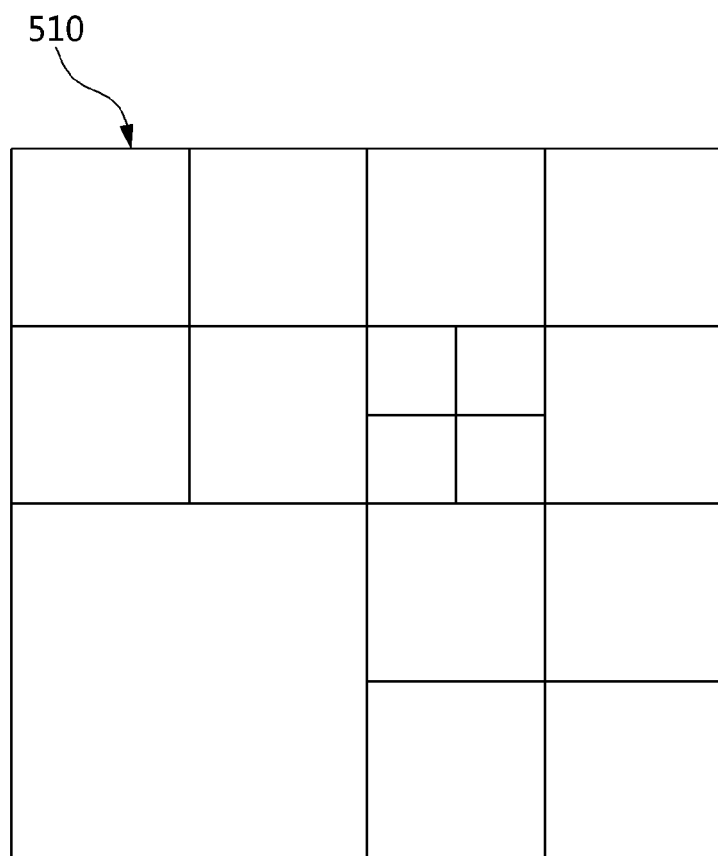
FIG. 5 is a diagram illustrating the form of a Transform Unit (TU) that can be included in a CU.

FIG. 5 is a diagram illustrating the form of a Transform Unit (TU) that can be included in a CU.

A Transform Unit (TU) may have a base unit that is used for a procedure, such as transform, quantization, inverse transform, dequantization, entropy encoding, and entropy decoding, in a CU. A TU may have a square shape or a rectangular shape.

Among CUs partitioned from the LCU, a CU which is not partitioned into CUs any further may be partitioned into one or more TUs. Here, the partition structure of a TU may be a quad-tree structure. For example, as shown in FIG. 5, a single CU 510 may be partitioned one or more times depending on the quad-tree structure. By means of this partitioning, the single CU 510 may be composed of TUs having various sizes.

In the encoding apparatus 100, a Coding Tree Unit (CTU) having a size of 64×64 may be partitioned into multiple smaller CUs by a recursive quad-tree structure. A single CU may be partitioned into four CUs having the same size. Each CU may be recursively partitioned, and may have a quad-tree structure.

A CU may have a given depth. When the CU is partitioned, CUs resulting from partitioning may have a depth increased from the depth of the partitioned CU by 1.

For example, the depth of a CU may have a value ranging from 0 to 3. The size of the CU may range from a size of 64×64 to a size of 8×8 depending on the depth of the CU.

By the recursive partitioning of a CU, an optimal partitioning method that incurs a minimum rate-distortion cost may be selected.

Figure 6:
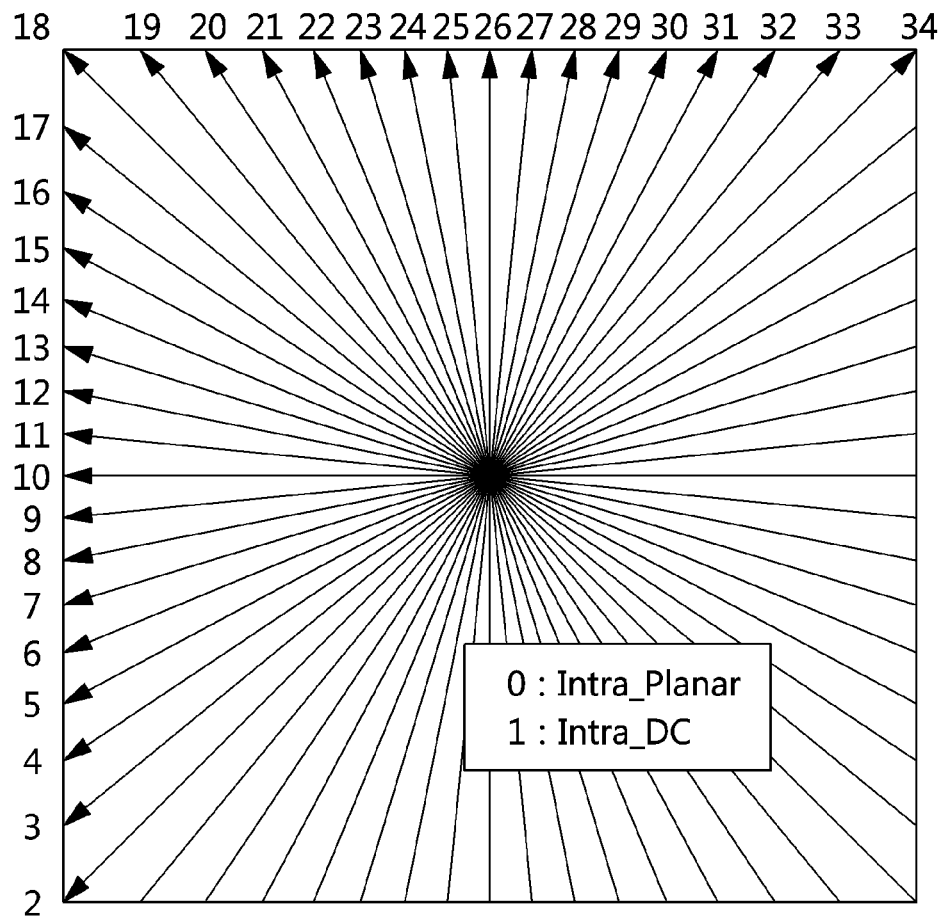
FIG. 6 is a diagram for explaining an embodiment of an intra-prediction procedure.

FIG. 6 is a diagram for explaining an embodiment of an intra-prediction process.

Arrows radially extending from the center of the graph in FIG. 6 indicate the prediction directions of intra-prediction modes. Further, numbers appearing near the arrows indicate examples of mode values assigned to intra-prediction modes or to the prediction directions of the intra-prediction modes.

Intra encoding and/or decoding may be performed using reference samples of blocks neighboring a target block. The neighboring blocks may be neighboring reconstructed blocks. For example, intra encoding and/or decoding may be performed using the values of reference samples which are included in each neighboring reconstructed block or the coding parameters of the neighboring reconstructed block.

The encoding apparatus 100 and/or the decoding apparatus 200 may generate a prediction block by performing intra prediction on a target block based on information about samples in a target image. When intra prediction is performed, the encoding apparatus 100 and/or the decoding apparatus 200 may generate a prediction block for the target block by performing intra prediction based on information about samples in the target image. When intra prediction is performed, the encoding apparatus 100 and/or the decoding apparatus 200 may perform directional prediction and/or non-directional prediction based on at least one reconstructed reference sample.

A prediction block may be a block generated as a result of performing intra prediction. A prediction block may correspond to at least one of a CU, a PU, and a TU.

The unit of a prediction block may have a size corresponding to at least one of a CU, a PU, and a TU. The prediction block may have a square shape having a size of 2N×2N or N×N. The size of N×N may include sizes of 4×4, 8×8, 16×16, 32×32, 64×64, or the like.

Alternatively, a prediction block may be either a square block having a size of 2×2, 4×4, 16×16, 32×32, 64×64, or the like, or a rectangular block having a size of 2×8, 4×8, 2×16, 4×16, 8×16, or the like.

Intra prediction may be performed in consideration of the intra-prediction mode for the target block. The number of intra-prediction modes that the target block can have may be a predefined fixed value, and may be a value determined differently depending on the attributes of a prediction block. For example, the attributes of the prediction block may include the size of the prediction block, the type of prediction block, etc.

For example, the number of intra-prediction modes may be fixed at 35 regardless of the size of a prediction block. Alternatively, the number of intra-prediction modes may be, for example, 3, 5, 9, 17, 34, 35, or 36.

The intra-prediction modes may be non-directional modes or directional modes. For example, the intra-prediction modes may include two non-directional modes and 33 directional modes, as shown in FIG. 6.

The two non-directional modes may include a DC mode and a planar mode.

The directional modes may be prediction modes having a specific direction or a specific angle.

The intra-prediction modes may each be represented by at least one of a mode number, a mode value, a mode number, and a mode angle. The number of intra-prediction modes may be M. The value of M may be 1 or more. In other words, the number of intra-prediction modes may be M, which includes the number of non-directional modes and the number of non-directional modes.

The number of intra-prediction modes may be fixed to M regardless of the size of a block. Alternatively, the number of intra-prediction modes may differ depending on the size of a block and/or the type of color component. For example, the number of prediction modes may differ depending on whether a color component is a luma signal or a chroma signal. For example, the larger the size of the block, the greater the number of intra-prediction modes. Alternatively, the number of intra-prediction modes corresponding to a luma component block may be greater than the number of intra-prediction modes corresponding to a chroma component block.

For example, in a vertical mode having a mode value of 26, prediction may be performed in a vertical direction based on the pixel value of a reference sample. For example, in a horizontal mode having a mode value of 10, prediction may be performed in a horizontal direction based on the pixel value of a reference sample.

Even in directional modes other than the above-described mode, the encoding apparatus 100 and the decoding apparatus 200 may perform intra prediction on a target unit using reference samples depending on angles corresponding to the directional modes.

Intra-prediction modes located on a right side with respect to the vertical mode may be referred to as 'vertical-right modes'. Intra-prediction modes located below the horizontal mode may be referred to as 'horizontal-below modes'. For example, in FIG. 6, the intra-prediction modes in which a mode value is one of 27, 28, 29, 30, 31, 32, 33, and 34 may be vertical-right modes 613. Intra-prediction modes in which a mode value is one of 2, 3, 4, 5, 6, 7, 8, and 9 may be horizontal-below modes 616.

The non-directional modes may include a DC mode and a planar mode. For example, the mode value of the DC mode may be 1. The mode value of the planar mode may be 0.

The directional modes may include an angular mode. Among multiple intra-prediction modes, modes other than the DC mode and the planar mode may be the directional modes.

In the DC mode, a prediction block may be generated based on the average of pixel values of multiple reference samples. For example, the pixel value of the prediction block may be determined based on the average of pixel values of multiple reference samples.

The number of above-described intra-prediction modes and the mode values of respective intra-prediction modes are merely exemplary. The number of above-described intra-prediction modes and the mode values of respective intra-prediction modes may be defined differently depending on the embodiments, implementation and/or requirements.

In order to perform intra prediction on a target block, the step of checking whether samples included in a reconstructed neighboring block can be used as reference samples of a target block may be performed. When a sample that cannot be used as a reference sample of the current block is present among samples in the neighboring block, a value generated via copying and/or interpolation that uses at least one sample value, among the samples included in the reconstructed neighboring block, may replace the sample value of the sample that cannot be used as the reference sample. When the value generated via copying and/or interpolation replaces the sample value of the existing sample, the sample may be used as the reference sample of the target block.

In intra prediction, a filter may be applied to at least one of a reference sample and a prediction sample based on at least one of the intra-prediction mode and the size of the target block.

When the intra-prediction mode is a planar mode, a sample value of a prediction target block may be generated using a weighted sum of an above reference sample of the target block, a left reference sample of the target block, an above-right reference sample of the target block, and a below-left reference sample of the target block depending on the location of the prediction target sample in the prediction block when the prediction block of the target block is generated.

When the intra-prediction mode is a DC mode, the average of reference samples above the target block and the reference samples to the left of the target block may be used when the prediction block of the target block is generated.

When the intra-prediction mode is a directional mode, a prediction block may be generated using the above reference samples, left reference samples, above-right reference sample and/or below-left reference sample of the target block.

In order to generate the above-described prediction sample, real-number-based interpolation may be performed.

The intra-prediction mode of the target block may perform prediction from intra prediction of a neighboring block adjacent to the target block, and the information used for prediction may be entropy-encoded/decoded.

For example, when the intra-prediction modes of the target block and the neighboring block are identical to each other, it may be signaled, using a predefined flag, that the intra-prediction modes of the target block and the neighboring block are identical.

For example, an indicator for indicating an intra-prediction mode identical to that of the target block, among intra-prediction modes of multiple neighboring blocks, may be signaled.

When the intra-prediction modes of the target block and the neighboring block are different from each other, the intra-prediction mode information of the target block may be entropy-encoded/decoded based on the intra-prediction mode of the neighboring block.

Figure 7:
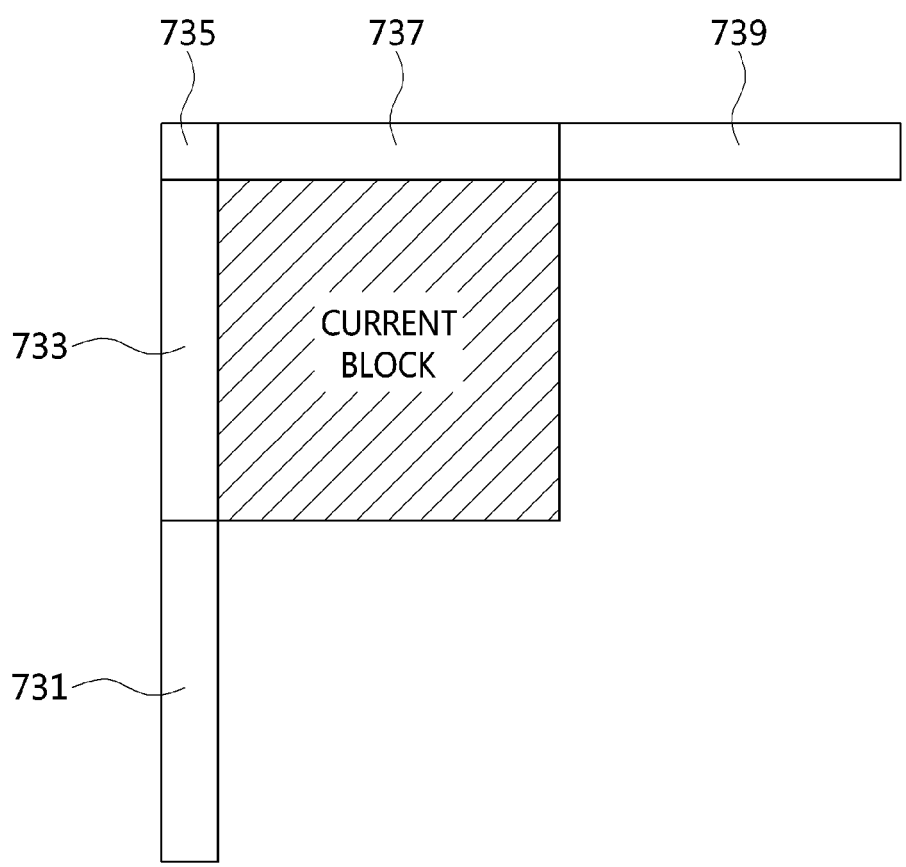
FIG. 7 is a diagram for explaining the locations of reference samples used in an intra-prediction procedure.

FIG. 7 is a diagram for explaining the locations of reference samples used in an intra-prediction procedure.

FIG. 7 illustrates the locations of reference samples used for intra prediction of a target block. Referring to FIG. 7, reconstructed reference samples used for intra prediction of the target block may include below-left reference samples 731, left reference samples 733, an above-left corner reference sample 735, above reference samples 737, and above-right reference samples 739.

For example, the left reference samples 733 may mean reconstructed reference pixels adjacent to the left side of the target block. The above reference samples 737 may mean reconstructed reference pixels adjacent to the top of the target block. The above-left corner reference sample 735 may mean a reconstructed reference pixel located at the above-left corner of the target block. The below-left reference samples 731 may mean reference samples located below a left sample line composed of the left reference samples 733, among samples located on the same line as the left sample line. The above-right reference samples 739 may mean reference samples located to the right of an above sample line composed of the above reference samples 737, among samples located on the same line as the above sample line.

When the size of a target block is N×N, the numbers of the below-left reference samples 731, the left reference samples 733, the above reference samples 737, and the above-right reference samples 739 may each be N.

By performing intra prediction on the target block, a prediction block may be generated. The generation of the prediction block may include the determination of the values of pixels in the prediction block. The sizes of the target block and the prediction block may be equal.

The reference samples used for intra prediction of the target block may vary depending on the intra-prediction mode of the target block. The direction of the intra-prediction mode may represent a dependence relationship between the reference samples and the pixels of the prediction block. For example, the value of a specified reference sample may be used as the values of one or more specified pixels in the prediction block. In this case, the specified reference sample and the one or more specified pixels in the prediction block may be the sample and pixels which are positioned in a straight line in the direction of an intra-prediction mode. In other words, the value of the specified reference sample may be copied as the value of a pixel located in a direction reverse to the direction of the intra-prediction mode. Alternatively, the value of a pixel in the prediction block may be the value of a reference sample located in the direction of the intra-prediction mode with respect to the location of the pixel.

In an example, when the intra-prediction mode of a target block is a vertical mode having a mode value of 26, the above reference samples 737 may be used for intra prediction. When the intra-prediction mode is the vertical mode, the value of a pixel in the prediction block may be the value of a reference sample vertically located above the location of the pixel. Therefore, the above reference samples 737 adjacent to the top of the target block may be used for intra prediction. Furthermore, the values of pixels in one row of the prediction block may be identical to those of the above reference samples 737.

In an example, when the intra-prediction mode of the current block is a horizontal mode having a mode value of 10, the left reference samples 733 may be used for intra prediction. When the intra-prediction mode is the horizontal mode, the value of a pixel in the prediction block may be the value of a reference sample horizontally located to the left of the pixel. Therefore, the left reference samples 733 adjacent to the left of the target block may be used for intra prediction. Further, the values of pixels in one column of the prediction block may be identical to those of the left reference samples 733.

In an example, when the mode value of the intra-prediction mode of the current block is 18, at least some of the left reference samples 733, the above-left corner reference sample 735, and at least some of the above reference samples 737 may be used for intra prediction. When the mode value of the intra-prediction mode is 18, the value of a pixel in the prediction block may be the value of a reference sample diagonally located at the above-left corner of the pixel.

Further, when an intra-prediction mode having a mode value corresponding to 27, 28, 29, 30, 31, 32, 33 or 34 is used, at least some of the above-right reference samples 739 may be used for intra prediction.

Furthermore, when an intra-prediction mode having a mode value corresponding to 2, 3, 4, 5, 6, 7, 8 or 9 is used, at least some of the below-left reference samples 731 may be used for intra prediction.

In addition, when an intra-prediction mode having a mode value corresponding to any one of 11 to 25 is used, the above-left corner reference sample 735 may be used for intra prediction.

The number of reference samples used to determine the pixel value of one pixel in the prediction block may be either 1, or 2 or more.

As described above, the pixel value of a pixel in the prediction block may be determined depending on the location of the pixel and the location of a reference sample indicated by the direction of the intra-prediction mode. When the location of the pixel and the location of the reference sample indicated by the direction of the intra-prediction mode are integer positions, the value of one reference sample indicated by an integer position may be used to determine the pixel value of the pixel in the prediction block.

When the location of the pixel and the location of the reference sample indicated by the direction of the intra-prediction mode are not integer positions, an interpolated reference sample based on two reference samples closest to the location of the reference sample may be generated. The value of the interpolated reference sample may be used to determine the pixel value of the pixel in the prediction block. In other words, when the location of the pixel in the prediction block and the location of the reference sample indicated by the direction of the intra-prediction mode indicate the location between two reference samples, an interpolated value based on the values of the two samples may be generated.

The prediction block generated via prediction may not be identical to an original target block. In other words, there may be a prediction error which is the difference between the target block and the prediction block, and there may also be a prediction error between the pixel of the target block and the pixel of the prediction block.

Hereinafter, the terms "difference", "error", and "residual" may be used to have the same meaning, and may be used interchangeably with each other.

For example, in the case of directional intra prediction, the longer the distance between the pixel of the prediction block and the reference sample, the greater the prediction error that may occur. Such a prediction error may result in discontinuity between the generated prediction block and neighboring blocks.

In order to reduce the prediction error, filtering for the prediction block may be used. Filtering may be configured to adaptively apply a filter to an area, regarded as having a large prediction error, in the prediction block. For example, the area regarded as having a large prediction error may be the boundary of the prediction block. Further, an area regarded as having a large prediction error in the prediction block may differ depending on the intra-prediction mode, and the characteristics of filters may also differ depending thereon.

Figure 8:
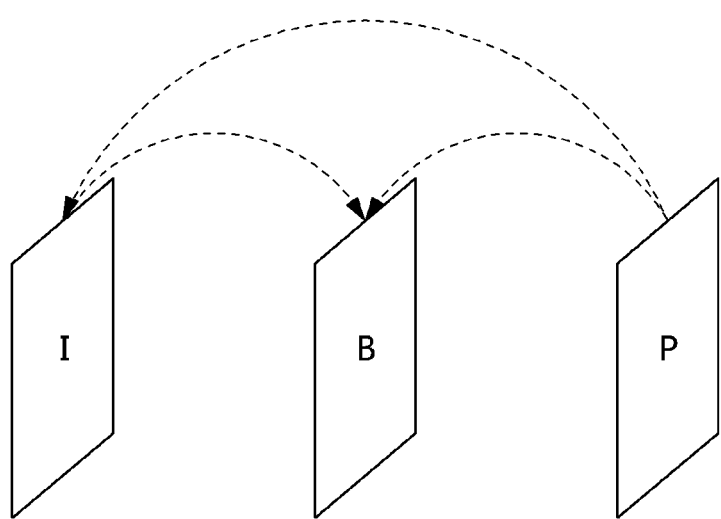
FIG. 8 is a diagram for explaining an embodiment of an inter-prediction procedure.

FIG. 8 is a diagram for explaining an embodiment of an inter prediction procedure.

The rectangles shown in FIG. 8 may represent images (or pictures). Further, in FIG. 8, arrows may represent prediction directions. That is, each image may be encoded and/or decoded depending on the prediction direction.

Images may be classified into an Intra Picture (I picture), a Uni-prediction Picture or Predictive Coded Picture (P picture), and a Bi-prediction Picture or Bi-predictive Coded Picture (B picture) depending on the encoding type. Each picture may be encoded depending on the encoding type thereof.

When a target image that is the target to be encoded is an I picture, the target image may be encoded using data contained in the image itself without inter prediction that refers to other images. For example, an I picture may be encoded only via intra prediction.

When a target image is a P picture, the target image may be encoded via inter prediction, which uses reference pictures existing in one direction. Here, the one direction may be a forward direction or a backward direction.

When a target image is a B picture, the image may be encoded via inter prediction that uses reference pictures existing in two directions, or may be encoded via inter prediction that uses reference pictures existing in one of a forward direction and a backward direction. Here, the two directions may be the forward direction and the backward direction.

A P picture and a B picture that are encoded and/or decoded using reference pictures may be regarded as images in which inter prediction is used.

Below, inter prediction in an inter mode according to an embodiment will be described in detail.

Inter Prediction May be Performed Using Motion Information.

In an inter mode, the encoding apparatus 100 may perform inter prediction and/or motion compensation on a target block. The decoding apparatus 100 may perform inter prediction and/or motion compensation, corresponding to inter prediction and/or motion compensation performed by the encoding apparatus 100, on a target block.

Motion information of the target block may be individually derived by the encoding apparatus 100 and the decoding apparatus 200 during the inter prediction. The motion information may be derived using motion information of a reconstructed neighboring block, motion information of a co-located (col block), and/or motion information of a block adjacent to the col block. The col block may be a block in a previously reconstructed co-located picture (col picture). The location of the col block in the col-picture may correspond to the location of the target block in a target image. The col picture may be any one of one or more reference pictures included in a reference picture list.

For example, the encoding apparatus 100 or the decoding apparatus 200 may perform prediction and/or motion compensation by using motion information of a spatial candidate and/or a temporal candidate as motion information of the target block. The target block may mean a PU and/or a PU partition.

A spatial candidate may be a reconstructed block which is spatially adjacent to the target block.

A temporal candidate may be a reconstructed block corresponding to the target block in a previously reconstructed co-located picture (col picture).

In inter prediction, the encoding apparatus 100 and the decoding apparatus 200 may improve encoding efficiency and decoding efficiency by utilizing the motion information of a spatial candidate and/or a temporal candidate. The motion information of a spatial candidate may be referred to as 'spatial motion information'. The motion information of a temporal candidate may be referred to as 'temporal motion information'.

Below, the motion information of a spatial candidate may be the motion information of a PU including the spatial candidate. The motion information of a temporal candidate may be the motion information of a PU including the temporal candidate. The motion information of a candidate block may be the motion information of a PU including the candidate block.

Inter prediction may be performed using a reference picture.

The reference picture may be at least one of a picture previous to a target picture and a picture subsequent to the target picture. The reference picture may be an image used for the prediction of the target block.

In inter prediction, a region in the reference picture may be specified by utilizing a reference picture index (or refIdx) for indicating a reference picture, a motion vector, which will be described later, etc. Here, the region specified in the reference picture may indicate a reference block.

Inter prediction may select a reference picture, and may also select a reference block corresponding to the target block from the reference picture. Further, inter prediction may generate a prediction block for the target block using the selected reference block.

The motion information may be derived during inter prediction by each of the encoding apparatus 100 and the decoding apparatus 200.

A spatial candidate may be a block 1) which is present in a target picture, 2) which has been previously reconstructed via encoding and/or decoding, and 3) which is adjacent to the target block or is located at the corner of the target block. Here, the "block located at the corner of the target block" may be either a block vertically adjacent to a neighboring block that is horizontally adjacent to the target block, or a block horizontally adjacent to a neighboring block that is vertically adjacent to the target block. Further, "block located at the corner of the target block" may have the same meaning as "block adjacent to the corner of the target block". The meaning of "block located at the corner of the target block" may be included in the meaning of "block adjacent to the target block".

For example, a spatial candidate may be a reconstructed block located to the left of the target block, a reconstructed block located above the target block, a reconstructed block located at the below-left corner of the target block, a reconstructed block located at the above-right corner of the target block, or a reconstructed block located at the above-left corner of the target block.

Each of the encoding apparatus 100 and the decoding apparatus 200 may identify a block present at the location spatially corresponding to the target block in a col picture. The location of the target block in the target picture and the location of the identified block in the col picture may correspond to each other.

Each of the encoding apparatus 100 and the decoding apparatus 200 may determine a col block present at the predefined relative location for the identified block to be a temporal candidate. The predefined relative location may be a location present inside and/or outside the identified block.

For example, the col block may include a first col block and a second col block. When the coordinates of the identified block are (xP, yP) and the size of the identified block is represented by (nPSW, nPSH), the first col block may be a block located at coordinates (xP+nPSW, yP+nPSH). The second col block may be a block located at coordinates (xP+(nPSW>>1), yP+(nPSH>>1)). The second col block may be selectively used when the first col block is unavailable.

The motion vector of the target block may be determined based on the motion vector of the col block. Each of the encoding apparatus 100 and the decoding apparatus 200 may scale the motion vector of the col block. The scaled motion vector of the col block may be used as the motion vector of the target block. Further, a motion vector for the motion information of a temporal candidate stored in a list may be a scaled motion vector.

The ratio of the motion vector of the target block to the motion vector of the col block may be identical to the ratio of a first distance to a second distance. The first distance may be the distance between the reference picture and the target picture of the target block. The second distance may be the distance between the reference picture and the col picture of the col block.

The scheme for deriving motion information may change depending on the inter-prediction mode of a target block. For example, as inter-prediction modes applied for inter prediction, an Advanced Motion Vector Predictor (AMVP) mode, a merge mode, a skip mode, a current picture reference mode, etc. may be present. The merge mode may also be referred to as a "motion merge mode". Individual modes will be described in detail below.

1) AMVP Mode

When an AMVP mode is used, the encoding apparatus 100 may search a neighboring region of a target block for a similar block. The encoding apparatus 100 may acquire a prediction block by performing prediction on the target block using motion information of the found similar block. The encoding apparatus 100 may encode a residual block, which is the difference between the target block and the prediction block.

1-1) Creation of List of Prediction Motion Vector Candidates

When an AMVP mode is used as the prediction mode, each of the encoding apparatus 100 and the decoding apparatus 200 may create a list of prediction motion vector candidates using the motion vector of a spatial candidate, the motion vector of a temporal candidate, and a zero vector. The prediction motion vector candidate list may include one or more prediction motion vector candidates. At least one of the motion vector of a spatial candidate, the motion vector of a temporal candidate, and a zero vector may be determined and used as a prediction motion vector candidate.

Hereinafter, the terms "prediction motion vector (candidate)" and "motion vector (candidate)" may be used to have the same meaning, and may be used interchangeably with each other.

Spatial motion candidates may include a reconstructed spatial neighboring block. In other words, the motion vector of the reconstructed neighboring block may be referred to as a "spatial prediction motion vector candidate".

Temporal motion candidates may include a col block and a block adjacent to the col block. In other words, the motion vector of the col block or the motion vector of the block adjacent to the col block may be referred to as a "temporal prediction motion vector candidate".

The zero vector may be a (0, 0) motion vector.

The prediction motion vector candidates may be motion vector predictors for predicting a motion vector. Also, in the encoding apparatus 100, each prediction motion vector candidate may be an initial search location for a motion vector.

1-2) Search for Motion Vectors that Use List of Prediction Motion Vector Candidates The encoding apparatus 100 may determine the motion vector to be used to encode a target block within a search range using a list of prediction motion vector candidates. Further, the encoding apparatus 100 may determine a prediction motion vector candidate to be used as the prediction motion vector of the target block, among prediction motion vector candidates present in the prediction motion vector candidate list.

The motion vector to be used to encode the target block may be a motion vector that can be encoded at minimum cost.

Further, the encoding apparatus 100 may determine whether to use the AMVP mode to encode the target block.

1-3) Transmission of Inter-Prediction Information

The encoding apparatus 100 may generate a bitstream including inter-prediction information required for inter prediction. The decoding apparatus 200 may perform inter prediction on the target block using the inter-prediction information of the bitstream.

The inter-prediction information may contain 1) mode information indicating whether an AMVP mode is used, 2) a prediction motion vector index, 3) a Motion Vector Difference (MVD), 4) a reference direction, and 5) a reference picture index.

Further, the inter-prediction information may contain a residual signal.

The decoding apparatus 200 may acquire a prediction motion vector index, an MVD, a reference direction, and a reference picture index from the bitstream through entropy decoding when mode information indicates that the AMVP mode is used.

The prediction motion vector index may indicate a prediction motion vector candidate to be used for the prediction of a target block, among prediction motion vector candidates included in the prediction motion vector candidate list.

1-4) Inter Prediction in AMVP Mode that Uses Inter-Prediction Information

The decoding apparatus 200 may derive prediction motion vector candidates using a prediction motion vector candidate list, and may determine the motion information of a target block based on the derived prediction motion vector candidates.

The decoding apparatus 200 may determine a motion vector candidate for the target block, among the prediction motion vector candidates included in the prediction motion vector candidate list, using a prediction motion vector index. The decoding apparatus 200 may select a prediction motion vector candidate, indicated by the prediction motion vector index, from among prediction motion vector candidates included in the prediction motion vector candidate list, as the prediction motion vector of the target block.

The motion vector to be actually used for inter prediction of the target block may not match the prediction motion vector. In order to indicate the difference between the motion vector to be actually used for inter prediction of the target block and the prediction motion vector, an MVD may be used. The encoding apparatus 100 may derive a prediction motion vector similar to the motion vector to be actually used for inter prediction of the target block so as to use an MVD that is as small as possible.

An MVD may be the difference between the motion vector of the target block and the prediction motion vector. The encoding apparatus 100 may calculate an MVD and may entropy-encode the MVD.

The MVD may be transmitted from the encoding apparatus 100 to the decoding apparatus 200 through a bitstream. The decoding apparatus 200 may decode the received MVD. The decoding apparatus 200 may derive the motion vector of the target block by summing the decoded MVD and the prediction motion vector. In other words, the motion vector of the target block derived by the decoding apparatus 200 may be the sum of the entropy-decoded MVD and the motion vector candidate.

The reference direction may indicate a list of reference pictures to be used for prediction of the target block. For example, the reference direction may indicate one of a reference picture list L0 and a reference picture list L1.

The reference direction merely indicates the reference picture list to be used for prediction of the target block, and may not mean that the directions of reference pictures are limited to a forward direction or a backward direction. In other words, each of the reference picture list L0 and the reference picture list L1 may include pictures in a forward direction and/or a backward direction.

That the reference direction is unidirectional may mean that a single reference picture list is used. That the reference direction is bidirectional may mean that two reference picture lists are used. In other words, the reference direction may indicate one of the case where only the reference picture list L0 is used, the case where only the reference picture list L1 is used, and the case where two reference picture lists are used.

The reference picture index may indicate a reference picture to be used for prediction of a target block, among reference pictures in the reference picture list. The reference picture index may be entropy-encoded by the encoding apparatus 100. The entropy-encoded reference picture index may be signaled to the decoding apparatus 200 by the encoding apparatus 100 through a bitstream.

When two reference picture lists are used to predict the target block, a single reference picture index and a single motion vector may be used for each of the reference picture lists. Further, when two reference picture lists are used to predict the target block, two prediction blocks may be specified for the target block. For example, the (final) prediction block of the target block may be generated using the average or weighted sum of the two prediction blocks for the target block.

The motion vector of the target block may be derived by the prediction motion vector index, the MVD, the reference direction, and the reference picture index.

The decoding apparatus 200 may generate a prediction block for the target block based on the derived motion vector and the reference picture index. For example, the prediction block may be a reference block, indicated by the derived motion vector, in the reference picture indicated by the reference picture index.

Since the prediction motion vector index and the MVD are encoded without the motion vector itself of the target block being encoded, the number of bits transmitted from the encoding apparatus 100 to the decoding apparatus 200 may be decreased, and encoding efficiency may be improved.

For the target block, the motion information of reconstructed neighboring blocks may be used. In a specific inter-prediction mode, the encoding apparatus 100 may not separately encode the actual motion information of the target block. The motion information of the target block is not encoded, and additional information that enables the motion information of the target block to be derived using the motion information of reconstructed neighboring blocks may be encoded instead. As the additional information is encoded, the number of bits transmitted to the decoding apparatus 200 may be decreased, and encoding efficiency may be improved.

For example, as inter-prediction modes in which the motion information of the target block is not directly encoded, there may be a skip mode and/or a merge mode. Here, each of the encoding apparatus 100 and the decoding apparatus 200 may use an identifier and/or an index that indicates a unit, the motion information of which is to be used as the motion information of the target unit, among reconstructed neighboring units.

2) Merge Mode

As a scheme for deriving the motion information of a target block, there is merging. The term "merging" may mean the merging of the motion of multiple blocks. "Merging" may mean that the motion information of one block is also applied to other blocks. In other words, a merge mode may be a mode in which the motion information of the target block is derived from the motion information of a neighboring block.

When a merge mode is used, the encoding apparatus 100 may predict the motion information of a target block using the motion information of a spatial candidate and/or the motion information of a temporal candidate. The spatial candidate may include a reconstructed spatial neighboring block that is spatially adjacent to the target block. The spatially adjacent block may include a left adjacent block and an above adjacent block. The temporal candidate may include a col block. The terms "spatial candidate" and "spatial merge candidate" may be used to have the same meaning, and may be used interchangeably with each other. The terms "temporal candidate" and "temporal merge candidate" may be used to have the same meaning, and may be used interchangeably with each other.

The encoding apparatus 100 may acquire a prediction block via prediction. The encoding apparatus 100 may encode a residual block, which is the difference between the target block and the prediction block.

2-1) Creation of Merge Candidate List

When the merge mode is used, each of the encoding apparatus 100 and the decoding apparatus 200 may create a merge candidate list using the motion information of a spatial candidate and/or the motion information of a temporal candidate. The motion information may include 1) a motion vector, 2) a reference picture index, and 3) a reference direction. The reference direction may be unidirectional or bidirectional.

The merge candidate list may include merge candidates. The merge candidates may be motion information. In other words, the merge candidate list may be a list in which pieces of motion information are stored.

The merge candidates may be pieces of motion information of temporal candidates and/or spatial candidates. Further, the merge candidate list may include new merge candidates generated by a combination of merge candidates that are already present in the merge candidate list. In other words, the merge candidate list may include new motion information generated by a combination of pieces of motion information previously present in the merge candidate list.

Furthermore, the merge candidate list may include motion information of a zero vector. The zero vector may also be referred to as a "zero-merge candidate".

In other words, pieces of motion information in the merge candidate list may be at least one of 1) motion information of a spatial candidate, 2) motion information of a temporal candidate, 3) motion information generated by a combination of pieces of motion information previously present in the merge candidate list, and 4) a zero vector.

Motion information may include 1) a motion vector, 2) a reference picture index, and 3) a reference direction. The reference direction may also be referred to as an "inter-prediction indicator". The reference direction may be unidirectional or bidirectional. The unidirectional reference direction may indicate L0 prediction or L1 prediction.

The merge candidate list may be created before prediction in the merge mode is performed.

The number of merge candidates in the merge candidate list may be predefined. Each of the encoding apparatus 100 and the decoding apparatus 200 may add merge candidates to the merge candidate list depending on the predefined scheme and predefined priorities so that the merge candidate list has a predefined number of merge candidates. The merge candidate list of the encoding apparatus 100 and the merge candidate list of the decoding apparatus 200 may be made identical to each other using the predefined scheme and the predefined priorities.

Merging may be applied on a CU basis or a PU basis. When merging is performed on a CU basis or a PU basis, the encoding apparatus 100 may transmit a bitstream including predefined information to the decoding apparatus 200. For example, the predefined information may contain 1) information indicating whether to perform merging for individual block partitions, and 2) information about a block with which merging is to be performed, among blocks that are spatial candidates and/or temporal candidates for the target block.

2-2) Search for Motion Vector that Uses Merge Candidate List

The encoding apparatus 100 may determine merge candidates to be used to encode a target block. For example, the encoding apparatus 100 may perform prediction on the target block using merge candidates in the merge candidate list, and may generate residual blocks for the merge candidates. The encoding apparatus 100 may use a merge candidate that incurs the minimum cost in prediction and in the encoding of residual blocks to encode the target block.

Further, the encoding apparatus 100 may determine whether to use a merge mode to encode the target block.

2-3) Transmission of Inter-Prediction Information

The encoding apparatus 100 may generate a bitstream that includes inter-prediction information required for inter prediction. The encoding apparatus 100 may generate entropy-encoded inter-prediction information by performing entropy encoding on inter-prediction information, and may transmit a bitstream including the entropy-encoded inter-prediction information to the decoding apparatus 200. Through the bitstream, the entropy-encoded inter-prediction information may be signaled to the decoding apparatus 200 by the encoding apparatus 100.

The decoding apparatus 200 may perform inter prediction on the target block using the inter-prediction information of the bitstream.

The inter-prediction information may contain 1) mode information indicating whether a merge mode is used and 2) a merge index.

Further, the inter-prediction information may contain a residual signal.

The decoding apparatus 200 may acquire the merge index from the bitstream only when the mode information indicates that the merge mode is used.

The mode information may be a merge flag. The unit of the mode information may be a block. Information about the block may include mode information, and the mode information may indicate whether a merge mode is applied to the block.

The merge index may indicate a merge candidate to be used for the prediction of the target block, among merge candidates included in the merge candidate list. Alternatively, the merge index may indicate a block with which the target block is to be merged, among neighboring blocks spatially or temporally adjacent to the target block.

2-4) Inter Prediction of Merge Mode that Uses Inter-Prediction Information

The decoding apparatus 200 may perform prediction on the target block using the merge candidate indicated by the merge index, among merge candidates included in the merge candidate list.

The motion vector of the target block may be specified by the motion vector, reference picture index, and reference direction of the merge candidate indicated by the merge index.

3) Skip Mode

A skip mode may be a mode in which the motion information of a spatial candidate or the motion information of a temporal candidate is applied to the target block without change. Also, the skip mode may be a mode in which a residual signal is not used. In other words, when the skip mode is used, a reconstructed block may be a prediction block.

The difference between the merge mode and the skip mode lies in whether or not a residual signal is transmitted or used. That is, the skip mode may be similar to the merge mode except that a residual signal is not transmitted or used.

When the skip mode is used, the encoding apparatus 100 may transmit information about a block, the motion information of which is to be used as the motion information of the target block, among blocks that are spatial candidates or temporal candidates, to the decoding apparatus 200 through a bitstream. The encoding apparatus 100 may generate entropy-encoded information by performing entropy encoding on the information, and may signal the entropy-encoded information to the decoding apparatus 200 through a bitstream.

Further, when the skip mode is used, the encoding apparatus 100 may not transmit other syntax information, such as an MVD, to the decoding apparatus 200. For example, when the skip mode is used, the encoding apparatus 100 may not signal a syntax element related to at least one of an MVC, a coded block flag, and a transform coefficient level to the decoding apparatus 200.

3-1) Creation of Merge Candidate List

The skip mode may also use a merge candidate list. In other words, a merge candidate list may be used both in the merge mode and in the skip mode. In this aspect, the merge candidate list may also be referred to as a "skip candidate list" or a "merge/skip candidate list".

Alternatively, the skip mode may use an additional candidate list different from that of the merge mode. In this case, in the following description, a merge candidate list and a merge candidate may be replaced with a skip candidate list and a skip candidate, respectively.

The merge candidate list may be created before prediction in the skip mode is performed.

3-2) Search for Motion Vector that Uses Merge Candidate List

The encoding apparatus 100 may determine the merge candidates to be used to encode a target block. For example, the encoding apparatus 100 may perform prediction on the target block using the merge candidates in a merge candidate list. The encoding apparatus 100 may use a merge candidate that incurs the minimum cost in prediction to encode the target block.

Further, the encoding apparatus 100 may determine whether to use a skip mode to encode the target block.

3-3) Transmission of Inter-Prediction Information

The encoding apparatus 100 may generate a bitstream that includes inter-prediction information required for inter prediction. The decoding apparatus 200 may perform inter prediction on the target block using the inter-prediction information of the bitstream.

The inter-prediction information may include 1) mode information indicating whether a skip mode is used, and 2) a skip index.

The skip index may be identical to the above-described merge index.

When the skip mode is used, the target block may be encoded without using a residual signal. The inter-prediction information may not contain a residual signal. Alternatively, the bitstream may not include a residual signal.

The decoding apparatus 200 may acquire a skip index from the bitstream only when the mode information indicates that the skip mode is used. As described above, a merge index and a skip index may be identical to each other. The decoding apparatus 200 may acquire the skip index from the bitstream only when the mode information indicates that the merge mode or the skip mode is used.

The skip index may indicate the merge candidate to be used for the prediction of the target block, among the merge candidates included in the merge candidate list.

3-4) Inter Prediction in Skip Mode that Uses Inter-Prediction Information

The decoding apparatus 200 may perform prediction on the target block using a merge candidate indicated by a skip index, among the merge candidates included in a merge candidate list.

The motion vector of the target block may be specified by the motion vector, reference picture index, and reference direction of the merge candidate indicated by the skip index.

4) Current Picture Reference Mode

The current picture reference mode may denote a prediction mode that uses a previously reconstructed region in a current picture to which a target block belongs.

A vector for specifying the previously reconstructed region may be defined. Whether the target block has been encoded in the current picture reference mode may be determined using the reference picture index of the target block.

A flag or index indicating whether the target block is a block encoded in the current picture reference mode may be signaled by the encoding apparatus 100 to the decoding apparatus 200. Alternatively, whether the target block is a block encoded in the current picture reference mode may be inferred through the reference picture index of the target block.

When the target block is encoded in the current picture reference mode, the current picture may be added to a fixed location or an arbitrary location in a reference picture list for the target block.

For example, the fixed location may be either a location where the reference picture index is 0 or the last location.

When the current picture is added to an arbitrary location in the reference picture list, an additional reference picture index indicating such an arbitrary location may be signaled by the encoding apparatus 100 to the decoding apparatus 200.

In the above-described AMVP mode, merge mode, and skip mode, motion information to be used for the prediction of a target block may be specified, among pieces of motion information in the list, using the index of the list.

In order to improve encoding efficiency, the encoding apparatus 100 may signal only the index of an element that incurs the minimum cost in inter prediction of the target block, among elements in the list. The encoding apparatus 100 may encode the index, and may signal the encoded index.

Therefore, the above-described lists (i.e. the prediction motion vector candidate list and the merge candidate list) must be able to be derived by the encoding apparatus 100 and the decoding apparatus 200 using the same scheme based on the same data. Here, the same data may include a reconstructed picture and a reconstructed block. Further, in order to specify an element using an index, the order of the elements in the list must be fixed.

Figure 9:
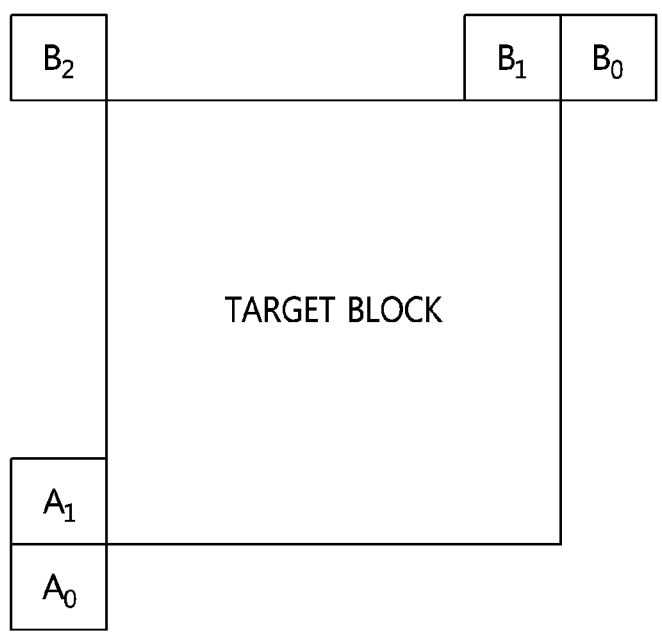
FIG. 9 illustrates spatial candidates according to an embodiment.

FIG. 9 illustrates spatial candidates according to an embodiment.

In FIG. 9, the locations of spatial candidates are illustrated.

The large block in the center of the drawing may denote a target block. Five small blocks may denote spatial candidates.

The coordinates of the target block may be (xP, yP), and the size of the target block may be represented by (nPSW, nPSH).

Spatial candidate $A_0$ may be a block adjacent to the below-left corner of the target block. $A_0$ may be a block that occupies pixels located at coordinates (xP−1, yP+nPSH+1).

Spatial candidate $A_1$ may be a block adjacent to the left of the target block. $A_1$ may be a lowermost block, among blocks adjacent to the left of the target block. Alternatively, $A_1$ may be a block adjacent to the top of $A_0$. $A_1$ may be a block that occupies pixels located at coordinates (xP−1, yP+nPSH).

Spatial candidate $B_0$ may be a block adjacent to the above-right corner of the target block. $B_0$ may be a block that occupies pixels located at coordinates (xP+nPSW+1, yP−1).

Spatial candidate $B_1$ may be a block adjacent to the top of the target block. $B_1$ may be a rightmost block, among blocks adjacent to the top of the target block. Alternatively, $B_1$ may be a block adjacent to the left of $B_0$. $B_1$ may be a block that occupies pixels located at coordinates (xP+nPSW, yP−1).

Spatial candidate $B_2$ may be a block adjacent to the above-left corner of the target block. $B_2$ may be a block that occupies pixels located at coordinates (xP−1, yP−1).

Determination of Availability of Spatial Candidate and Temporal Candidate

In order to include the motion information of a spatial candidate or the motion information of a temporal candidate in a list, it must be determined whether the motion information of the spatial candidate or the motion information of the temporal candidate is available.

Hereinafter, a candidate block may include a spatial candidate and a temporal candidate.

For example, the determination may be performed by sequentially applying the following steps 1) to 4).

Step 1) When a PU including a candidate block is out of the boundary of a picture, the availability of the candidate block may be set to "false". The expression "availability is set to false" may have the same meaning as "set to be unavailable".

Step 2) When a PU including a candidate block is out of the boundary of a slice, the availability of the candidate block may be set to "false". When the target block and the candidate block are located in different slices, the availability of the candidate block may be set to "false".

Step 3) When a PU including a candidate block is out of the boundary of a tile, the availability of the candidate block may be set to "false". When the target block and the candidate block are located in different tiles, the availability of the candidate block may be set to "false".

Step 4) When the prediction mode of a PU including a candidate block is an intra-prediction mode, the availability of the candidate block may be set to "false". When a PU including a candidate block does not use inter prediction, the availability of the candidate block may be set to "false".

Figure 10:
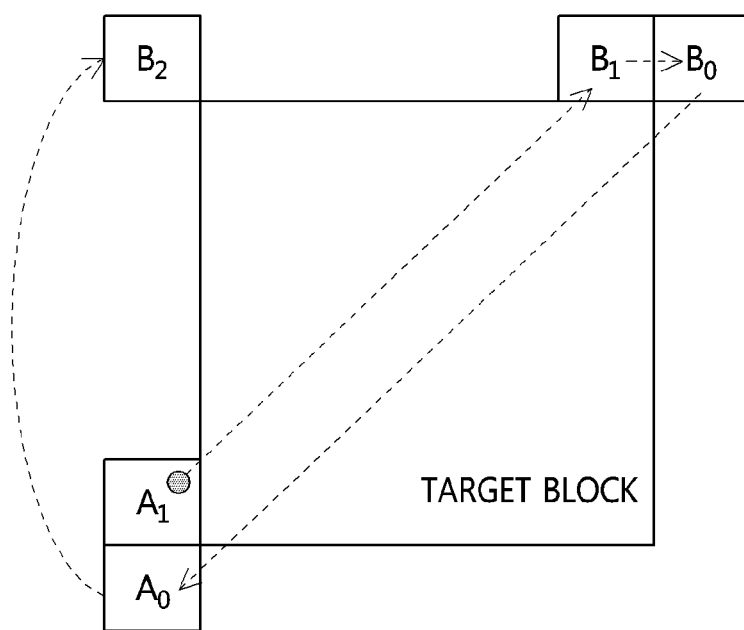
FIG. 10 illustrates the order of addition of motion information of spatial candidates to a merge list according to an embodiment.

FIG. 10 illustrates the order of addition of motion information of spatial candidates to a merge list according to an embodiment.

As shown in FIG. 10, when pieces of motion information of spatial candidates are added to a merge list, the order of $A_1, B_1, B_0, A_0$, and $B_2$ may be used. That is, pieces of motion information of available spatial candidates may be added to the merge list in the order of $A_1, B_1, B_0, A_0$, and $B_2$.

Method for Deriving Merge List in Merge Mode and Skip Mode

As described above, the maximum number of merge candidates in the merge list may be set. The set maximum number is indicated by "N". The set number may be transmitted from the encoding apparatus 100 to the decoding apparatus 200. The slice header of a slice may include N. In other words, the maximum number of merge candidates in the merge list for the target block of the slice may be set by the slice header. For example, the value of N may be basically 5.

Pieces of motion information (i.e., merge candidates) may be added to the merge list in the order of the following steps 1) to 4).

Step 1) Among spatial candidates, available spatial candidates may be added to the merge list. Pieces of motion information of the available spatial candidates may be added to the merge list in the order illustrated in FIG. 10. Here, when the motion information of an available spatial candidate overlaps other motion information already present in the merge list, the motion information may not be added to the merge list. The operation of checking whether the corresponding motion information overlaps other motion information present in the list may be referred to in brief as an "overlap check".

The maximum number of pieces of motion information that are added may be N.

Step 2) When the number of pieces of motion information in the merge list is less than N and a temporal candidate is available, the motion information of the temporal candidate may be added to the merge list. Here, when the motion information of the available temporal candidate overlaps other motion information already present in the merge list, the motion information may not be added to the merge list.

Step 3) When the number of pieces of motion information in the merge list is less than N and the type of a target slice is "B", combined motion information generated by combined bidirectional prediction (bi-prediction) may be added to the merge list.

The target slice may be a slice including a target block.

The combined motion information may be a combination of L0 motion information and L1 motion information. L0 motion information may be motion information that refers only to a reference picture list L0. L1 motion information may be motion information that refers only to a reference picture list L1.

In the merge list, one or more pieces of L0 motion information may be present. Further, in the merge list, one or more pieces of L1 motion information may be present.

The combined motion information may include one or more pieces of combined motion information. When the combined motion information is generated, L0 motion information and L1 motion information, which are to be used for generation, among the one or more pieces of L0 motion information and the one or more pieces of L1 motion information, may be predefined. One or more pieces of combined motion information may be generated in a predefined order via combined bidirectional prediction, which uses a pair of different pieces of motion information in the merge list. One of the pair of different pieces of motion information may be L0 motion information and the other of the pair may be L1 motion information.

For example, combined motion information that is added with the highest priority may be a combination of L0 motion information having a merge index of 0 and L1 motion information having a merge index of 1. When motion information having a merge index of 0 is not L0 motion information or when motion information having a merge index of 1 is not L1 motion information, the combined motion information may be neither generated nor added. Next, the combined motion information that is added with the next priority may be a combination of L0 motion information, having a merge index of 1, and L1 motion information, having a merge index of 0. Subsequent detailed combinations may conform to other combinations of video encoding/decoding fields.

Here, when the combined motion information overlaps other motion information already present in the merge list, the combined motion information may not be added to the merge list.

Step 4) When the number of pieces of motion information in the merge list is less than N, motion information of a zero vector may be added to the merge list.

The zero-vector motion information may be motion information for which the motion vector is a zero vector.

The number of pieces of zero-vector motion information may be one or more. The reference picture indices of one or more pieces of zero-vector motion information may be different from each other. For example, the value of the reference picture index of first zero-vector motion information may be 0. The value of the reference picture index of second zero-vector motion information may be 1.

The number of pieces of zero-vector motion information may be identical to the number of reference pictures in the reference picture list.

The reference direction of zero-vector motion information may be bidirectional. Both of the motion vectors may be zero vectors. The number of pieces of zero-vector motion information may be the smaller one of the number of reference pictures in the reference picture list L0 and the number of reference pictures in the reference picture list L1. Alternatively, when the number of reference pictures in the reference picture list L0 and the number of reference pictures in the reference picture list L1 are different from each other, a reference direction that is unidirectional may be used for a reference picture index that may be applied only to a single reference picture list.

The encoding apparatus 100 and/or the decoding apparatus 200 may sequentially add the zero-vector motion information to the merge list while changing the reference picture index.

When zero-vector motion information overlaps other motion information already present in the merge list, the zero-vector motion information may not be added to the merge list.

The order of the above-described steps 1) to 4) is merely exemplary, and may be changed. Further, some of the above steps may be omitted depending on predefined conditions.

Method for Deriving Prediction Motion Vector Candidate List in AMVP Mode

The maximum number of prediction motion vector candidates in a prediction motion vector candidate list may be predefined. The predefined maximum number is indicated by N. For example, the predefined maximum number may be 2.

Pieces of motion information (i.e. prediction motion vector candidates) may be added to the prediction motion vector candidate list in the order of the following steps 1) to 3).

Step 1) Available spatial candidates, among spatial candidates, may be added to the prediction motion vector candidate list. The spatial candidates may include a first spatial candidate and a second spatial candidate.

The first spatial candidate may be one of $A_0$, $A_1$, scaled $A_0$, and scaled $A_1$. The second spatial candidate may be one of $B_0$, $B_1$, $B_2$, scaled $B_0$, scaled $B_1$, and scaled $B_2$.

Pieces of motion information of available spatial candidates may be added to the prediction motion vector candidate list in the order of the first spatial candidate and the second spatial candidate. In this case, when the motion information of an available spatial candidate overlaps other motion information already present in the prediction motion vector candidate list, the motion information may not be added to the prediction motion vector candidate list. In other words, when the value of N is 2, if the motion information of a second spatial candidate is identical to the motion information of a first spatial candidate, the motion information of the second spatial candidate may not be added to the prediction motion vector candidate list.

The maximum number of pieces of motion information that are added may be N.

Step 2) When the number of pieces of motion information in the prediction motion vector candidate list is less than N and a temporal candidate is available, the motion information of the temporal candidate may be added to the prediction motion vector candidate list. In this case, when the motion information of the available temporal candidate overlaps other motion information already present in the prediction motion vector candidate list, the motion information may not be added to the prediction motion vector candidate list.

Step 3) When the number of pieces of motion information in the prediction motion vector candidate list is less than N, zero-vector motion information may be added to the prediction motion vector candidate list.

The zero-vector motion information may include one or more pieces of zero-vector motion information. The reference picture indices of the one or more pieces of zero-vector motion information may be different from each other.

The encoding apparatus 100 and/or the decoding apparatus 200 may sequentially add pieces of zero-vector motion information to the prediction motion vector candidate list while changing the reference picture index.

When zero-vector motion information overlaps other motion information already present in the prediction motion vector candidate list, the zero-vector motion information may not be added to the prediction motion vector candidate list.

The description of the zero-vector motion information, made above in connection with the merge list, may also be applied to zero-vector motion information. A repeated description thereof will be omitted.

The order of the above-described steps 1) to 3) is merely exemplary, and may be changed. Further, some of the steps may be omitted depending on predefined conditions.

Figure 11:
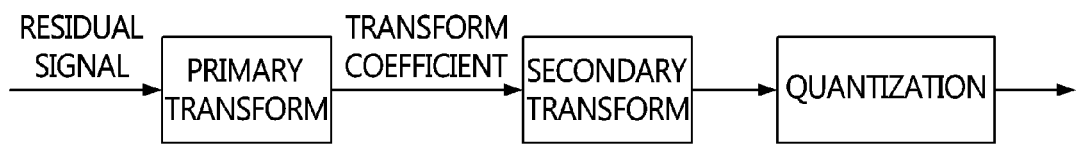
FIG. 11 illustrates a transform and quantization process according to an example.

FIG. 11 illustrates a transform and quantization process according to an example.

As illustrated in FIG. 11, quantized levels may be generated by performing a transform and/or quantization process on a residual signal.

A residual signal may be generated as the difference between an original block and a prediction block. Here, the prediction block may be a block generated via intra prediction or inter prediction.

The transform may include at least one of a primary transform and a secondary transform. A transform coefficient may be generated by performing the primary transform on the residual signal, and a secondary transform coefficient may be generated by performing the secondary transform on the transform coefficient.

The primary transform may be performed using at least one of predefined multiple transform methods. For example, the predefined multiple transform methods may include a Discrete Cosine Transform (DCT), a Discrete Sine Transform (DST), a Karhunen-Loeve Transform (KLT), etc.

The secondary transform may be performed on the transform coefficient generated by performing the primary transform.

Transform methods applied to the primary transform and/or the secondary transform may be determined based on at least one of coding parameters for a target block and/or a neighboring block. Alternatively, transform information indicating transform methods may be signaled by the encoding apparatus to the decoding apparatus 200.

The quantized levels may be generated by performing quantization on the result, generated by performing the primary transform and/or the secondary transform, or on the residual signal.

The quantized levels may be scanned based on at least one of up-right diagonal scanning, vertical scanning, and horizontal scanning, depending on at least one of an intra-prediction mode, a block size, and a block form.

For example, coefficients may be changed to 1D vector forms by scanning coefficients of blocks using up-right diagonal scanning. Alternatively, depending on the size of a transform block and/or an intra-prediction mode, vertical scanning, which scans 2D block-format coefficients in a column direction, or horizontal scanning, which scans 2D block-format coefficients in a row direction, may be used instead of the up-right diagonal scanning.

The scanned quantized levels may be entropy-encoded, and a bitstream may include the entropy-encoded quantized levels.

The decoding apparatus 200 may generate quantized levels via entropy decoding on the bitstream. The quantized levels may be aligned in the form of a 2D block via inverse scanning. Here, as the method of inverse scanning, at least one of up-right diagonal scanning, vertical scanning, and horizontal scanning may be performed.

Dequantization may be performed on the quantized levels. A secondary inverse transform may be performed on the result generated by performing dequantization depending on whether to perform the secondary inverse transform. Further, a primary inverse transform may be performed on the result generated by performing the secondary inverse transform depending on whether the primary inverse transform is to be performed. A reconstructed residual signal may be generated by performing the primary inverse transform on the result generated by performing the secondary inverse transform.

Figure 12:
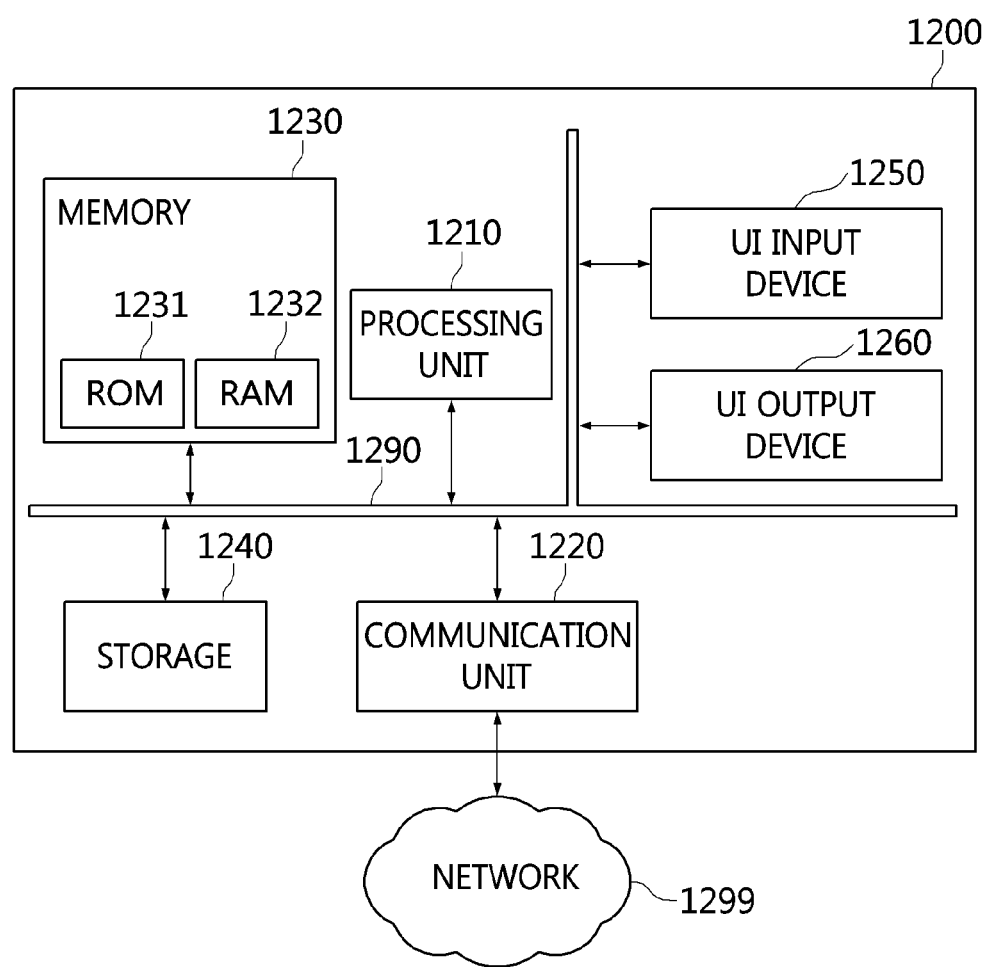
FIG. 12 is a configuration diagram of an encoding apparatus according to an embodiment.

FIG. 12 is a configuration diagram of an encoding apparatus according to an embodiment.

An encoding apparatus 1200 may correspond to the above-described encoding apparatus 100.

The encoding apparatus 1200 may include a processing unit 1210, memory 1230, a user interface (UI) input device 1250, a UI output device 1260, and storage 1240, which communicate with each other through a bus 1290. The encoding apparatus 1200 may further include a communication unit 1220 coupled to a network 1299.

The processing unit 1210 may be a Central Processing Unit (CPU) or a semiconductor device for executing processing instructions stored in the memory 1230 or the storage 1240. The processing unit 1210 may be at least one hardware processor.

The processing unit 1210 may generate and process signals, data or information that are input to the encoding apparatus 1200, are output from the encoding apparatus 1200, or are used in the encoding apparatus 1200, and may perform examination, comparison, determination, etc. related to the signals, data or information. In other words, in embodiments, the generation and processing of data or information and examination, comparison and determination related to data or information may be performed by the processing unit 1210.

The processing unit 1210 may include an inter-prediction unit 110, an intra-prediction unit 120, a switch 115, a subtractor 125, a transform unit 130, a quantization unit 140, an entropy encoding unit 150, a dequantization unit 160, an inverse transform unit 170, an adder 175, a filter unit 180, and a reference picture buffer 190.

At least some of the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 120 may be program modules, and may communicate with an external device or system. The program modules may be included in the encoding apparatus 1200 in the form of an operating system, an application program module, or other program modules.

The program modules may be physically stored in various types of well-known storage devices. Further, at least some of the program modules may also be stored in a remote storage device that is capable of communicating with the encoding apparatus 1200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the encoding apparatus 1200.

The processing unit 1210 may execute instructions or code in the inter-prediction unit 110, the intra-prediction unit 120, the switch 115, the subtractor 125, the transform unit 130, the quantization unit 140, the entropy encoding unit 150, the dequantization unit 160, the inverse transform unit 170, the adder 175, the filter unit 180, and the reference picture buffer 120.

A storage unit may denote the memory 1230 and/or the storage 1240. Each of the memory 1230 and the storage 1240 may be any of various types of volatile or nonvolatile storage media. For example, the memory 1230 may include at least one of Read-Only Memory (ROM) 1231 and Random Access Memory (RAM) 1232.

The storage unit may store data or information used for the operation of the encoding apparatus 1200. In an embodiment, the data or information of the encoding apparatus 1200 may be stored in the storage unit.

For example, the storage unit may store pictures, blocks, lists, motion information, inter-prediction information, bitstreams, etc.

The encoding apparatus 1200 may be implemented in a computer system including a computer-readable storage medium.

The storage medium may store at least one module required for the operation of the encoding apparatus 1200. The memory 1230 may store at least one module, and may be configured such that the at least one module is executed by the processing unit 1210.

Functions related to communication of the data or information of the encoding apparatus 1200 may be performed through the communication unit 1220.

For example, the communication unit 1220 may transmit a bitstream to a decoding apparatus 1300, which will be described later.

Figure 13:
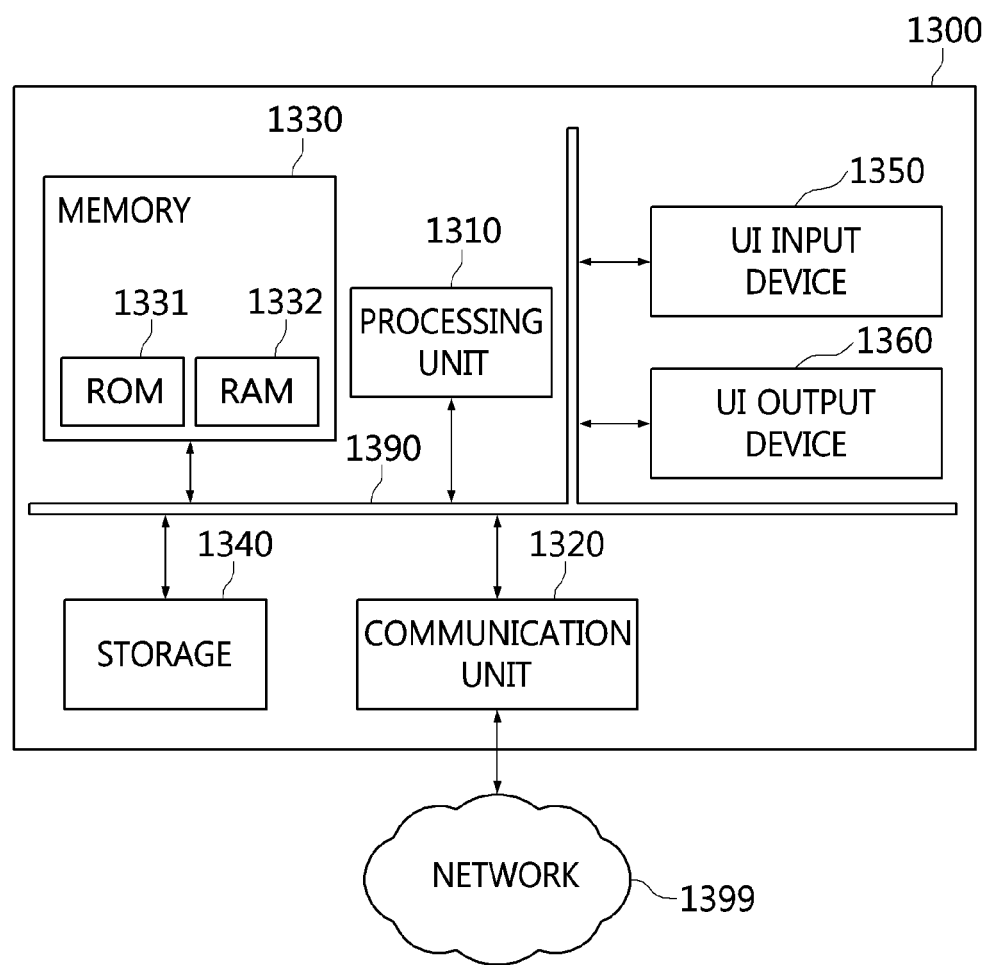
FIG. 13 is a configuration diagram of a decoding apparatus according to an embodiment.

FIG. 13 is a configuration diagram of a decoding apparatus according to an embodiment.

The decoding apparatus 1300 may correspond to the above-described decoding apparatus 200.

The decoding apparatus 1300 may include a processing unit 1310, memory 1330, a user interface (UI) input device 1350, a UI output device 1360, and storage 1340, which communicate with each other through a bus 1390. The decoding apparatus 1300 may further include a communication unit 1320 coupled to a network 1399.

The processing unit 1310 may be a Central Processing Unit (CPU) or a semiconductor device for executing processing instructions stored in the memory 1330 or the storage 1340. The processing unit 1310 may be at least one hardware processor.

The processing unit 1310 may generate and process signals, data or information that are input to the decoding apparatus 1300, are output from the decoding apparatus 1300, or are used in the decoding apparatus 1300, and may perform examination, comparison, determination, etc.

related to the signals, data or information. In other words, in embodiments, the generation and processing of data or information and examination, comparison and determination related to data or information may be performed by the processing unit 1310.

The processing unit 1310 may include an entropy decoding unit 210, a dequantization unit 220, an inverse transform unit 200, an intra-prediction unit 240, an inter-prediction unit 250, an adder 255, a filter unit 260, and a reference picture buffer 270.

At least some of the entropy decoding unit 210, the dequantization unit 220, the inverse transform unit 200, the intra-prediction unit 240, the inter-prediction unit 250, the adder 255, the filter unit 260, and the reference picture buffer 270 of the decoding apparatus 200 may be program modules, and may communicate with an external device or system. The program modules may be included in the decoding apparatus 1300 in the form of an operating system, an application program module, or other program modules.

The program modules may be physically stored in various types of well-known storage devices. Further, at least some of the program modules may also be stored in a remote storage device that is capable of communicating with the decoding apparatus 1300.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 1300.

The processing unit 1310 may execute instructions or code in the entropy decoding unit 210, the dequantization unit 220, the inverse transform unit 200, the intra-prediction unit 240, the inter-prediction unit 250, the adder 255, the filter unit 260, and the reference picture buffer 270.

A storage unit may denote the memory 1330 and/or the storage 1340. Each of the memory 1330 and the storage 1340 may be any of various types of volatile or nonvolatile storage media. For example, the memory 1330 may include at least one of ROM 1331 and RAM 1332.

The storage unit may store data or information used for the operation of the decoding apparatus 1300. In an embodiment, the data or information of the decoding apparatus 1300 may be stored in the storage unit.

For example, the storage unit may store pictures, blocks, lists, motion information, inter-prediction information, bitstreams, etc.

The decoding apparatus 1300 may be implemented in a computer system including a computer-readable storage medium.

The storage medium may store at least one module required for the operation of the decoding apparatus 1300. The memory 1330 may store at least one module, and may be configured such that the at least one module is executed by the processing unit 1310.

Functions related to communication of the data or information of the decoding apparatus 1300 may be performed through the communication unit 1320.

For example, the communication unit 1320 may receive a bitstream from the encoding apparatus 1200.

Figure 14:
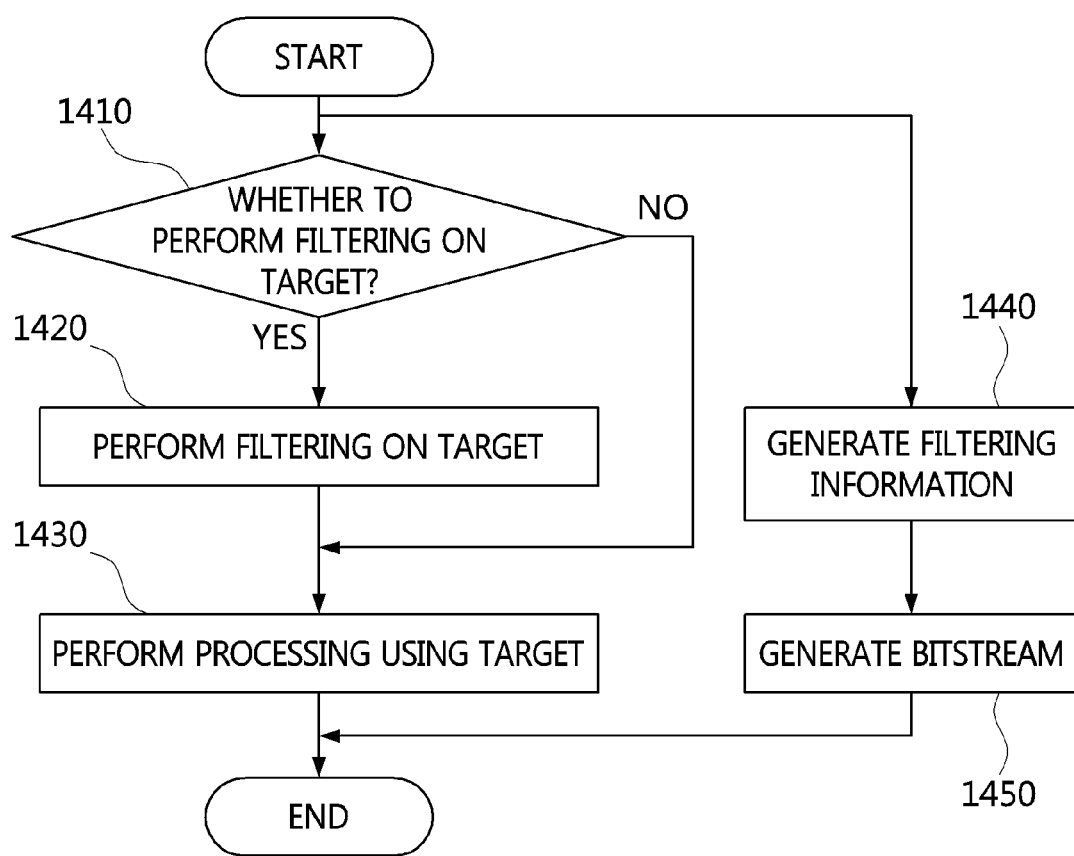
FIG. 14 is a flowchart illustrating a filtering method performed by the encoding apparatus according to an embodiment.

FIG. 14 is a flowchart illustrating a filtering method performed by the encoding apparatus according to an embodiment.

At step 1410, the processing unit 1210 of the encoding apparatus 1200 may determine whether to perform filtering on a target.

If it is determined to perform filtering on the target, step 1420 may be performed.

If it is determined not to perform filtering on the target, step 1430 may be performed.

At step 1420, the processing unit 1210 may perform filtering on the target.

At step 1430, the processing unit 1210 may perform processing using the target.

Here, if, at step 1410, it is determined to perform filtering on the target, and step 1420 is performed, the processing unit 1210 may perform predetermined processing using the target to which filtering is applied.

Here, if, at step 1410, it is determined not to perform filtering on the target, and step 1420 is not performed, the processing unit 1210 may perform predetermined processing using the target to which filtering is not applied.

At step 1440, the processing unit 1210 may generate filtering information.

At step 1450, the processing unit 1210 may generate a bitstream including the filtering information. The filtering information included in the bitstream may indicate whether filtering has been performed on the target in decoding of the target or decoding using the target. In other words, the filtering information may be information used to determine whether to perform filtering on the target in the encoding apparatus 1200 and/or the decoding apparatus 1300.

The communication unit 1220 may transmit the bitstream to the decoding apparatus 1300.

Figure 15:
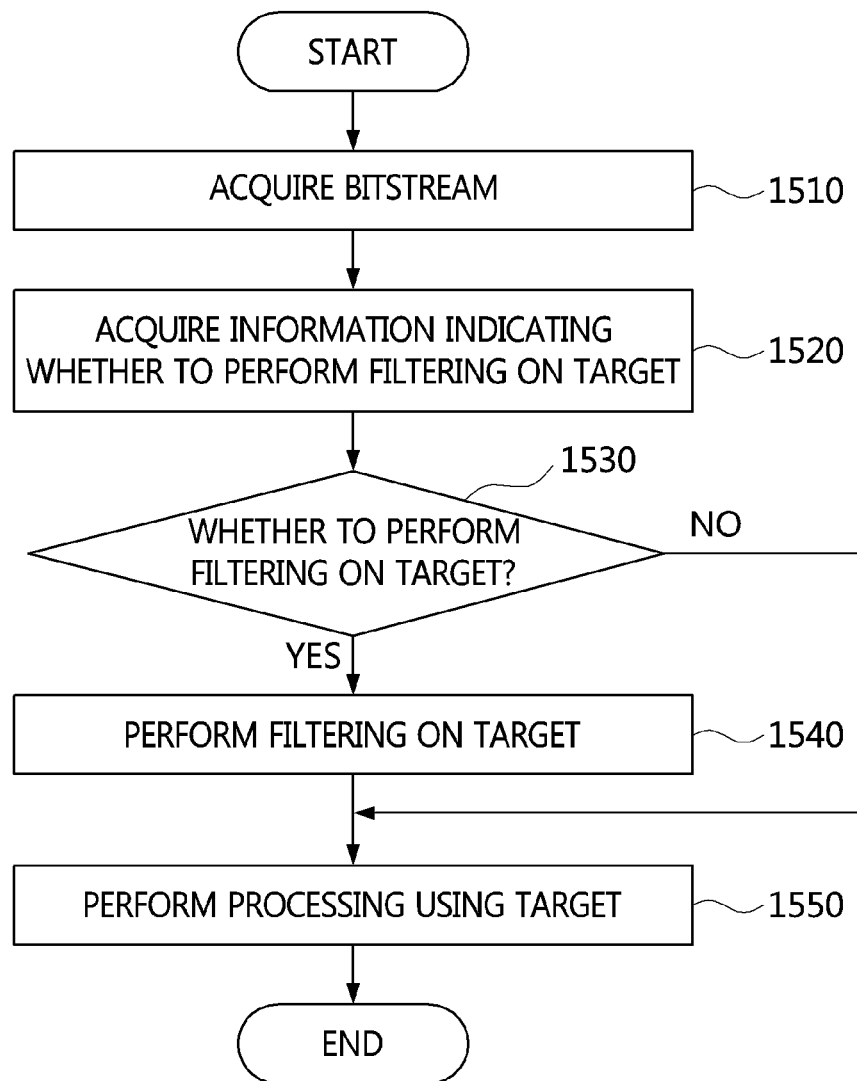
FIG. 15 is a flowchart illustrating a filtering method performed by the decoding apparatus according to an embodiment.

FIG. 15 is a flowchart illustrating a filtering method performed by the decoding apparatus according to an embodiment.

At step 1510, the communication unit 1320 of the decoding apparatus 1300 may receive a bitstream from the encoding apparatus 1200.

The processing unit 1310 of the decoding apparatus 1300 may acquire the bitstream.

At step 1520, the processing unit 1310 may acquire filtering information from the bitstream.

The filtering information may indicate whether filtering is to be performed on a target.

At step 1530, the processing unit 1310 may determine, using the filtering information, whether to perform filtering on the target.

If it is determined to perform filtering on the target, step 1540 may be performed.

If it is determined not to perform filtering on the target, step 1550 may be performed.

At step 1540, the processing unit 1310 may perform filtering on the target.

At step 1550, the processing unit 3210 may perform processing using the target.

Here, if, at step 1530, it is determined to perform filtering on the target, and then step 1540 is performed, the processing unit 1310 may perform predetermined processing using the target to which filtering is applied.

Here, if, at step 1530, it is determined not to perform filtering on the target, and then step 1540 is not performed, the processing unit 1310 may perform predetermined processing using the target to which filtering is not applied.

Reference Sample Filtering for Improving Accuracy of Intra Prediction

Operations in an embodiment, which will be described below, may be related to intra prediction performed by each of the encoding apparatus 1200 and the decoding apparatus 1300.

In the encoding apparatus 1200, the above operations may be performed by the processing unit 1210 or the intra-prediction unit 120. In the decoding apparatus 1300, the above operations may be performed by the processing unit 1310 or the intra-prediction unit 240. Hereinafter, the processing unit may denote the processing unit 1210, the intra-prediction unit 120, the processing unit 1310, and the intra-prediction unit 240.

Referring back to FIG. 7, intra prediction may be performed using samples (or pixels) of a reconstructed neighboring block adjacent to a target block, as described above with reference to FIG. 7. Such samples used for intra prediction may be defined as reference samples.

A sample located at coordinates (x, y) in a target block $B_{intra}$ having an N×N size to which intra prediction is applied may be defined as $B_{intra}(x, y)$. Here, multiple reference samples used for intra prediction may include 1) $B_{intra}(-1, -1)$, 2) 2N samples present in a rightward direction from $B_{intra}(-1, -1)$, and 3) 2N samples present in a downward direction from $B_{intra}(-1, -1)$. Intra prediction for $B_{intra}$ may be performed using the reference samples.

Referring back to FIG. 6, intra prediction may be performed in 35 intra-prediction modes. The intra-prediction modes may include two non-directional modes and 33 directional modes. The two non-directional modes may include a DC mode and a planar mode. The 33 directional modes may include modes #2 to #34.

In the DC mode, the average of reference samples adjacent to the left of the target block $B_{intra}$ and reference samples adjacent to the top of the target block may be used as a prediction value for all pixels in the target block $B_{intra}$.

The following Equation 2 shows an example of a prediction method in the DC mode.

$$B_{intra}(x, y) = \left(\sum_{j=0}^{N-1} B_{intra}(-1, j) + \sum_{i=0}^{N-1} B_{intra}(i, -1)\right) >> \log_2 2N, \; 0 \leq x, y \leq N-1$$ [Equation 2]

In the planar mode, the processing unit may use the average of horizontal linear prediction values and vertical linear prediction values that use reference samples $B_{intra}(-1, -1)$, $B_{intra}(-1, 2N-1)$, and $B_{intra}(2N-1, -1)$ so as to predict each pixel in the target block.

When the size of the prediction block $B_{intra}$ is N×N and the coordinates of the uppermost-leftmost corner of $B_{intra}$ are (0, 0), $B_{intra}(x, y)$ may be a reference sample located at coordinates (x, y).

The following Equation 3 may show an example of a prediction method in the planar mode.

$B_{intra}(x,y) = LP_{Hor}(x,y) LP_{Ver}(x,y), \; 0 \leq x,y \leq N-1$ $LP_{Hor}(x,y) = (N-1-x) B_{intra}(-1,y) + (x+1) B_{intra}(N,-1)) >> \log_2 2N$ $LP_{Ver}(x,y) = (N-1-y) B_{intra}(x,-1) + (y+1) B_{intra}(-1,N)) >> \log_2 2N$ [Equation 3]

At steps 1430 and 1550, in intra prediction using directional modes, the processing unit may copy the reference samples to respective locations of pixels in the target block depending on directions defined in the intra-prediction mode. FIG. 6 illustrates prediction directions depending on the intra-prediction mode.

At steps 1420 and 1540, the processing unit may perform filtering on reference samples to improve the accuracy of intra prediction before intra prediction using the reference samples is performed. Below, reference sample filtering methods will be described.

First Reference Sample Filtering Method

In the embodiments described above with reference to FIGS. 14 and 15, the target to be filtered may be a reference sample. There may be one or more reference samples.

The processing unit may determine whether to perform filtering on each reference sample before intra prediction is performed.

Filtering information may include the size and the prediction mode of a target block.

At steps 1410 and 1530, the processing unit may determine, based on one or more of the size, prediction mode, and type of the target block, whether to perform filtering on each reference sample.

As the size of the target block is smaller, the processing unit may limit filtering on the reference sample, whereas as the size of the target block is larger, the processing unit may use filtering on the reference sample.

For example, when the size of the target block is less than or equal to a predefined size, the processing unit may determine not to perform filtering on the reference sample, whereas when the size of the target block is greater than the predefined size, the processing unit may determine to perform filtering on the reference sample.

As the prediction mode of the target block is closer to any one of a horizontal mode 10 and a vertical mode 26, the processing unit may limit filtering on the reference sample. When the prediction mode of the target block is closer to diagonal modes 2, 18, and 34, the processing unit may use filtering on the reference sample.

For example, the length of a horizontal line/vertical line may be the smallest value, among 1) differences between the number of the prediction mode of the target block and the number 10 of the horizontal mode and 2) differences between the number of the prediction mode of the target block and the number 26 of the vertical mode. The length of a diagonal line may be the smallest value, among differences between the number of the prediction mode of the target block and the numbers 2, 18, and 34 of respective diagonal modes. When the difference between the length of the horizontal line/vertical line and the length of the diagonal line is less than or equal to a predefined value, the processing unit may determine not to perform filtering on the reference sample, whereas when the difference between the length of the horizontal line/vertical line and the length of the diagonal line is greater than the predefined value, the processing unit may determine to perform filtering on the reference sample.

When filtering on each reference sample is performed, the accuracy of intra prediction may be improved as the size and prediction mode of the target block are taken into consideration.

The processing unit may determine whether to perform filtering on each reference sample based on the type of target block. For example, when the target block is a chroma component block, the processing unit may determine not to perform filtering on the reference sample. Alternatively, when the target block is a luma component block, the processing unit may determine not to perform filtering on the reference sample.

The following Table 1 indicates the conditions under which filtering on reference samples is to be performed according to an example.

TABLE 1

| Size of target block | Prediction mode in which filtering on reference sample is performed | |
|---|---|---|
| | Luma component | Chroma component |
| 4 × 4 | — | — |
| 8 × 8 | 0, 2, 18, 34 | — |
| 16 × 16 | 0, 2~8, 12~24, 28~34 | — |
| 32 × 32 or more | 0, 2~9, 11~25, 27~34 | — |

As indicated in Table 1, the larger the size of the target block, the greater the number of prediction modes in which filtering on a reference sample is used. Alternatively, as the prediction mode of a reference sample is farther away from the vertical mode or the horizontal mode, filtering on the reference sample may also be used in a smaller target block.

There may be multiple reference samples. Even if it is generally determined to perform filtering on reference samples, whether to perform filtering may be determined differently for respective reference samples.

The processing unit may determine whether to perform filtering on reference samples based on the following Equation 4. For example, the processing unit may perform filtering on reference samples when Equation 4 is satisfied for the target block which meets the requirements of Table 1.

$N \geq 32$

&&

$|B_{intra}(-1,-1)+B_{intra}(2N-1,-1)-2B_{intra}(N-1,-1)| < 2^{bitDepth-5}$

&&

$|B_{intra}(-1,-1)+B_{intra}(-1,2N-1)-2B_{intra}(-1,N-1)| < 2^{bitDepth-5}$ [Equation 4]

In Equation 4, bitDepth may denote the bit depth of a target image including the target block. The value of the bit depth may be 8 or more, or may be 10 or more. The processing unit may determine, based on the bit depth of the target image, whether to perform filtering on each reference sample.

The value of Equation 44 may be true when the size of the target block is equal to or greater than a predefined size (e.g. 32×32) and the reference samples of the target block are smooth. The value of Equation 44 may be false when the size of the target block is less than the predefined size (e.g. 32×32) or when the reference samples of the target block are not smooth.

At steps 1420 and 1540, a filter for performing filtering may be 1) a strong filter or 2) a weak filter.

The strong filter may include a linear interpolation filter. The linear interpolation filter may be a filter that uses the value of the upper-rightmost reference sample $B_{intra}$ (2N−1, −1) and the value of the lowermost-left reference sample $B_{intra}$(−1, 2N−1), among multiple reference samples.

Filter coefficients of the weak filter may be [1, 2, 1].

The processing unit may selectively perform filtering on a reference sample, which satisfies predefined conditions, among multiple reference samples for the target block. Here, the predefined conditions may include conditions related to the attributes of the target block, the attributes of the target image, and the attributes of a reference sample.

For example, the attributes of the target block may include the size of the target block, the prediction mode of the target block, etc.

For example, the attributes of the target image may include the bit depth of the target image.

For example, the attributes of the reference sample may include 1) the location of the reference sample relative to the target block, 2) the value of the reference sample, and 3) information indicating whether the target block and the reference sample are included in the same unit (e.g. a CU, a PU, a slice, a tile, or the like).

Second Reference Sample Filtering Method

Figure 16:
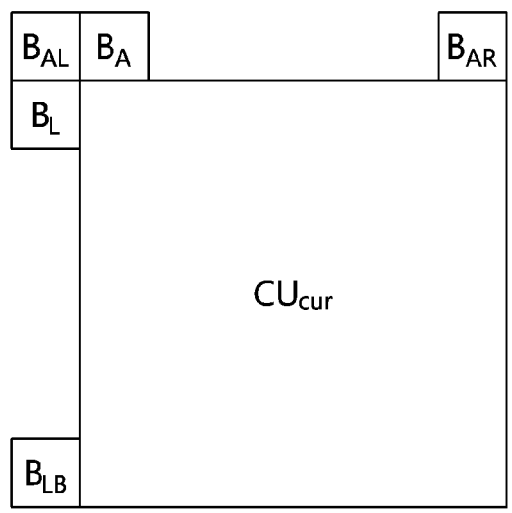
FIG. 16 illustrates neighboring blocks for coding a filtering indicator according to an example.

FIG. 16 illustrates neighboring blocks for coding a filtering indicator according to an example.

Filtering on a reference sample may be determined for each CU. That is, the processing unit may determine, for each of CUs in an image or a video, whether to perform filtering on the reference sample of the CU.

The target of FIGS. 12 and 13 may be reference samples used for encoding/decoding of a target CU which is the target to be currently processed.

A single target CU may include multiple PUs.

In an embodiment, at step 1410, for each of the multiple PUs, the processing unit of the encoding apparatus 1200 may individually perform filtering-independent prediction, which uses a reference sample to which filtering is not applied, and filtering-applied prediction, which uses a reference sample to which filtering is applied. The processing unit of the encoding apparatus 1200 may individually calculate the cost of the filtering-independent prediction and the cost of the filtering-applied prediction, and may compare the cost of the filtering-independent prediction with the cost of the filtering-applied prediction. Here, the cost may be calculated based on a reconstructed block and an original block. The reconstructed block may be a block generated through the transform, quantization, dequantization, and inverse transform of a prediction block generated via prediction. The original block may be a block in an original image or an input image.

The processing unit of the encoding apparatus 1200 may determine whether to perform filtering on the reference sample of the target CU by comparing the costs of filtering-independent predictions and filtering-applied predictions of multiple PUs in the target CU with each other.

At step 1440, the filtering information may be a filtering indicator which is information (directly) indicating whether to perform filtering on the reference sample of the target CU. For example, the filtering indicator may be a flag designated as "unFiltRefFlag".

The filtering indicator may be encoded and/or decoded for each CU. The filtering indicator may be one of syntax elements of the CU.

For example, the value of the filtering indicator may be a first predefined value (e.g. true) or a second predefined value (e.g. false). The first predefined value may be a value indicating that filtering on the reference sample of the target CU is to be performed. The second predefined value may be a value indicating that filtering on the reference sample of the target CU is not to be performed. When the value of the filtering indicator is the first predefined value, filtering on the reference sample of the target CU may be performed. When the value of the filtering indicator is the second predefined value, filtering on the reference sample of the target CU may not be performed.

When filtering on the reference sample of the target CU is performed, the processing unit may set the value of the filtering indicator to the first predefined value. When filtering on the reference sample of the target CU is not performed, the processing unit may set the value of the filtering indicator to the second predefined value.

The filtering indicator may be signaled to the decoding apparatus 1300 at steps 1450, 1510, and 1520.

At step 1530, the processing unit may perform filtering on the reference sample of the target CU, or may omit filtering on the reference sample of the target CU depending on the value of the filtering indicator.

When the value of the filtering indicator is the first predefined value, the processing unit may determine to perform filtering on the reference sample of the target CU. When the value of the filtering indicator is the second predefined value, the processing unit may determine not to perform filtering on the reference sample of the target CU.

In an embodiment, the filtering indicator may be coded based on Context-Adaptive Binary Arithmetic Coding (CABAC). The context model of CABAC may be decided on based on one or more of information about directions between adjacent CUs and similarity between the complexities of adjacent CUs.

In FIG. 16, the locations of neighboring blocks adjacent to $CU_{cur}$ are illustrated. $CU_{cur}$ may denote a target CU.

$B_{AL}$ may be a block adjacent to the above-left corner of the target CU. $B_A$ may be the leftmost block, among above blocks adjacent to the top of the target CU. $B_{AR}$ may be the rightmost block, among the above blocks adjacent to the top of the target CU. $B_L$ may be the uppermost block, among blocks adjacent to the left of the target CU. $B_{AR}$ may be the lowermost block, among blocks adjacent to the left of the CU.

For example, when prediction using the reference sample to which filtering is applied is performed on a neighboring block adjacent to the target CU, it may be considered that the probability of prediction being more accurate is high when prediction using the reference sample to which filtering is applied is also performed on the target CU. Alternatively, when prediction using a reference sample to which filtering is not applied is performed on a neighboring block adjacent to the target CU, it may be considered that the probability of prediction being more accurate is high when prediction using the reference sample to which filtering is not applied is also performed on the target CU.

At step 1440, the processing unit may generate a filtering indicator based on information about neighboring blocks adjacent to the target CU. Therefore, whether to perform filtering on the reference sample of the target CU may be determined based on the information about the neighboring blocks adjacent to the target CU.

For example, the processing unit may generate a filtering indicator based on the filtering indicators of the neighboring blocks adjacent to the target CU.

For example, when filtering is applied to a neighboring block adjacent to the target CU, the processing unit may set the value of the filtering indicator of the target CU so that filtering is applied to the target CU. When filtering is not applied to a neighboring block adjacent to the target CU, the processing unit may set the value of the filtering indicator of the target CU so that filtering is not applied to the target CU. Here, the adjacent neighboring block may be at least one of the above-described multiple neighboring blocks, and may be at least one block selected from among the above-described multiple neighboring blocks based on predefined conditions.

The initial context information of the filtering indicator of the target CU may be set according to the following Equation 5:

$$\text{Context Index} = (\text{UnfilteredRefFlag}(X) == 1)?1:0, X \in \{B_{AL}, B_A, B_L, B_{AR}, B_{LB}\} \qquad \text{[Equation 5]}$$

In Equation 5, UnfilteredRefFlag(X) may denote the filtering indicator of X.

Further, the initial context information of the filtering indicator of the target CU may be given by the following Equation 6:

$$\text{ContextModel}[0] = \{MPS == 0, MPS\_PROBABILITY == 0.93\}$$

$$\text{ContextModel}[1] = \{MPS == 1, MPS\_PROBABILITY == 0.81\} \qquad \text{[Equation 6]}$$

At step 1450, the processing unit may encode the filtering indicator, and may generate a bitstream including the encoded filtering indicator.

At steps 1420 and 1540, the processing unit may perform filtering on the reference sample using the above-described filter, that is, 1) a strong filter or 2) a weak filter.

The processing unit may determine whether to use a strong filter or a weak filter based on the following Equation 7. For example, when the following Equation is satisfied, the processing unit may perform filtering on the reference sample using the strong filter. When the following Equation is not satisfied, the processing unit may perform filtering on the reference sample using the weak filter.

$$|B_{intra}(1,-1) + B_{intra}(2N-1,-1) - 2B_{intra}(N-1,-1)| < 2^{bitDepth-5}$$

&&

$$|B_{intra}(-1,-1) + B_{intra}(1,2N-1) - 2B_{intra}(-1,N-1)| < 2^{bitDepth-5} \qquad \text{[Equation 7]}$$

For example, the value of Equation 7 may be true when the reference sample of the target block is smooth (regardless of the size of the target block). The value of Equation 7 may be false when the reference sample of the target block is not smooth. In other words, regardless of the size of the target block or the prediction block, when it is determined that the reference sample of the target CU is smooth, the processing unit may perform filtering that uses a strong filter on the reference sample. Further, regardless of the size of the target block or the prediction block, when it is determined that the reference sample of the target CU is not smooth, the processing unit may perform filtering that uses a weak filter on the reference sample.

At steps 1420 and 1540, the processing unit may check conditions related to the application of filtering to multiple reference samples of the target CU. Depending on whether the conditions are satisfied, the processing unit may not apply filtering or filtering-related processing to some of the multiple reference samples of the target CU.

The processing unit may omit a linearity check for some of the reference samples depending on the prediction mode of the target block when filtering that uses a specified filter is applied. Here, the specified filter may be a strong filter, and some of the reference samples may be at least one of the column of reference samples to the left of the target block and the row of reference samples above the target block.

The column of the left reference samples may or may not include a reference sample $B_{intra}(-1, -1)$.

The row of the above reference samples may or may not include the reference sample $B_{intra}(-1, -1)$.

For example, when the prediction mode of the target block is a mode in which prediction is performed using only the column of the left reference samples, the processing unit may exclude a linearity check on the row of the above reference samples. Alternatively, when the prediction mode of the target block is the mode in which prediction is performed using only the column of the left reference samples, a linearity check may be performed only on the column of the left reference samples. For example, when the prediction mode of the target block is the mode in which prediction is performed using only the column of the left reference samples, a portion corresponding to the linearity check on the row of the above reference samples may be excluded from the above-described Equation 7.

For example, when the prediction mode of the target block is a mode in which prediction is performed using only the row of the above reference samples, the processing unit may exclude a linearity check on the column of the left reference samples. Alternatively, when the prediction mode of the target block is the mode in which prediction is performed using only the row of the above reference samples, a linearity check may be performed only on the row of the above reference samples. For example, when the prediction mode of the target block is the mode in which prediction is performed using only the row of the above reference samples, a portion corresponding to the linearity check on the column of the left reference samples may be excluded from the above-described Equation 7.

Figure 17:
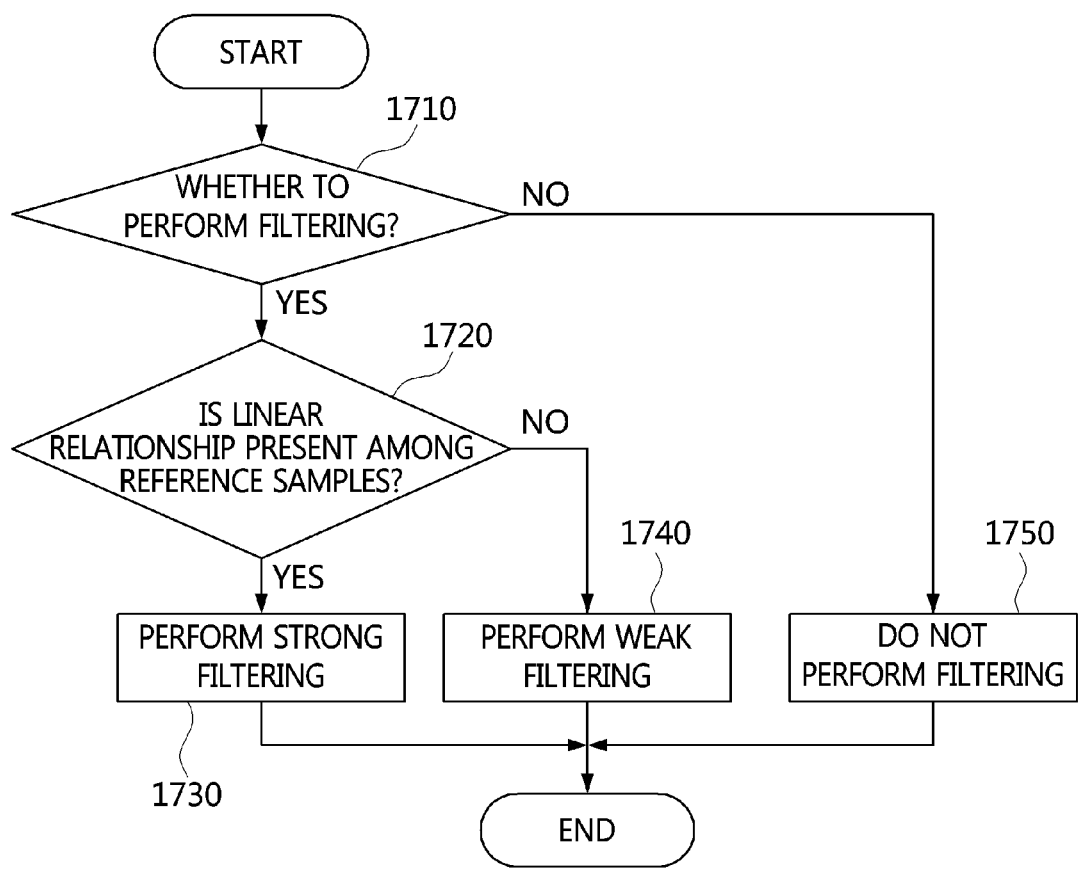
FIG. 17 is a flowchart illustrating a reference sample filtering method according to an embodiment.

FIG. 17 is a flowchart illustrating a reference sample filtering method according to an embodiment.

At the following steps 1710, 1720, 1730, 1740, and 1750, a method for performing filtering on a reference sample used to predict a prediction block of a CU may be described.

At step 1710, the processing unit may determine whether to perform filtering on each reference sample of a target CU.

If it is determined to perform filtering on the reference sample, step 1720 may be performed.

If it is determined not to perform filtering on the reference sample, step 1750 may be performed.

The processing unit may determine whether to perform filtering on the reference sample of the target CU using the filtering indicator of the target CU.

For example, when the value of the filtering indicator is a first predefined value, the processing unit may determine to perform filtering on the reference sample of the target CU, whereas when the value of the filtering indicator is a second predefined value, the processing unit may determine not to perform filtering on the reference sample of the target CU.

When the value of the filtering indicator is the first predefined value, all prediction blocks of the target CU may be generated via prediction that uses filtered reference samples. When the value of the filtering indicator is the second predefined value, all prediction blocks of the target CU may be generated via prediction that uses unfiltered reference samples.

At step 1720, the processing unit may determine the type of filter. Here, the determined filter may be a strong filter or a weak filter.

When a linear relationship is present among the multiple reference samples of the CU, the processing unit may determine to use a strong filter for filtering. When there is a high linear relationship among the multiple reference samples, a prediction block may be generated using reference samples filtered through the strong filter in consideration of this high linear relationship.

When a linear relationship is not present among multiple reference samples of the CU, the processing unit may determine to use a weak filter for filtering.

For example, when a linear relationship is present among the above reference samples of the prediction block and a linear relationship is present among the left reference samples of the prediction block, the processing unit may determine to use a strong filter. When a linear relationship is not present among the above reference samples of the prediction block or when a linear relationship is not present among the left reference samples of the prediction block, the processing unit may determine to use a weak filter.

For example, when only the above reference samples of the prediction block are used to predict the prediction block, the processing unit may determine to use a strong filter if a linear relationship is present among the above reference samples of the prediction block. The processing unit may determine to use a weak filter if a linear relationship is not present among the above reference samples of the prediction block.

For example, when only the left reference samples of the prediction block are used to predict the prediction block, the processing unit may determine to use a strong filter if a linear relationship is present among the left reference samples of the prediction block. The processing unit may determine to use a weak filter if a linear relationship is not present among the left reference samples of the prediction block.

The determination of the presence of a linear relationship among the reference samples may be performed depending on whether the condition of the above-described Equation 7 is satisfied. For example, the determination of the presence of a linear relationship may be unrelated to the size of a CU or a prediction block.

The processing unit may determine that a linear relationship is present among the above reference samples if the above reference samples satisfy the following Equation 8. In other words, Equation 8 may be a value LinearAbove, indicating whether a linear relationship is present among the above reference samples.

$$|B_{intra}(-1,-1)+B_{intra}(2N-1,-1)-2B_{intra}(N-1,-1)|<2^{bitDepth-5} \qquad \text{[Equation 8]}$$

The processing unit may determine that a linear relationship is present among the left reference samples if the left reference samples satisfy the following Equation 9. In other words, Equation 9 may be a value LinearLeft, indicating whether a linear relationship is present among the left reference samples.

$$|B_{intra}(-1,-1)+B_{intra}(-1,2N-1)-2B_{intra}(-1,N-1)|<2^{bitDepth-5} \qquad \text{[Equation 9]}$$

$B_{intra}(x, y)$ may be a reference sample located at coordinates (x, y) relative to the prediction block $B_{intra}$. Here, the uppermost-leftmost coordinates of $B_{intra}$ may be (0, 0). The size of $B_{intra}$ may be N×N. "bitDepth" may be the bit depth of a target image including the target block. The value of the bit depth may be 8 or more or 10 or more.

Step 1720 may be selectively performed.

For example, the processing unit may select a filter based on the prediction mode of the target CU. Further, the processing unit may determine whether to check the above-described values LinearLeft and LinearAbove depending on the prediction mode of the target CU.

For example, when the prediction mode of the target CU is a predefined prediction mode, the processing unit may use a strong filter for filtering the reference samples.

When a linear relationship is present among reference samples or when it is determined to use a strong filter for filtering, step 1730 may be performed.

When a linear relationship is not present among reference samples or when it is determined to use a weak filter for filtering, step 1740 may be performed.

At step 1730, the processing unit may perform strong filtering on the reference samples of the prediction unit. The strong filtering may be filtering that uses a strong filter.

The strong filtering may be represented by the following Equation 10:

$$B'_{intra}(x, y) = \begin{cases} \dfrac{(2N-1-x)*B_{intra}(-1,-1)+(x+1)*B_{intra}(2N-1,-1)}{2N} & 0 \leq x < 2N-1, y = -1 \\ \dfrac{(2N-1-y)*B_{intra}(-1,-1)+(y+1)*B_{intra}(-1,2N-1)}{2N} & x = -1, 0 \leq y < 2N-1 \\ B_{intra}(S) & S \in \{(-1,-1),(-1,2N-1),(2N-1,-1)\} \end{cases} \quad \text{[Equation 10]}$$

$B'_{intra}$ (x, y) may denote a reference sample which is located at coordinates (x, y) relative to the prediction block $B_{intra}$ and to which strong filtering is applied.

At step 1740, the processing unit may perform weak filtering on the reference samples of the prediction unit. The weak filtering may be filtering that uses the weak filter.

The weak filtering may be represented by the following Equation 11:

$$B'_{intra}(x, y) = \begin{cases} \dfrac{B_{intra}(x-1,y)+2*B_{intra}(x,y)+B_{intra}(x+1,y)}{4} & 0 \leq x < 2N-1, y = -1 \\ \dfrac{B_{intra}(x,y+1)+2*B_{intra}(x,y)+B_{intra}(x,y-1)}{4} & x = -1, 0 \leq y < 2N-1 \\ \dfrac{B_{intra}(-1,0)+2*B_{intra}(-1,-1)+B_{intra}(0,-1)}{4} & x = -1, y = -1 \\ B_{intra}(S) & S \in \{(2N-1,-1),(-1,2N-1)\} \end{cases} \quad \text{[Equation 11]}$$

$B'_{intra}$(x, y) may denote a reference sample which is located at coordinates (x, y) relative to the prediction block $B_{intra}$ and to which weak filtering is applied.

Weak filtering may be applied to reference samples which do not satisfy the conditions required to perform strong filtering. Here, the conditions required to perform strong filtering may include the conditions of the above-described LinearLeft and LinearAbove.

As shown in Equation 11, when weak filtering is performed on a target reference sample, which is the target to be filtered, the processing unit may use the reference sample, a left reference sample, which is located to the left of the reference sample, and a right reference sample, which is located to the right of the reference sample. The weak filter may be a smoothing filter, and the filter coefficients of the weak filter may be [1, 2, 1]. The input values of the weak filter may be the left reference sample, the target reference sample, and the right reference sample.

At step 1750, the processing unit may not perform filtering on the reference samples of the prediction unit.

The above-described steps 1710 and 1720 may correspond to steps 1410 and 1530.

The above-described steps 1730 and 1740 may correspond to steps 1420 and 1540.

In the above-described reference sample filtering method, filters other than the specified filter may be used.

In the above-described embodiments, a process for selecting an optimal method from among 1) a method for omitting filtering, 2) a filtering method using a strong filter, and 3) a filtering method using a weak filter (e.g. [1, 2, 1] filter), from the standpoint of rate-distortion or the like, has been described.

The processing unit may use a filter different from the above-described filters when the foregoing filtering, strong filtering, or weak filtering is applied to each reference sample. For example, the processing unit may perform filtering on the reference sample using a [2, 3, 6, 3, 2] filter or a [1, 1, 4, 1, 1] filter so as to consider the variety of characteristics of prediction blocks in intra prediction.

The processing unit may select one filter from among multiple filters when the foregoing filtering, strong filtering, or weak filtering is applied to each reference sample, and may perform filtering, strong filtering or weak filtering on the reference sample using the selected filter.

To select a filter, filtering information may be used. The filtering information may include filter selection information. The filter selection information may indicate a filter used to perform filtering, strong filtering or weak filtering on each reference sample, among multiple filters.

When the filter is selected by the encoding apparatus 1200, the encoding apparatus 1200 may signal the filter selection information to the decoding apparatus 1300.

A transmission unit for the filtering information may be, but is not limited to, a CU. The filtering information may be transmitted for each CTU, CU or TU. That is, the filtering information may be the syntax element of a CTU, a CU or a TU. Further, the transmission units of a plurality of pieces of filtering information may be different from each other. For example, filtering information for an entity, such as a video, an image, a slice, a tile, a CTU, a CU, a PU or a TC, may be used, and filtering information for sub-entities of the entity may be used.

Furthermore, unlike the use of the filtering information, the processing unit may determine the filter to be used to perform filtering, strong filtering or weak filtering on each reference sample, among multiple filters, based on predefined coding parameters.

Here, the predefined coding parameters may be coding parameters related to intra prediction.

Third Reference Sample Filtering Method

In the above-described second reference sample filtering method, filtering information related to an optimal reference sample filtering method that is determined for a block on which intra prediction is performed may be transmitted from the encoding apparatus 1200 to the decoding apparatus 1300. Further, for the block on which intra prediction is performed, an optimal reference sample filtering method may be selected from among multiple reference sample filtering methods. Such selection may be conducted by comparing the rate-distortion costs of the multiple reference sample filtering methods with each other.

In a third reference sample filtering method, which will be described below, a filter for performing filtering may be determined using coding parameters related to intra prediction.

The following Table 2 shows filters selected depending on the prediction mode according to an example.

TABLE 2

| Prediction mode | Selected filter |
| --- | --- |
| DC, planar | First filter |
| Prediction mode number = = even number | (filtering is omitted) |
| Prediction mode number = = odd number | First filter or second filter |

As shown in Table 2, when the prediction mode of a prediction block is a DC mode or a planar mode, a first filter may be used. For example, the first filter may be a [1, 2, 1] filter. When the prediction mode number of the prediction block is an even number, filtering on a reference sample may not be performed. When the prediction mode number of the prediction block is an odd number, the first filter or a second filter may be used. The second filter may be a bilinear interpolation filter.

The third reference sample filtering method will be described below with reference to FIG. 18.

Figure 18:
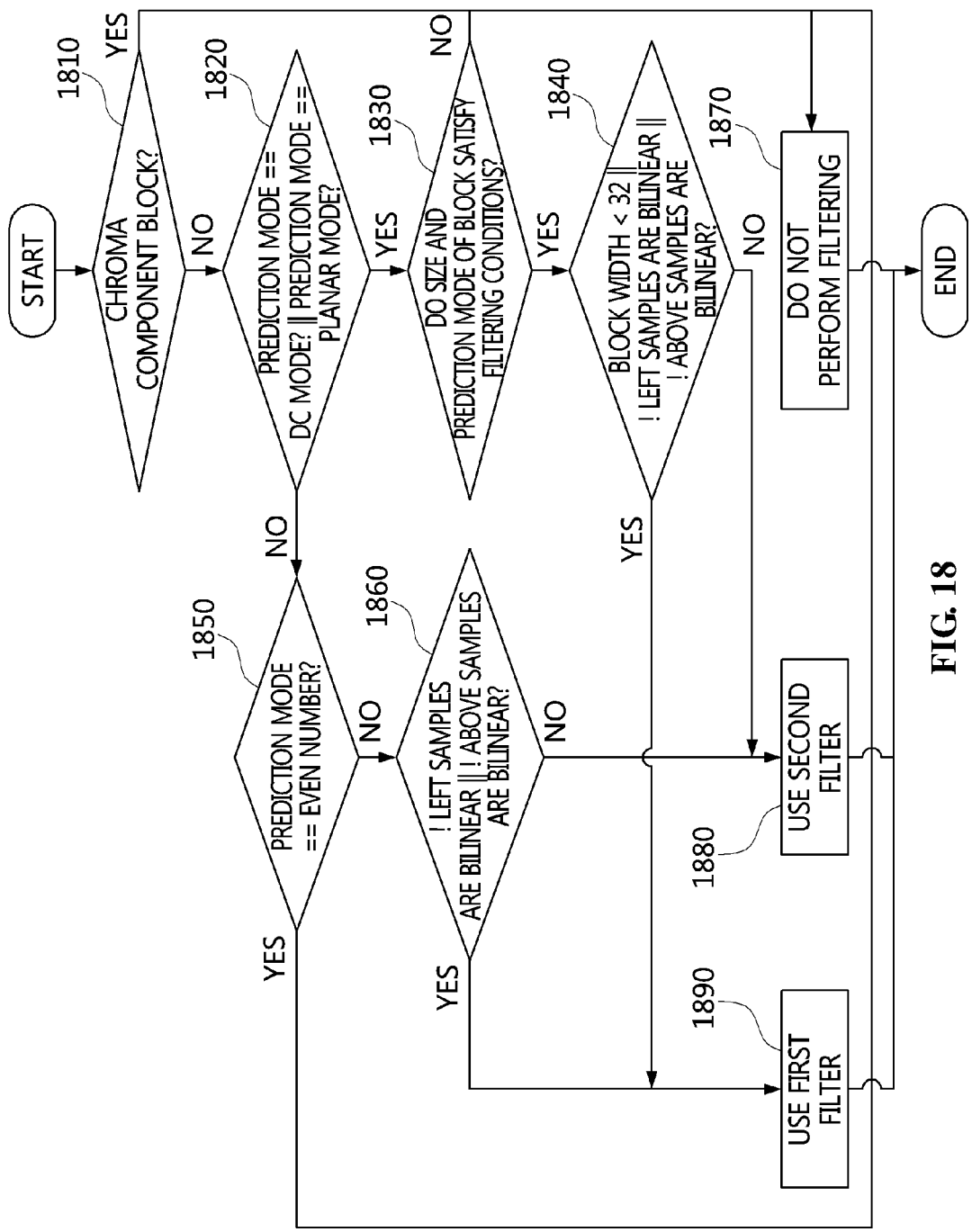
FIG. 18 is a flowchart illustrating a reference sample filtering method according to an embodiment.

FIG. 18 is a flowchart illustrating a reference sample filtering method according to an embodiment.

At step 1810, the processing unit may check whether a target block is a chroma component block.

For example, the target block may be a prediction block.

When the block is a chroma component block, step 1870 may be performed.

When the block is not a chroma component block, step 1820 may be performed.

At step 1820, the processing unit may check whether the prediction mode of the target block is one of a DC mode and a planar mode.

When the prediction mode of the target block is found to be one of the DC mode and the planar mode, step 1830 may be performed. In other words, when the prediction mode of the target block is a non-directional mode, step 1830 may be performed.

When the prediction mode of the target block is found not to be one of the DC mode and the planar mode, step 1850 may be performed. In other words, when the prediction mode of the target block is a directional mode, step 1850 may be performed.

At step 1830, the processing unit may check whether the size of the block and the prediction mode of the block satisfy filtering conditions.

When the size of the block and the prediction mode of the block are found to satisfy the filtering conditions, step 1840 may be performed.

When either the size of the block or the prediction mode of the block is found not to satisfy the filtering conditions, step 1870 may be performed.

For example, the filtering conditions may be identical to the conditions indicating whether to perform filtering on reference samples shown in the above Table 1.

At step 1840, the processing unit may determine whether the width or size of the target block is less than or equal to a predefined value or whether a bilinear relationship is present among specific reference samples. For example, the specific reference samples may be reference samples above the target block or reference samples to the left of the target block.

For example, the predefined value may be 32 or 32×32.

For example, when the width or size of the target block is less than or equal to the predefined value, or when a bilinear relationship is not present among the left reference samples or when a bilinear relationship is not present among the above reference samples, step 1890 may be performed.

For example, when the width or size of the target block is greater than the predefined value, when a bilinear relationship is present between the left reference samples, and when a bilinear relationship is present between the above reference samples, step 1880 may be performed.

Alternatively, the processing unit may predict the linearity of specific reference samples. The processing unit may predict the linearity of specific reference samples based on the above-described Equations 8 and 9.

For example, when it is determined that the width or size of the target block is less than or equal to the predefined value or that specific reference samples do not have linearity, step 1890 may be performed. When it is determined that the width or size of the target block is greater than the predefined value and that specific reference samples have linearity, step 1880 may be performed.

At step 1850, the processing unit may check whether the prediction mode number of the target block is an even number.

When the prediction mode number of the target block is an even number, step 1870 may be performed.

If the prediction mode number of the target block is an odd number, step 1860 may be performed.

At step 1860, the processing unit may determine whether a bilinear relationship is present among the specific reference samples. For example, the specific reference samples may be reference samples above the target block or reference samples to the left of the target block.

The determination of whether a bilinear relationship is present may be omitted depending on the prediction mode of the target block. For example, when the prediction mode of the target block is a mode in which prediction is performed using only the column of left reference samples, the processing unit may exclude a linearity check on the row of above reference samples. Alternatively, when the prediction mode of the target block is a mode in which prediction is performed using only the row of the above reference samples, the processing unit may exclude a linearity check on the column of the left reference samples.

For example, when a bilinear relationship is not present among the left reference samples or when a bilinear relationship is not present among the above reference samples, step 1890 may be performed.

For example, when a bilinear relationship is present among the left reference samples and when a bilinear relationship is present among the above reference samples, step 1880 may be performed.

Alternatively, the processing unit may predict the linearity of specific reference samples. If it is determined that the specific reference samples have linearity, step 1880 may be performed. If it is determined that the specific reference samples do not have linearity, step 1890 may be performed.

At step 1870, the processing unit may determine not to perform filtering on the reference samples of the target block.

For example, the processing unit may perform prediction of the target block using reference samples to which filtering is not applied when the prediction mode of the target block is a directional mode and the number of the prediction mode is an even number.

At step 1880, the processing unit may determine to perform filtering using a second filter on the reference samples of the target block. In other words, the second filter may be applied to the reference samples of the target block.

For example, the second filter may be a bilinear interpolation filter. Filtering using the second filter may be strong filtering.

At step 1890, the processing unit may determine to perform filtering using a first filter on the reference samples of the target block. In other words, the first filter may be applied to the reference samples of the target block.

For example, the first filter may be a [1, 2, 1] filter. Filtering using the first filter may be weak filtering.

For example, when the prediction mode is a directional mode, and the number of the prediction mode is an odd number, the processing unit may select may select one of the first filter at step 1890 and the second filter at step 1880 depending on whether specific reference samples have linearity, and may perform filtering on the reference samples of the target block using the selected filter. The first filter may be a filter used when the specific reference samples do not have linearity. The second filter may be a filter used when the specific reference samples have linearity.

At the above-described step 1850, whether the prediction mode number of the target block is an even number was checked. In an embodiment, "even number" may be replaced with "odd number". In other words, at step 1850, the processing unit may check whether the number of the prediction mode of the target block is an odd number. When the prediction mode number of the target block is found to be an odd number, step 1870 may be performed. Further, when the prediction mode number of the target block is found to be an even number, step 1860 may be performed. In this case, the processing unit may perform prediction of the target block using reference samples to which filtering is not applied when the prediction mode of the target block is a directional mode and the number of the prediction mode is an odd number. Furthermore, when the prediction mode of the target block is a directional mode and the number of the prediction mode is an even number, the processing unit may select one of the first filter at step 1890 and the second filter at step 1880 depending on whether specific reference samples have linearity, and may perform filtering on the reference samples of the target block using the selected filter.

The above-described reference sample filtering methods may have the following advantages given in 1) and 2).

1) A filter selection procedure in the above-described reference sample filtering methods may be included in a process for a Rough Mode Decision (RMD) and a series of intra-prediction mode decisions. Therefore, the filter selection procedure may not increase the complexity of the encoding apparatus 1200.

2) Since the above-described reference sample filtering methods may be determined depending on the number of the prediction mode, additional filtering information may not be required.

In the above-described embodiments, filtering has been described as being applied to the reference samples of the target block when intra prediction is performed. Such a description is merely exemplary, and thus filtering may also be applied to other targets. For example, filtering may also be applied to deblocking filtering. In this case, coding parameters, such as prediction modes of intra prediction, which are not directly related to deblocking filtering, may or may not be applied to deblocking filtering.

Further, filtering in the embodiments may also be applied to the operations of setting, updating, and changing the value of a specific target with reference to information about other entities related to the specific target as well as operations generally designated as "filtering" or regarded as "filtering". Here, the other entities related to the specific target may be entities indicated based on coding parameters or the like of the specific target.

Further, the term "adjacent" in the embodiments may mean not only that boundaries of two entities are in contact with each other, but also that the distance between the two entities is less than or equal to a predefined value.

Image Encoding and Decoding Using Interpolation Filter

An image signal input to the encoding apparatus 1200 or the decoding apparatus 1300 may be a signal obtained by digitalizing a natural image having a continuous signal format into a discrete signal format. Since such a digitalized signal is sampled at limited resolution, aliasing artifacts may be present between signals. Such aliasing artifacts may deteriorate prediction efficiency when generating intra-prediction signals or inter-prediction signals having directionality. In order to solve this problem, sub-pixel signals may be generated by utilizing an interpolation filter for signals represented by integer pixels (i.e. integer-pel or full pel), and the efficiency of intra prediction or inter prediction may be improved by exploiting the generated sub-pixels.

At steps 1420 and 1540, a target may be integer pixels. Performing filtering on the target may mean that information about sub-pixels is generated by utilizing an interpolation filter for integer pixels.

The processing unit may generate sub-pixels by utilizing the interpolation filter for integer pixels.

For example, in order to acquire sub-pixels based on integer pixels, the processing unit may use a 6-tap filter for ½ sub-pixels and an average filter for ¼ sub-pixels.

Further, for example, in order to acquire sub-pixels based on integer pixels, the processing unit may use a DCT-based interpolation filter composed of 8 taps for ½ sub-pixels, and may use a DCT-based interpolation filter composed of 7 taps for ¼ sub-pixels. Further, according to an embodiment, an interpolation filter based on DST, as well as DCT, may also be used to generate sub-pixels. The efficiency of motion compensation may be improved through such an interpolation filter.

In detail, to enhance prediction performance, the processing unit may use N-point interpolation filter coefficients based on DCT or DST to perform prediction or compensation. Here, N may be an even or odd number. Prediction may be intra prediction, or may be inter prediction which performs motion prediction on a sub-pixel basis. Compensation may be inter compensation which performs motion compensation on a sub-pixel basis.

DCT and DST may be methods for transforming signals in a spatial domain into signals in a frequency domain. Further, Inverse DCT (IDCT) and Inverse DST (IDST) may be methods for transforming signals in a frequency domain into signals in a spatial domain.

Below, exemplary descriptions of various types of interpolation filters will be presented.

DCT-II-Based Interpolation Filter

The following Equation 12 indicates DCT-II.

$$X^{DCT-II}(k) = \sqrt{\frac{2}{N}} \sum_{n=0}^{N-1} c_k x(n) \cos \frac{\pi(n+1/2)(k)}{N} \quad \text{[Equation 12]}$$

$$k = 0, 1, 2, \ldots, N-1$$

N may denote the number of filter taps indicating the length of the filter (i.e. N-point), and may be the length of a Finite Impulse Response (FIR).

N may be an integer of 1 or more. For example, the value of N may be 12, 11, 10, 9, 8, 7, 6, 5, 4, 3 or 2.

The following Equation 13 indicates IDCT-II.

$$x(n) = \sqrt{\frac{2}{N}} \sum_{k=0}^{N-1} c_k X^{DCT-II}(k) \cos \frac{\pi(n+1/2)(k)}{N} \quad \text{[Equation 13]}$$

$$k = 0, 1, 2, \ldots, N-1$$

In Equations 12 and 13, $c_k$ may be defined by the following Equation 14:

$$c_k \begin{cases} \frac{1}{\sqrt{2}}, & k = 0 \\ 1, & \text{otherwise} \end{cases} \quad \text{[Equation 14]}$$

From Equations 12 and 13, the following Equation 15 may be derived.

Equation 15 may be calculated by substituting Equation 12 into Equation 13.

$$x(n) = \frac{2}{N} \sum_{m=0}^{N-1} x(m) \sum_{k=0}^{N-1} c_k^2 \cos \frac{(m+1/2)\pi(k)}{N} \cos \frac{(n+1/2)\pi(k)}{N} \quad \text{[Equation 15]}$$

$$k = 0, 1, 2, \ldots, N-1$$

The processing unit may calculate and acquire interpolation filter coefficients, which can be used to generate ½-pixel (i.e. half-pel)-interpolated sample values and ¼-pixel (i.e. quarter-pel) interpolated sample values by substituting the locations of sub-pixels into n of Equation 15. Here, the locations of sub-pixels may be 3.5, 3.25, etc.

The filter coefficients, which will be described later, may be interpolation filter coefficients. Further, n may be an expression of the locations of sub-pixels in the form of a decimal fraction. For example, 3.5 may be an example of the location of a ½-pixel unit. 3.25 may be an example of the location of a ¼-pixel unit.

In the following embodiment, the case where the value of N is 8 is exemplified.

With reference to the following Tables 3 to 6, DCT-II-based interpolation filter coefficients for calculating the values of ½-pixel-interpolated samples may be calculated.

TABLE 3

| $\cos(((n + 1/2)*\pi*k)/N)$ | k = 0 | k = 1 | k = 2 | k = 3 | k = 4 | k = 5 | k = 6 | k = 7 |
|---|---|---|---|---|---|---|---|---|
| n = 3 + 0.5 | 1 | 6.13E−17 | −1 | −1.8E−16 | 1 | 3.06E−16 | −1 | 4.3E−16 |

TABLE 4

| $\cos(((n + 1/2)*\pi*k)/N)$ | k = 0 | k = 1 | k = 2 | k = 3 | k = 4 | k = 5 | k = 6 | k = 7 |
|---|---|---|---|---|---|---|---|---|
| m = 0 | 1 | 0.980785 | 0.92388 | 0.83147 | 0.707107 | 0.55557 | 0.382683 | 0.19509 |
| m = 1 | 1 | 0.83147 | 0.382683 | −0.19509 | −0.70711 | −0.98079 | −0.92388 | −0.55557 |
| m = 2 | 1 | 0.55557 | −0.38268 | −0.98079 | −0.70711 | 0.19509 | 0.92388 | 0.83147 |
| m = 3 | 1 | 0.19509 | −0.92388 | −0.55557 | 0.707107 | 0.83147 | −0.38268 | −0.98079 |
| m = 4 | 1 | −0.19509 | −0.92388 | 0.55557 | 0.707107 | −0.83147 | −0.38268 | 0.980785 |
| m = 5 | 1 | −0.55557 | −0.38268 | 0.980785 | −0.70711 | −0.19509 | 0.92388 | −0.83147 |
| m = 6 | 1 | −0.83147 | 0.382683 | 0.19509 | −0.70711 | 0.980785 | −0.92388 | 0.55557 |
| m = 7 | 1 | −0.98079 | 0.92388 | −0.83147 | 0.707107 | −0.55557 | 0.382683 | −0.19509 |

For the case where the value of k is 0 to 7, the results of the following Table 5 may be obtained by multiplying the values of Tables 3 and 4 by each other.

TABLE 5

| $\cos(((n + 1/2)*\pi*k)/N)*$ $\cos(((m + 1/2)*\pi*k)/N)*c_k^2$ | k = 0 | k = 1 | k = 2 | k = 3 | k = 4 | k = 5 | k = 6 | k = 7 |
|---|---|---|---|---|---|---|---|---|
| m = 0 | 0.5 | 6.01E−17 | −0.92388 | −1.5E−16 | 0.707107 | 1.702E−16 | −0.38268 | −8.5E−17 |
| m = 1 | 0.5 | 5.09E−17 | −0.38268 | 3.59E−17 | −0.70711 | −3E−16 | 0.92388 | 2.38E−16 |
| m = 2 | 0.5 | 3.4E−17 | 0.382683 | 1.8E−16 | −0.70711 | 5.975E−17 | −0.92388 | −3.6E−16 |
| m = 3 | 0.5 | 1.2E−17 | 0.92388 | 1.02E−16 | 0.707107 | 2.547E−16 | 0.382683 | 4.21E−16 |
| m = 4 | 0.5 | −1.2E−17 | 0.92388 | −1E−16 | 0.707107 | −2.55E−16 | 0.382683 | −4.2E−16 |
| m = 5 | 0.5 | −3.4E−17 | 0.382683 | −1.8E−16 | −0.70711 | −5.98E−17 | −0.92388 | 3.57E−16 |

TABLE 5-continued

| $\cos(((n + 1/2)*\pi*k)/N)*$ $\cos(((m + 1/2)*\pi*k)/N)*c_k^2$ | k = 0 | k = 1 | k = 2 | k = 3 | k = 4 | k = 5 | k = 6 | k = 7 |
|---|---|---|---|---|---|---|---|---|
| m = 6 | 0.5 | −5.09E−17 | −0.38268 | −3.6E−17 | −0.70711 | 3.00E−16 | 0.92388 | −2.4E−16 |
| m = 7 | 0.5 | −6.01E−17 | −0.92388 | 1.53E−16 | 0.707107 | −1.7E−16 | −0.38268 | 8.37E−17 |

It the values in one row are summed in Table 5, the results of Table 6 may be obtained. The processing unit may calculate the values of DCT-II-based interpolation filter coefficients, as indicated in Table 6, by summing all of the values in one row for the case where the value of m is one of values ranging from 0 to 7. The DCT-II-based interpolation filter coefficients may be required so as to calculate ½-pixel sample values. For example, ½-pixel sample values may be sample values at the location where the value of n is 3.5.

In Table 6, an index, instead of the location of n, is represented for integer samples. That is, the values of n ranging from 0 to 7 may correspond to index i, ranging from −3 to 4, respectively.

TABLE 6

| | Index i | | | | | | | |
|---|---|---|---|---|---|---|---|---|
| | −3 | −2 | −1 | 0 | 1 | 2 | 3 | 4 |
| halfpel-filter[i] | −0.02486 | 0.083522 | −0.18708 | 0.628417 | 0.628417 | −0.18708 | 0.083522 | −0.02486 | lice processing unit may calculate and acquire filter coefficient values converted into integers by multiplying a predefined value by the coefficient values shown in Table 6. The predefined value may be 64, that is, $2^6$.

The processing unit may acquire DCT-II-based interpolation filter coefficients, as shown in Table 7, by reflecting precision in the filter coefficient values converted into integers. For example, the precision may be +2, +1, −1 or −2.

TABLE 7

| | Index i | | | | | | | |
|---|---|---|---|---|---|---|---|---|
| | −3 | −2 | −1 | 0 | 1 | 2 | 3 | 4 |
| halfpel-filter[i] | −1 | 4 | −11 | 40 | 40 | −11 | 4 | −1 |
| quarterpel-filter[i] | −1 | 4 | −10 | 58 | 17 | −5 | 1 | |

The processing unit may adjust the values of interpolation filter coefficients so that the sum of the interpolation filter coefficients becomes a predefined value. For example, the predefined value may be 64, that is, $2^6$. Alternatively, a predefined value may be $2^N$ in order to improve precision. Here, N may be a positive integer of 0 or more. For example, N may be 7 or 8. By means of adjustment, the sum of the interpolation filter coefficients may be a predefined value, which may be $2^N$.

In Table 7, "halfpel-filter[i]" may denote the interpolation filter coefficients of a ½-pixel interpolation filter. "quarterpel-filter[i]" may denote the interpolation filter coefficients of a ¼-pixel interpolation filter.

The ¼-pixel interpolation filter coefficients may be calculated by substituting a ¼-pixel unit for a ½-pixel unit in the above-described Equation 3. For example, n=3.25, which is a ¼-pixel unit, may be substituted for n=3.5, which is a ½ pixel unit. After this substitution, the same procedure as that when the above-described ½-pixel interpolation filter coefficients are calculated is performed, and thus the ¼-pixel interpolation filter coefficients may be calculated.

However, in order to derive ¼-pixel interpolation filter coefficients, the processing unit may calculate interpolation filter coefficients using a 7-point filter tap (or Finite Impulse Response: FIR), in which the value of N is 7. Alternatively, in order to derive ¼-pixel interpolation filter coefficients, the processing unit may also calculate interpolation filter coefficients using an 8-point filter tap (or FIR), in which the value of N is 8.

Figure 19:
FIG. 19 illustrates the locations of sub-pixels for motion compensation and generation of a reference sample.

FIG. 19 illustrates the locations of sub-pixels for motion compensation and reference sample generation.

In FIG. 19, $A_{-3}$ to $A_4$ may denote the locations of integer pixels or integer pixel units. $b_0$ may denote the location of a ½-pixel or a ½-pixel unit. $a_0$ and $c_0$ may denote the location of a 4/2-pixel or a 4/2-pixel unit.

The processing unit may obtain the value of $b_0$, which is a ½-pixel, using the following Equation 16:

$$b_o=((-1) \cdot A_{-3}+4 \cdot A_{-2}+(-11) \cdot A_{-1}+40 \cdot A_o+40 \cdot A_1+ (-11) \cdot A_2+4 \cdot A_3+(-1) \cdot A_4+32)>>6 \quad \text{[Equation 16]}$$

In Equation 16, a constant of 32 may be a rounding factor.

As shown in Equation 16, to calculate the value of $b_0$, the processing unit may apply ½-pixel filter coefficients to the values of samples present at locations corresponding to indices of −3 to 4.

In order to calculate sample values of sub-pixel units, the processing unit may perform interpolation filtering, as shown in Equation 16, at steps 1420 and 1540.

In the same way as the above-described procedure for deriving ½-pixel interpolation filter coefficients, the processing unit may derive ⅛-pixel interpolation filter coefficients, 1/16-pixel interpolation filter coefficients, 1/32-pixel interpolation filter coefficients, 1/64-pixel interpolation filter coefficients, etc., and may use the derived interpolation filter coefficients.

For example, in order to derive 1/16-pixel filter coefficients, the processing unit may substitute the locations of sub-pixels into n of Equation 15. For example, the locations of sub-pixels may be 3.5, 3.4375, 3.375, 3.3125, 3.25, 3.1875, 3.125, and 3.0625. 'n' may represent the locations of sub-pixels in the form of decimal fractions corresponding to the unit of 1/16. For example, 3.5 may be an example of the location of a ½-pixel unit. 3.25 may be an example of the location of a ¼-pixel unit. 3.0625 may be an example of the location of a 1/16-pixel unit.

The processing unit may calculate and acquire interpolation filter coefficients which can be used to generate a ½-pixel-interpolated sample value, a 7/16-pixel-interpolated sample value, a 6/16-pixel-interpolated sample value, a 5/16-pixel-interpolated sample value, a ¼-pixel-interpolated sample value, a 3/16-pixel-interpolated sample value, a 2/16-pixel-interpolated sample value, and a 1/16-pixel-interpolated sample value by substituting the locations of sub-pixels into n of Equation 15.

As described above, the processing unit may acquire the values of more sub-pixels by setting the unit of a sub-pixel to 1/16.

The processing unit may calculate and acquire 1/16-pixel-interpolated sample values in a way similar to that described above with reference to Tables 3 to 6.

Similarly to the description made with reference to Table 6, the processing unit may calculate and acquire filter coefficient values, converted into integers, by multiplying a predefined value by the coefficient values. The predefined value may be 64, that is, $2^6$.

The processing unit may acquire DCT-II-based interpolation filter coefficients, as shown in Table 8, by reflecting precision in the filter coefficient values converted into integers. For example, the precision may be +2, +1, −1 or −2.

The following Table 8 may show 1/16-pixel interpolation filter coefficients.

TABLE 8

|  | \-3 | \-2 | \-1 | 0 | 1 | 2 | 3 | 4 |
|---|---|---|---|---|---|---|---|---|
| halfpel-filter[i] | −1 | 4 | −11 | 40 | 40 | −11 | 4 | −1 |
| 7/16 pel-filter[i] | −1 | 4 | −11 | 45 | 34 | −10 | 4 | −1 |
| 6/16 pel-filter[i] | −2 | 5 | −12 | 50 | 30 | −10 | 5 | −2 |
| 5/16 pel-filter[i] | −1 | 4 | −11 | 52 | 26 | −8 | 3 | −1 |
| quarterpel-filter[i] | −1 | 4 | −10 | 58 | 17 | −5 | 1 |  |
| 3/16 pel-filter[i] | −1 | 3 | −8 | 60 | 13 | −4 | 1 |  |
| 2/16 pel-filter[i] | −1 | 2 | −5 | 62 | 8 | −3 | 1 |  |
| 1/16 pel-filter[i] | 0 | 1 | −3 | 63 | 4 | −2 | 1 |  |

Index i (header spans columns)

The processing unit may calculate interpolation filter coefficients using an 8-point filter tap, in which the value of N is 8 so as to derive interpolation filters ranging from the 5/16-pixel interpolation filter to the ½-pixel interpolation filter. Further, the processing unit may calculate interpolation filter coefficients using a 7-point filter tap in which the value of N is 7 so as to derive interpolation filters ranging from the 1/16-pixel interpolation filter to the ¼-pixel interpolation filter.

DCT-IV-Based Interpolation Filter
The following Equation 17 indicates DCT-IV.

$$X^{DCT-IV}(k) = \sqrt{\frac{2}{N}} \sum_{n=0}^{N-1} x(n) \cos \frac{\pi(n+1/2)(k+1/2)}{N} \quad \text{[Equation 17]}$$

$$k = 0, 1, 2, \ldots, N-1$$

The following Equation 18 indicates IDCT-IV.

$$x(n) = \sqrt{\frac{2}{N}} \sum_{k=0}^{N-1} X^{DCT-IV}(k) \cos \frac{\pi(n+1/2)(k+1/2)}{N} \quad \text{[Equation 18]}$$

$$k = 0, 1, 2, \ldots, N-1$$

Similarly to the procedure for acquiring DCT-II-based interpolation filter coefficients, Equation 19 may be derived from Equations 17 and 18.

$$x(n) = \quad \text{[Equation 19]}$$

$$\frac{2}{N} \sum_{m=0}^{N-1} x(m) \sum_{k=0}^{N-1} \cos \frac{\pi(m+1/2)(k+1/2)}{N} \cos \frac{\pi(n+1/2)(k+1/2)}{N}$$

$$k = 0, 1, 2, \ldots, N-1$$

Through the procedure similar to that described above with reference to Tables 3 to 7, DCT-IV-based interpolation filter coefficients, such as those in Table 9, may be acquired.

TABLE 9

|  | \-3 | \-2 | \-1 | 0 | 1 | 2 | 3 | 4 |
|---|---|---|---|---|---|---|---|---|
| halfpel-filter[i] | −1 | 4 | −10 | 40 | 48 | −19 | 14 | −12 |
| quarterpel-filter[i] | −1 | 3 | −8 | 51 | 21 | −11 | 9 |  |

Index i (header spans columns)

Similarly to Table 7, Table 9 may show the filter coefficients of a ½-pixel interpolation filter and the filter coefficients of a ¼-pixel interpolation filter.

The ¼-pixel interpolation filter coefficients may be calculated by substituting a ¼-pixel unit for a ½-pixel unit in the above-described Equation 3. For example, n=3.25, which is a ¼-pixel unit, may be substituted for n=3.5, which is a ½ pixel unit. After this substitution, the same procedure as that when the above-described ½-pixel interpolation filter coefficients are calculated is performed, and thus the ¼-pixel interpolation filter coefficients may be calculated.

However, in order to derive ¼-pixel interpolation filter coefficients, the processing unit may calculate interpolation filter coefficients using a 7-point filter tap (or Finite Impulse Response: FIR), in which the value of N is 7. Alternatively, in order to derive ¼-pixel interpolation filter coefficients, the processing unit may also calculate interpolation filter coefficients using an 8-point filter tap (or FIR), in which the value of N is 8.

DCT-V-Based Interpolation Filter
The following Equation 20 indicates DCT-V.

$$X^{DCT-V}(k) = p_k \sum_{n=0}^{N-1} x(n) q_n \cos \frac{\pi(n)(k)}{N-1/2} \quad \text{[Equation 20]}$$

$$k = 0, 1, 2, \ldots, N-1$$

The following Equation 21 indicates IDCT-V.

$$x(n) = p_n \sum_{k=0}^{N-1} X^{DCT-V}(k) q_k \cos\frac{\pi(n)(k)}{N-1/2}$$ [Equation 21]

$$k = 0, 1, 2, \ldots, N-1$$

In Equations 20 and 21, $p_k$ and $q_k$ may be defined by the following Equation 22:

$$p_k \begin{cases} \sqrt{\frac{1}{N-1/2}}, & k=0 \\ \sqrt{\frac{2}{N-1/2}}, & \text{otherwise} \end{cases} \quad q_k \begin{cases} \frac{1}{\sqrt{2}}, & k=0 \\ 1, & \text{otherwise} \end{cases}$$ [Equation 22]

Equation 23 may be derived from Equations 20 and 21.

$$x(n) = p_n \sum_{m=0}^{N-1} x(m) q_m \sum_{k=0}^{N-1} p_k q_k \cos\frac{\pi(m)(k)}{N-1/2} \cos\frac{\pi(n)(k)}{N-1/2}$$ [Equation 23]

$$k = 0, 1, 2, \ldots, N-1$$

Further, based on the above-described method for calculating interpolation filter coefficients, the processing unit may calculate and acquire DCT-V-based interpolation filter coefficients, as shown in the following Table 10, using Equation 22.

TABLE 10

| Index i | −3 | −2 | −1 | 0 | 1 | 2 | 3 | 4 |
|---|---|---|---|---|---|---|---|---|
| halfpel − filter [i] | −26 | 19 | −36 | 72 | 58 | −20 | 2 | −5 |
| quarterpel − filter [i] | −21 | 13 | −30 | 96 | 21 | −12 | −3 | |

DST-VII-Based Interpolation Filter
The following Equation 24 indicates DCT-VI.

$$X^{DST-VII}(k) = \sqrt{\frac{2}{N+1/2}} \sum_{n=0}^{N-1} x(n) \sin\frac{\pi(n+1)(k+1/2)}{N+1/2}$$ [Equation 24]

$$k = 0, 1, 2, \ldots, N-1$$

The following Equation 25 indicates IDCT-V.

$$x(n) = \sqrt{\frac{2}{N+1/2}} \sum_{k=0}^{N-1} X^{DST-VII}(k) \sin\frac{\pi(n+1)(k+1/2)}{N+1/2}$$ [Equation 25]

$$k = 0, 1, 2, \ldots, N-1$$

Similarly to the method for deriving Equation 15, Equation 26 may be derived from Equations 24 and 25.

$$x(n) = \frac{2}{N+1/2} \sum_{m=0}^{N-1} x(m) \sum_{k=0}^{N-1} \sin\frac{\pi(m+1)(k+1/2)}{N+1/2} \sin\frac{\pi(n+1)(k+1/2)}{N+1/2}$$ [Equation 26]

$$k = 0, 1, 2, \ldots, N-1$$

As in the case of the calculation of the DCT-II-based interpolation filter coefficients, the processing unit may generate and acquire ½-pixel-interpolated sample values and ¼-pixel-interpolated sample values by substituting the locations of sub-pixels into n of Equation 26. The locations of the sub-pixels may be 3.5, 3.25, etc.

By means of Tables such as Tables 11 to 14, the processing unit may calculate and acquire DST-VII-based interpolation filter coefficients for calculating ½-pixel-interpolated sample values.

TABLE 11

| sin(((n + 1)*π*(k + 1/2))/(N + 1/2)) | k = 0 | k = 1 | k = 2 | k = 3 | k = 4 | k = 5 | k = 6 | k = 7 |
|---|---|---|---|---|---|---|---|---|
| n = 3 + 0.5 | 0.739009 | 0.60268 | −0.8502 | −0.4457 | 0.93247 | 0.27366 | −0.983 | −0.0923 |

TABLE 12

| sin(((m + 1)*π*(k + 1/2))/(N + 1/2)) | k = D | k = 1 | k = 2 | k = 3 | k = 4 | k = 5 | k = 6 | k = 7 |
|---|---|---|---|---|---|---|---|---|
| m = 0 | 0.18375 | 0.52643 | 0.79802 | 0.96183 | 0.99673 | 0.89516 | 0.6737 | 0.36124 |
| m = 1 | 0.361242 | 0.89516 | 0.96183 | 0.52643 | −0.1837 | −0.798 | −0.9957 | −0.6737 |
| m = 2 | 0.526432 | 0.99573 | 0.36124 | −0.6787 | −0.9618 | −0.1837 | 0.79802 | 0.89516 |
| m = 3 | 0.873696 | 0.79802 | −0.5264 | −0.8952 | 0.36124 | 0.96183 | −0.1837 | −0.9957 |
| m = 4 | 0.798017 | 0.36124 | −0.9957 | 0.18375 | 0.89516 | −0.6737 | −0.5264 | 0.96183 |
| m = 5 | 0.895163 | −0.1837 | −0.6737 | 0.99573 | −0.5264 | −0.3612 | 0.96183 | −0.798 |
| m = 6 | 0.961826 | −0.6737 | 0.18375 | 0.36124 | −0.798 | 0.99573 | −0.8952 | 0.52643 |
| m = 7 | 0.995734 | −0.9618 | 0.89516 | −0.798 | 0.6737 | −0.5264 | 0.36124 | −0.1837 |

By multiplying the values in Tables 11 and 12 by each other for the case where the value of k ranges from 0 to 7, the results of Table 13 may be calculated and acquired as interpolation filter coefficients for ½-pixel locations. For example, the ½-pixel locations may be locations where the value of n is 3.5.

TABLE 13

| sin(((n + 1)*π*(k + 1/2 )/ (N + 1/2))*sin(((m + 1)*π*(k + 1/2)/(N + 1/2 ) | k = 0 | k = 1 | k = 2 | k = 3 | k = 4 | k = 5 | k = 6 | k = 7 |
|---|---|---|---|---|---|---|---|---|
| m = 0 | 0.13579 | 0.31725 | −0.6785 | −0.4387 | 0.92849 | 0.24497 | −0.6622 | −0.0333 |
| m = 1 | 0.28896 | 0.53948 | −0.3178 | −0.2347 | −0.1713 | −0.2184 | 0.97878 | 0.06216 |
| m = 2 | 0.38904 | 0.60006 | −0.3071 | 0.30029 | −0.8969 | −0.0503 | −0.7844 | −0.0626 |
| m = 3 | 0.45787 | 0.48091 | 0.44758 | 0.99901 | 0.33685 | 0.26322 | 0.18052 | 0.09187 |
| m = 4 | 0.58974 | 0.2177 | 0.84659 | −0.0819 | 0.83471 | −0.1844 | 0.91747 | −0.0887 |
| m = 5 | 0.66153 | −0.1107 | 0.57279 | −0.4438 | −0.4909 | −0.0989 | −0.5454 | 0.07863 |
| m = 6 | 0.7108 | −0.406 | −0.1562 | −0.161 | −0.7441 | 0.2725 | 0.87992 | −0.0486 |
| m = 7 | 0.73506 | −0.5796 | −0.7611 | 0.35571 | 0.6282 | −0.1441 | −0.3551 | 0.01695 |

The results of Table 14 may be obtained if the values in one row are summed in Table 13. The processing unit may calculate the values of DCT-VII-based ½-pixel interpolation filter coefficients, as shown in the following Table 14, by summing all of the values in one row for the case where m is one of values ranging from 0 to 7.

TABLE 14

| | Index i | | | | | | | |
|---|---|---|---|---|---|---|---|---|
| | −3 | −2 | −1 | 0 | 1 | 2 | 3 | 4 |
| halfpel-filter[i] | −0.0855 | 0.196559 | −0.40354 | 1.308688 | 1.286019 | −0.37923 | 0.168453 | −0.05003 |

Similarly to the description made with reference to Table 6, the processing unit may calculate and acquire filter coefficient values, converted into integers, by multiplying a predefined value by the coefficient values in Table 14. The predefined value may be 64, that is, $2^6$.

The processing unit may acquire DST-VII-based interpolation filter coefficients, as shown in Table 15, by reflecting precision in the filter coefficient values converted into integers. For example, the precision may be +2, +1, −1 or −2.

TABLE 15

| | Index i | | | | | | | |
|---|---|---|---|---|---|---|---|---|
| | −3 | −2 | −1 | 0 | 1 | 2 | 3 | 4 |
| halfpel-filter[i] | −2 | 6 | −13 | 41 | 41 | −13 | 6 | −2 |
| quarterpel-filter[i] | −2 | 5 | −11 | 58 | 18 | −6 | 2 | |

DST-V-Based Interpolation Filter

The following Equation 27 indicates DCT-V.

$$X^{DST-V}(k) = p \sum_{n=0}^{N-1} x(n) \sin \frac{\pi(n+1)(k+1)}{N+1/2}$$ [Equation 27]

$$k = 0, 1, 2, \ldots, N-1$$

The following Equation 28 indicates IDCT-V.

$$x(n) = p \sum_{k=0}^{N-1} X^{DST-V}(k) \sin \frac{\pi(n+1)(k+1)}{N+1/2}$$ [Equation 28]

$$k = 0, 1, 2, \ldots, N-1$$

In Equations 27 and 28, p may be defined by the following Equation 29:

$$p = \sqrt{\frac{2}{N+1/2}}$$ [Equation 29]

Equation 30 may be derived from Equations 27 and 28.

$$x(n) = p^2 \sum_{m=0}^{N-1} x(m) \sum_{k=0}^{N-1} \sin \frac{\pi(m+1)(k+1)}{N+1/2} \sin \frac{\pi(n+1)(k+1)}{N+1/2}$$ [Equation 30]

$$k = 0, 1, 2, \ldots, N-1$$

Further, similarly to the procedure for deriving interpolation filter coefficients using Equation 26, the processing unit may calculate DST-V-based interpolation filter coefficients as shown in the following Table 16.

TABLE 16

| | Index i | | | | | | | |
|---|---|---|---|---|---|---|---|---|
| | −3 | −2 | −1 | 0 | 1 | 2 | 3 | 4 |
| halfpel-filter[i] | −2 | 5 | −11 | 41 | 48 | −19 | 14 | −12 |
| quarterpel-filter[i] | −1 | 3 | −8 | 51 | 21 | −11 | 9 | |

DCT-VII-Based Interpolation Filter

The following Equation 31 indicates DCT-VII.

$$X^{DCT-VII}(k) = p_k \sum_{n=0}^{N-1} x(n) q_n \cos \frac{\pi(n)(k+1/2)}{N-1/2} \quad \text{[Equation 31]}$$

$$k = 0, 1, 2, \ldots, N-1$$

Here, $p_k$ and $q_k$ may be defined by the following Equation 32:

$$p_k \begin{cases} \sqrt{\frac{1}{N-1/2}}, & k = N-1 \\ \sqrt{\frac{2}{N-1/2}}, & \text{otherwise} \end{cases} \quad \text{[Equation 32]}$$

$$q_k \begin{cases} \sqrt{\frac{1}{2}}, & k = 0 \\ 1, & \text{otherwise} \end{cases}$$

The following Equation 33 indicates IDCT-VII.

$$x(n) = r_n \sum_{k=0}^{N-1} X^{DCT-VII}(k) s_k \cos \frac{\pi(n)(k+1/2)}{N-1/2} \quad \text{[Equation 33]}$$

$$k = 0, 1, 2, \ldots, N-1$$

Here, $r_k$ and $s_k$ may be defined by the following Equation 34:

$$r_k \begin{cases} \sqrt{\frac{1}{N-1/2}}, & k = 0 \\ \sqrt{\frac{2}{N-1/2}}, & \text{otherwise} \end{cases} \quad \text{[Equation 34]}$$

-continued $$s_k \begin{cases} \sqrt{\frac{1}{2}}, & k = N \\ 1, & \text{otherwise} \end{cases}$$

Equation 35 may be derived from Equations 31 and 33.

$$x(n) = \quad \text{[Equation 35]}$$

$$r_n \sum_{m=0}^{N-1} x(m) q_m \sum_{k=0}^{N-1} p_k s_k \cos \frac{\pi(m)(k+1/2)}{N-1/2} \cos \frac{\pi(n)(k+1/2)}{N-1/2}$$

$$k = 0, 1, 2, \ldots, N-1$$

Further, similarly to the above-described procedure for deriving interpolation filter coefficients, the processing unit may calculate DCT-VII-based interpolation filter coefficients using Equation 35. as shown in the following Table 17.

TABLE 17

| | Index i | | | | | | | |
|---|---|---|---|---|---|---|---|---|
| | −3 | −2 | −1 | 0 | 1 | 2 | 3 | 4 |
| halfpel-filter[i] | −7 | 11 | −16 | 45 | 45 | −15 | 10 | −9 |
| quarterpel-filter[i] | −5 | 8 | −12 | 56 | 19 | −9 | 7 | |

DCT-VIII-Based Interpolation Filter

The following Equation 36 indicates DCT-VIII.

$$X^{DCT-VIII}(k) = \sqrt{\frac{2}{N+1/2}} \sum_{n=0}^{N-1} x(n) \cos \frac{\pi(n+1/2)(k+1/2)}{N+1/2} \quad \text{[Equation 36]}$$

$$k = 0, 1, 2, \ldots, N-1$$

The following Equation 37 indicates IDCT-VIII.

$$x(n) = \sqrt{\frac{2}{N+1/2}} \sum_{k=0}^{N-1} X^{DCT-VIII}(k) \cos \frac{\pi(n+1/2)(k+1/2)}{N+1/2} \quad \text{[Equation 37]}$$

$$k = 0, 1, 2, \ldots, N-1$$

Equations 38 may be derived from Equations 36 and 37.

$$x(n) = \frac{2}{N+1/2} \sum_{m=0}^{N-1} x(m) \sum_{k=0}^{N-1} \cos \frac{\pi(m+1/2)(k+1/2)}{N+1/2} \cos \frac{\pi(n+1/2)(k+1/2)}{N+1/2} \quad \text{[Equation 38]}$$

Further, similarly to the above-described procedure for deriving interpolation filter coefficients, the processing unit may calculate DCT-VIII-based interpolation filter coefficients using Equation 38, as shown in Table 18.

TABLE 18

| | Index i | | | | | | | |
|---|---|---|---|---|---|---|---|---|
| | −3 | −2 | −1 | 0 | 1 | 2 | 3 | 4 |
| halfpel-filter[i] | −2 | 5 | −12 | 41 | 42 | −13 | 6 | −3 |
| quarterpel-filter[i] | −1 | 4 | −10 | 57 | 19 | −7 | 2 | |

DST-I-Based Interpolation Filter

The following Equation 39 indicates DST-I.

$$X^{DST-I}(k) = \sqrt{\frac{2}{N+1}} \sum_{n=0}^{N-1} x(n) \sin \frac{\pi(n+1)(k+1)}{N+1} \quad \text{[Equation 39]}$$

$k = 0, 1, 2, \ldots, N-1$

The following Equation 40 indicates IDST-I.

$$x(n) = \sqrt{\frac{2}{N+1}} \sum_{k=0}^{N-1} X^{DST-I}(k) \sin \frac{\pi(n+1)(k+1)}{N+1} \quad \text{[Equation 40]}$$

$k = 0, 1, 2, \ldots, N-1$

Equation 41 may be derived from Equations 39 and 40.

$$x(n) = \frac{2}{N+1} \sum_{m=0}^{N-1} x(m) \sum_{k=0}^{N-1} \sin \frac{\pi(m+1)(k+1)}{N+1} \sin \frac{\pi(n+1)(k+1)}{N+1} \quad \text{[Equation 41]}$$

$k = 0, 1, 2, \ldots, N-1$

Further, similarly to the above-described procedure for deriving interpolation filter coefficients, the processing unit may calculate DST-I-based interpolation filter coefficients using Equation 41, as shown in Table 19.

TABLE 19

| | \-3 | \-2 | \-1 | 0 | 1 | 2 | 3 | 4 |
|---|---|---|---|---|---|---|---|---|
| halfpel-filter[i] | −3 | 6 | −13 | 42 | 42 | −13 | 6 | −3 |
| quarterpel-filter[i] | −2 | 5 | −11 | 58 | 18 | −7 | 3 | |

Index i shown above columns.

DST-II-Based Interpolation Filter

The following Equation 42 indicates DST-II.

$$X^{DST-II}(k) = \sqrt{\frac{2}{N}} \sum_{n=0}^{N-1} x(n) c_k \sin \frac{\pi(n+1/2)(k+1)}{N} \quad \text{[Equation 42]}$$

$k = 0, 1, 2, \ldots, N-1$

The following Equation 43 indicates IDST-I.

$$x(n) = \sqrt{\frac{2}{N}} \sum_{k=0}^{N-1} X^{DST-II}(k) c_k \sin \frac{\pi(n+1/2)(k+1)}{N} \quad \text{[Equation 43]}$$

$k = 0, 1, 2, \ldots, N-1$

In Equations 42 and 43, $c_k$ may be defined by the following Equation 44.

$$\left| c_k \left\{ \begin{array}{ll} \frac{1}{\sqrt{2}}, & k = 0 \\ 1, & \text{otherwise} \end{array} \right. \right| \quad \text{[Equation 44]}$$

Equations 45 may be derived from Equations 42 and 43.

[Equation 45]

$$x(n) = \frac{2}{N} \sum_{m=0}^{N-1} x(m) \sum_{k=0}^{N-1} c_k^2 \sin \frac{\pi(m+1/2)(k+1)}{N} \sin \frac{\pi(m+1/2)(k+1)}{N}$$

$k = 0, 1, 2, \ldots, N-1$

Furthermore, similarly to the above-described procedure for deriving interpolation filter coefficients, the processing unit may calculate DST-II-based interpolation filter coefficients using Equation 45, as shown in Table 20.

TABLE 20

| | \-3 | \-2 | \-1 | 0 | 1 | 2 | 3 | 4 |
|---|---|---|---|---|---|---|---|---|
| halfpel-filter[i] | −40 | 21 | −87 | 138 | 138 | −87 | 21 | −40 |
| quarterpel-filter[i] | −53 | 29 | −97 | 201 | 20 | −32 | −4 | |

Index i shown above columns.

The processing unit may calculate interpolation filter coefficients using an 8-point filter tap (or FIR), in which the value of N is 8, so as to derive ½-pixel interpolation filter coefficients. Alternatively, the processing unit may calculate interpolation filter coefficients using an 8-point filter tap (or FIR), in which the value of N is 8, so as to derive ¼-pixel interpolation filter coefficients.

DST-IV-Based Interpolation Filter

The following Equation 46 indicates DST-IV.

$$X^{DST-IV}(k) = \sqrt{\frac{2}{N}} \sum_{n=0}^{N-1} x(n) \sin \frac{\pi(n+1/2)(k+1/2)}{N} \quad \text{[Equation 46]}$$

$k = 0, 1, 2, \ldots, N-1$

The following Equation 47 indicates IDST-IV.

$$x(n) = \sqrt{\frac{2}{N}} \sum_{k=0}^{N-1} X^{DST-IV}(k) \sin \frac{\pi(n+1/2)(k+1/2)}{N} \quad \text{[Equation 47]}$$

$k = 0, 1, 2, \ldots, N-1$

Equation 48 may be derived from Equations 46 and 47.

[Equation 48]

$$x(n) = \frac{2}{N} \sum_{m=0}^{N-1} x(m) \sum_{k=0}^{N-1} \sin \frac{\pi(m+1/2)(k+1/2)}{N} \sin \frac{\pi(n+1/2)(k+1/2)}{N}$$

$k = 0, 1, 2, \ldots, N-1$

Further, similarly to the above-described procedure for deriving interpolation filter coefficients, the processing unit may calculate DST-IV-based interpolation filter coefficients using Equation 48, as shown in Table 21.

TABLE 21

| | Index i | | | | | | | |
|---|---|---|---|---|---|---|---|---|
| | −3 | −2 | −1 | 0 | 1 | 2 | 3 | 4 |
| halfpel-filter[i] | −13 | 14 | −20 | 50 | 41 | −11 | 4 | −1 |
| quarterpel-filter[i] | −10 | 11 | −16 | 66 | 17 | −5 | 1 | |

Method for Using Interpolation Filter

One or more of the above-described multiple interpolation filters may be defined by the encoding apparatus 1200 and/or the decoding apparatus 1300.

The processing unit may use one or more of multiple interpolation filters for inter prediction or motion compensation.

For example, when a motion vector resolution corresponding to a sub-pixel is used, the processing unit may use an interpolation filter having N-point interpolation filter coefficients so as to generate sub-pixel samples. N may be an even number or an odd number.

The processing unit may use one or more of multiple interpolation filters for intra prediction.

For example, the processing unit may use one or more interpolation filters for interpolation of sub-pixel reference samples.

One or more of the multiple interpolation filters may be selected based on the attributes of a block or the coding parameters of the block as follows, and the selected interpolation filters may be used.

When the block is a luma component block, the processing unit may select one or more predefined interpolation filters from among multiple interpolation filters.

When the block is a chroma component block, the processing unit may select one or more predefined interpolation filters from among multiple interpolation filters.

In other words, depending on which one of a luma component block and a chroma component block corresponds to the type of block, specified interpolation filters may be selected from among multiple interpolation filters. Here, the filter taps and filter coefficients of the interpolation filter selected for the luma component block and the interpolation filter selected for the chroma component block may differ from each other. Depending on which one of a luma component block and a chroma component block corresponds to the type of block, the filter taps and filter coefficients of the interpolation filters to be used may be selected in different forms.

When the inter prediction of the block is uni-prediction, the processing unit may select one or more predefined interpolation filters from among multiple interpolation filters.

When the inter prediction of the block is bi-prediction, the processing unit may select one or more predefined interpolation filters from among multiple interpolation filters.

That is, depending on which one of uni-prediction and bi-prediction corresponds to the inter prediction of the block, specified interpolation filters may be selected from among multiple interpolation filters. Here, the filter taps and filter coefficients of the interpolation filter selected for uni-prediction and the interpolation filter selected for bi-prediction may differ from each other. Depending on which one of uni-prediction and bi-prediction corresponds to the inter prediction of the block, the filter taps and filter coefficients of the interpolation filters to be used may be selected in different forms.

The processing unit may select a specified interpolation filter from among multiple interpolation filters depending on a reference picture list and a reference image. The reference picture list may be one or more of list 0 and list 1. Here, depending on the reference picture list and the reference image, the filter taps and filter coefficients of interpolation filters to be used may be selected in different forms.

The processing unit may select a specified interpolation filter from among multiple interpolation filters depending on the size of the block. That is, the interpolation filter selected from among multiple interpolation filters may differ depending on the size of the block. Here, depending on the size of the block, the filter taps and filter coefficients of the interpolation filters to be used may be selected in different forms.

The processing unit may select a specified interpolation filter from among multiple interpolation filters depending on the shape of the block. The shape of the block may include a square, a rectangle or the like. In other words, depending on which one of a square and a rectangle corresponds to the shape of the block, the interpolation filter selected from among the multiple interpolation filters may differ. Here, depending on the shape of the block, the filter taps and filter coefficients of the interpolation filters to be used may be selected in different forms.

The processing unit may select a specified interpolation filter from among multiple interpolation filters depending on the encoding mode of the block. For example, the encoding mode may include a skip mode, a merge mode, etc. for inter prediction. Further, the encoding mode may include a prediction mode (e.g. a DC mode, a planar mode, etc.) for intra prediction. In other words, depending on the encoding mode of the block, the interpolation filter selected from among multiple interpolation filters may differ. Here, depending on the encoding mode of the block, the filter taps and filter coefficients of the interpolation filters to be used may be selected in different forms.

The processing unit may select a specified interpolation filter from among multiple interpolation filters depending on the encoding/decoding scheme corresponding to at least one of overlapped block motion compensation, local illumination compensation, affine motion compensation, decoder-side motion vector derivation, and a bidirectional optical flow. In other words, depending on which one of the encoding/decoding schemes, such as overlapped block motion compensation, local illumination compensation, affine motion compensation, decoder-side motion vector derivation, and a bidirectional optical flow, is used, the interpolation filter selected from among multiple interpolation filters may differ. Here, depending on the encoding/decoding scheme of the block, the filter taps and filter coefficients of the interpolation filters to be used may be selected in different forms.

The processing unit may select a specified interpolation filter from among multiple interpolation filters using information about neighboring pixels of a block in a reference picture list or a reference image. Depending on the information about the neighboring pixels of the block in the reference picture list or the reference image, the interpolation filter selected from among multiple interpolation filters may differ. Here, depending on the information about the neighboring pixels of the block in the reference picture list or the reference image, the filter taps and filter coefficients of the interpolation filters to be used may be selected in different forms. For example, the processing unit may acquire the values of normalized correlations between the neighboring pixels, and may select the form of the interpolation filter depending on the values of the normalized correlations. The processing unit may set a threshold, and may select the form of the interpolation filter by comparing the values of the normalized correlations with the threshold.

The numbers indicated in the foregoing Equations and Tables may be merely exemplary. For example, the interpolation filter coefficients presented in the foregoing Tables may be merely exemplary.

Further, values such as the above-described interpolation filter coefficients may be calculated by an additional external device or scheme, and the encoding apparatus 1200 and the decoding apparatus 1300 may use only the results of calculation through schemes, for example, constants, variables, arrays or tables.

The numbers presented in the foregoing Equations and Tables may not only directly indicate values used by the encoding apparatus 1200 and the decoding apparatus 1300, but may also indicate relationships, ratios, magnitude order, and differences between these values. For example, the interpolation filter coefficients described in the foregoing Tables may indicate interpolation filter coefficients used by the encoding apparatus 1200 and the decoding apparatus 1300, and may indicate relationships, ratios, magnitude order, and differences between the interpolation filter coefficients used by the encoding apparatus 1200 and the decoding apparatus 1300.

For example, by means of values in a first row in Table 7, that is, (−1, 4, −11, 40, 40, −11, 4, −1), interpolation filter coefficient values (−1+a, 4+a, −11+a, 40+a, 40+a, −11+a, 4+a, −1+a), interpolation filter coefficient values (−1b, 4b, −11b, 40b, 40b, −11b, 4b, −1b), etc. may be regarded as also being described in the embodiments.

Further, when interpolation filter coefficients, used by the encoding apparatus 1200 and the decoding apparatus 1300, or specified interpolation filter coefficients correspond to values presented in the foregoing Tables, the interpolation filter coefficients, used by the encoding apparatus 1200 and the decoding apparatus 1300, or the specified interpolation filter coefficients may be regarded as also being described in Tables in the embodiments.

Furthermore, when interpolation filter coefficients, used by the encoding apparatus 1200 and the decoding apparatus 1300, or specified interpolation filter coefficients satisfy relationships defined in the foregoing Equations, the interpolation filter coefficients, used by the encoding apparatus 1200 and the decoding apparatus 1300, or the specified interpolation filter coefficients may be regarded as also being described by the Equations in the embodiments.

Furthermore, when interpolation filter coefficients, used by the encoding apparatus 1200 and the decoding apparatus 1300, or specified interpolation filter coefficients correspond to values indicated in the foregoing Tables, the interpolation filter coefficients, used by the encoding apparatus 1200 and the decoding apparatus 1300, or the specified interpolation filter coefficients may be regarded as also being described in Tables in the embodiments.

In addition, for the values indicated or derived through the foregoing Tables or Equations, the relationships between the values may be regarded as also being described in the embodiments.

For example, by means of the values (−1, 4, −11, 40, 40, −11, 4, −1) in the first row in Table 7, it may be described that the interpolation filter coefficients are left-right symmetrical, and that negative numbers and positive numbers are alternately repeated in the left half of the interpolation filter coefficients. Further, by means of these values, it may be described that, when the index is 0 or 1, the interpolation filter coefficient is the largest, and when the index is −1 or 2, the interpolation filter coefficient is the smallest.

Signaling Whether to Use Interpolation Filter

The filtering information, described above with reference to FIGS. 14 and 15, may include information about interpolation filter usage.

The interpolation filter usage information may indicate whether the encoding apparatus 1200 has used an interpolation filter. Alternatively, the interpolation filter usage information may indicate whether an interpolation filter is to be used for decoding.

Alternatively, the interpolation filter usage information may indicate which one of multiple interpolation filters has been used by the encoding apparatus 1200. Alternatively, the interpolation filter usage information may indicate which one of multiple interpolation filters is to be used for decoding.

The interpolation filter usage information may be a flag or an index. At step 1440, the interpolation filter usage information may be entropy-encoded, and at step 1450, a bitstream including the entropy-encoded interpolation filter usage information may be generated. At step 1520, the entropy-encoded interpolation filter usage information may be entropy-decoded. At step 1540, filtering may be performed by the interpolation filter indicated by the interpolation filter usage information, and at step 1550, processing that uses the results of filtering by the interpolation filter may be performed. Here, the processing may be 1) inter prediction or motion compensation or 2) intra prediction that uses sub-pixel reference samples.

The interpolation filter usage information may indicate which one of multiple homogeneous interpolation filters is used. Alternatively, the interpolation filter usage information may indicate which one of multiple available interpolation filters is used. For example, the interpolation filter usage information may indicate which one of multiple DCT-based interpolation filters is used and which one of multiple DST-based interpolation filters is used. Alternatively, the interpolation filter usage information may indicate, for example, one of a DCT-II-based interpolation filter and a DST-VII-based interpolation filter.

The interpolation filter usage information may indicate whether one or more specified interpolation filters, among multiple interpolation filters, are used.

The interpolation filter usage information may be used on a specified unit basis. For example, the interpolation filter usage information may be signaled by the encoding apparatus 1200 to the decoding apparatus 1300 on a sequence basis, a picture basis, a slice basis, a tile basis, a CTU basis, a CU basis, a PU basis, a TU basis, and/or a block basis. Further, the interpolation filter usage information may be entropy-encoded and entropy-decoded on the corresponding unit basis.

The interpolation filter usage information may be included in a parameter set in a bitstream. The interpolation filter usage information may be entropy-encoded and entropy-decoded as the parameter set.

The parameter set may be header information in the structure of the bitstream. The parameter set including the interpolation filter usage information may be at least one of a video parameter set, a sequence parameter set, a picture parameter set, and an adaptation parameter set. Also, the parameter set may mean a slice header and a tile header.

Whether a specified interpolation filter, among the multiple interpolation filters, is used may differ depending on the direction of the interpolation filter. The interpolation filter usage information may indicate whether an interpolation filter is used in a specified direction.

The interpolation filter usage information may indicate whether one or more specified interpolation filters, among the multiple interpolation filters, are used in a horizontal direction or a vertical direction. For example, the interpolation filter usage information may include a flag that indicates whether specified interpolation filters are used in a horizontal direction or a vertical direction.

The interpolation filter usage information may indicate an interpolation filter used in each of multiple directions. The processing unit may use different interpolation filters in multiple directions using the interpolation filter usage information. For example, a DCT-II-based interpolation filter may be used in a horizontal direction, and a DST-VII-based interpolation filter may be used in a vertical direction. For example, a DST-VII-based interpolation filter may be used in a horizontal direction, and a DCT-VII-based interpolation filter may be used in a vertical direction.

The interpolation filter indicated by the interpolation filter usage information in each direction may be a combination of multiple interpolation filters.

The interpolation filter usage information may indicate interpolation filters used in each of multiple directions. The interpolation filter usage information may include one or more indices. One or more indices may indicate which of multiple interpolation filters are used in multiple directions. Each of the one or more indices may indicate the interpolation filter used in a direction corresponding to the relevant index, among multiple interpolation filters.

Derivation of Interpolation Filter Usage Information

The interpolation filter usage information may be derived by the decoding apparatus 1300, as well as being signaled by the encoding apparatus 1200 to the decoding apparatus 1300.

The processing unit may derive interpolation filter usage information based on at least one of the coding parameters of a target block and coding parameters of neighboring blocks of the target block. Further, the processing unit may selectively use the derived interpolation filter usage information for motion compensation in inter prediction or for the generation of sub-pixel reference samples in intra prediction.

The coding parameters may include not only information (or a flag or an index), such as a syntax element, which is encoded by the encoding apparatus 1200 and is signaled by the encoding apparatus 1200 to the decoding apparatus 1300, but also information derived in an encoding or decoding process. Further, the coding parameters may include information required so as to encode or decode images. For example, the coding parameters may include at least one or combinations of the size of a unit/block, the depth of a unit/block, partition information of a unit/block, the partition structure of a unit/block, information indicating whether a unit/block is partitioned in a quad-tree structure, information indicating whether a unit/block is partitioned in a binary tree structure, the partitioning direction of a binary tree structure (horizontal direction or vertical direction), the partitioning form of a binary tree structure (symmetrical partitioning or asymmetrical partitioning), a prediction scheme (intra prediction or inter prediction), an intra-prediction mode/direction, a reference sample filtering method, a prediction block filtering method, a prediction block boundary filtering method, a filter tap for filtering, a filter coefficient for filtering, an inter-prediction mode, motion information, a motion vector, a reference picture index, an inter-prediction direction, an inter-prediction indicator, a reference picture list, a reference image, a motion vector predictor, a motion vector prediction candidate, a motion vector candidate list, information indicating whether a merge mode is used, a merge candidate, a merge candidate list, information indicating whether a skip mode is used, the type of an interpolation filter, the tap of an interpolation filter, the filter coefficient of an interpolation filter, the magnitude of a motion vector, accuracy of motion vector representation, a transform type, a transform size, information indicating whether a primary transform is used, information indicating whether an additional (secondary) transform is used, a primary transform index, a secondary transform index, information indicating the presence or absence of a residual signal, a coded block pattern, a coded block flag, a quantization parameter, a quantization matrix, information about an intra-loop filter, information indicating whether an intra-loop filter is applied, the coefficient of an intra-loop filter, the tap of an intra-loop filter, the shape/form of an intra-loop filter, information indicating whether a deblocking filter is applied, the coefficient of a deblocking filter, the tap of a deblocking filter, deblocking filter strength, the shape/form of a deblocking filter, information indicating whether an adaptive sample offset is applied, the value of an adaptive sample offset, the category of an adaptive sample offset, the type of an adaptive sample offset, information indicating whether an adaptive in-loop filter is applied, the coefficient of an adaptive in-loop filter, the tap of an adaptive in-loop filter, the shape/form of an adaptive in-loop filter, a binarization/inverse binarization method, a context model, a context model decision method, a context model update method, information indicating whether a regular mode is performed, information whether a bypass mode is performed, a context bin, a bypass bin, a transform coefficient, a transform coefficient level, a transform coefficient level scanning method, an image display/output order, slice identification information, a slice type, slice partition information, tile identification information, a tile type, tile partition information, a picture type, bit depth, information about a luma signal, and information about a chroma signal.

The interpolation filter usage information may include information indicating which one of multiple DCT-based interpolation filters is used, and may also include information indicating which one of multiple DST-based interpolation filters is used. For example, the interpolation filter usage information may indicate one of a DCT-II-based interpolation filter and a DST-VII-based interpolation filter.

The interpolation filter usage information may be derived on a specified unit basis. For example, the interpolation filter usage information may be derived on a sequence basis, a picture basis, a slice basis, a tile basis, a CTU basis, a CU basis, a PU basis, a TU basis, and/or a block basis. Alternatively, the interpolation filter usage information may be derived for each sequence, picture, slice, tile, CTU, CU, PU, TU and/or block.

As described above, whether a specified interpolation filter, among the multiple interpolation filters, is used may differ depending on the direction of the interpolation filter. The interpolation filter usage information may indicate whether an interpolation filter is used in a specified direction.

As the interpolation filter usage information, information indicating whether one or more specified interpolation filters, among the multiple interpolation filters, are used in a horizontal direction or a vertical direction may be derived. For example, as the interpolation filter usage information, a flag that indicates whether a specified interpolation filter is used in a horizontal direction or a vertical direction may be derived.

As the interpolation filter usage information, information indicating the interpolation filter used in each of multiple directions may be derived. The processing unit may use different derived interpolation filters in multiple directions. For example, by means of the derivation of the interpolation filter usage information or the derivation of interpolation filters, a DCT-II-based interpolation filter may be used in a horizontal direction and a DST-VII-based interpolation filter may be used in a vertical direction. For example, by means of the derivation of the interpolation filter usage information or the derivation of interpolation filters, a DST-VII-based interpolation filter may be used in a horizontal direction and a DCT-VII-based interpolation filter may be used in a vertical direction.

The interpolation filters derived in respective directions may be a combination of multiple interpolation filters.

As the interpolation filter usage information, interpolation filters used in each of multiple directions may be derived. The derived interpolation filter usage information may include one or more indices. The one or more indices may indicate which of multiple interpolation filters are used in multiple directions. Each of the one or more indices may indicate the interpolation filter used in the direction corresponding to the relevant index, among multiple interpolation filters.

In the case where multiple interpolation filters are used in the unit of a CTU, CU or PU block, if an integer sample motion vector or ½ sample motion vector is present in at least one of the block units, the integer sample motion vector may not use an interpolation filter, and the ½ sample motion vector may use only one interpolation filter and may not use the remaining interpolation filters, because the difference in performance may not be large when various interpolation filters are compared with each other.

Derivation of Interpolation Filter Usage Information Based on Correlation

Figure 20:
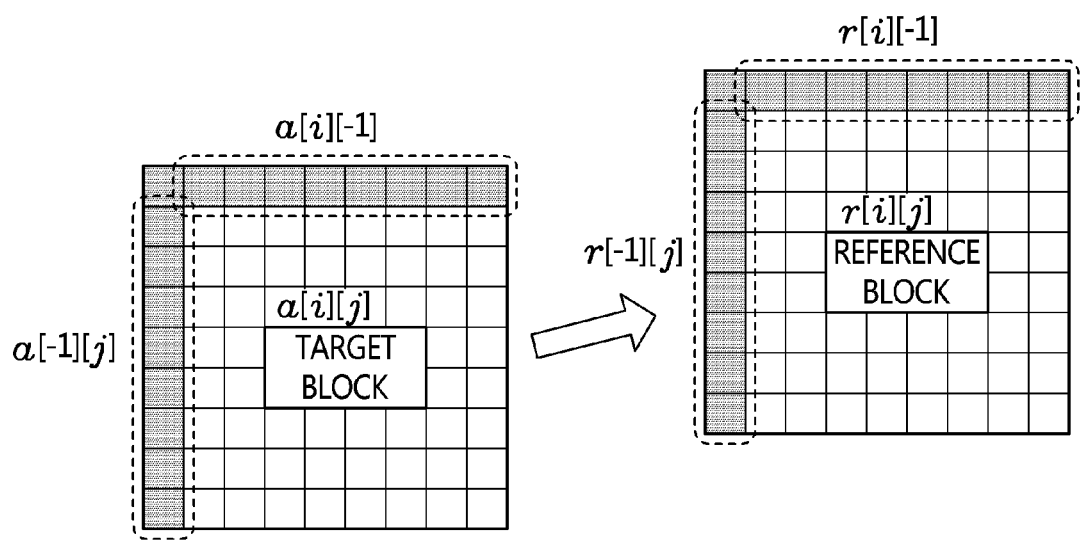
FIG. 20 illustrates a correlation between a target block and a reference block.

FIG. 20 illustrates a correlation between a target block and a reference block.

On the left side of FIG. 20, the target block is illustrated, and on the right side thereof, the reference block is illustrated.

In the encoding or decoding of the target block, the processing unit may calculate the value of a correlation between the target block and the reference block of the target block, and may select an interpolation filter based on the calculated correlation value.

The processing unit may calculate the correlation value using the pixel values of neighboring pixels adjacent to the current block and the pixel values of neighboring pixels adjacent to the reference block.

In FIG. 20, a scheme for calculating the value of a correlation between a target block and a reference block, each having an 8×8 size, is exemplified.

Although, in FIG. 20, the calculation of a normalized correlation between at least one of left pixels and above pixels of the target block and at least one of left pixels and above pixels of the reference block has been exemplified, a normalized correlation between at least one of the left pixels or the above pixels of the target block and at least one of the left pixels or the above pixels of the reference block may be calculated. The interpolation filter may be selected using the value of the normalized correlation between at least one of the left pixels or the above pixels of the target block and at least one of the left pixels or the above pixels of the reference block.

The processing unit may obtain the correlation value using the following Equation 49. The processing unit may acquire the normalized correlation value between the neighboring pixels of the target block and the neighboring pixels of the reference block based on the following Equation 49:

$$R(a, r) = \frac{\left\{\sum_{i=0}^{N}(a[i][-1] - \mu_a) + \sum_{j=0}^{M}(a[-1][j] - \mu_a)\right\} \times \left\{\sum_{i=0}^{N}(r[i][-1] - \mu_r) + \sum_{j=0}^{M}(r[-1][j] - \mu_r)\right\}}{\sigma_a \sigma_r}$$

[Equation 49]

a[−1][j] and a[i][−1] may be the pixels values of the neighboring pixels of the target block.

r[−1][j] and r[i][−1] may be the pixel values of the neighboring pixels of the reference block.

N may be the widths of the target block and the reference block. M may be the heights of the target block and the reference block. For example, according to Equation 20, the values of N and M may each be 8.

The following Equation 50 may indicate the average of the pixel values of the neighboring pixels of the target block.

$$\mu_a = \frac{\left(\sum_{i=0}^{N} a[i][-1] + \sum_{j=0}^{M} a[-1][j]\right)}{N+M}$$

[Equation 50]

The following Equation 51 may indicate the average of the pixel values of the neighboring pixels of the reference block.

$$\mu_r = \frac{\left(\sum_{i=0}^{N} r[i][-1] + \sum_{j=0}^{M} r[-1][j]\right)}{N+M}$$

[Equation 51]

The following Equation 52 may indicate the standard deviation of the target block.

$$\sigma_a = \sqrt{\left\{\frac{\left(\sum_{i=0}^{N}(a[i][-1] - \mu_a) + \sum_{j=0}^{M}(a[-1][j] - \mu_a)\right)^2}{N+M}\right\}}$$

[Equation 52]

The following Equation 53 may indicate the standard deviation of the reference block.

$$\sigma_r = \sqrt{\left\{\frac{\left(\sum_{i=0}^{N}(r[i][-1]-\mu_r) + \sum_{j=0}^{M}(r[-1][j]-\mu_r)\right)^2}{N+M}\right\}} \quad \text{[Equation 53]}$$

The range of normalized correlation values may be equal to or greater than −1 and less than or equal to 1.

The processing unit may designate a threshold for the normalized correlation values. The processing unit may select the form of the interpolation filter by comparing the normalized correlation values with the threshold. The form of the interpolation filter may include one or more of a filter tap and a filter coefficient.

For example, the processing unit may set the value of the threshold to 0.95. When the calculated normalized correlation value is equal to or greater than 0.95, which is the threshold, the processing unit may use a first interpolation filter, whereas when the calculated normalized correlation value is less than 0.95, which is the threshold, the processing unit may use a second interpolation filter.

Further, the processing unit may select the length of a tap and/or the type of filter by comparing the normalized correlation values with the threshold, and may select a combination of tap lengths and filter types.

The above embodiments may be performed using the same method, both in an encoder and in a decoder.

The order of application of the embodiments may differ in the encoder and decoder, or may be identical in the encoder and the decoder.

For each of a luma signal and a chroma signal, the embodiments may be performed, and for the luma signal and the chroma signal, the above embodiments may be equally performed.

The form of the block to which the embodiments of the present disclosure are applied may have a square shape or a non-square shape.

The embodiments of the present disclosure may be applied according to the size of at least one of a coding block, a prediction block, a transform block, a block, a current block, a coding unit, a prediction unit, a transform unit, a unit, and a current unit. Here, the size may be defined as a minimum size and/or a maximum size so that the embodiments are applied, and may be defined as a fixed size at which the embodiments are applied. Further, in the case of the embodiments, a first embodiment may be applied to a first size, and a second embodiment may be applied to a second size. That is, the embodiments may be compositely applied according to the size. Further, the embodiments of the present disclosure may be applied only to the case where the size is equal to or greater than the minimum size and is less than or equal to the maximum size. That is, the embodiments may be applied only to the case where a block size falls within a certain range.

In an example, the embodiments may be applied only to the case where the size of the current block is equal to or greater than 8×8. In an example, the embodiments may be applied only to the case where the size of the current block is equal to or greater than 4×4. In an example, the embodiments may be applied only to the case where the size of the current block is less than or equal to 16×16. In an example, the embodiments may be applied only to the case where the size of the current block is equal to or greater than 16×16 and is less than or equal to 64×64.

The embodiments of the present disclosure may be applied depending on a temporal layer. In order to identify the temporal layer to which the embodiments are applicable, a separate identifier may be signaled, and the embodiments may be applied to the temporal layer specified by the corresponding identifier. Here, the identifier may be defined as the lowermost layer and/or the uppermost layer to which the embodiments are applicable, and may be defined as indicating the specific layer to which the embodiments are applied. Further, a fixed temporal layer to which the embodiments are applied may also be defined.

For example, the embodiments may be applied only to the case where the temporal layer of a current image is the lowermost layer. For example, the embodiments may be applied only to the case where the temporal layer identifier of the current image is equal to or greater than 1. For example, the embodiments may be applied only to the case where the temporal layer of the current image is the uppermost layer.

Slice types to which the embodiments of the present disclosure are applied may be defined, and the embodiments of the present disclosure may be applied depending on the corresponding slice types.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present embodiments is not limited to the above-described embodiments, and the accompanying claims and equivalents and modifications thereof fall within the scope of the present disclosure.

The invention claimed is:

1. A video decoding method, comprising:
determining whether to apply a filtering for a prediction block generated by an inter prediction for a target block;
selecting a filter for the prediction block generated by the inter prediction among a plurality of interpolation filters in a case that it is determined to apply the filtering for the inter prediction; and
generating the prediction block using the filter by performing the inter prediction for the target block in a case that it is determined to apply the filtering for the prediction block, wherein:
one of the plurality of the interpolation filters for the inter prediction is selected as the filter based on a size of the target block and based on whether a merge mode is used for the inter prediction for the target block or not,
the filter comprises a horizontal filter and a vertical filter for the inter prediction,
each of the horizontal filter and the vertical filter for the inter prediction is determined based on the size of the target block and whether the merge mode is used for the inter prediction for the target block or not,
a filter tap and filter coefficients of the horizontal filter for the inter prediction is determined based on a plurality of interpolation filters comprising an 8-tap filter based on the size of the target block, and
a filter tap and filter coefficients of the vertical filter for the inter prediction is determined based on a plurality of interpolation filters comprising an 8-tap filter based on the size of the target block.

2. The video decoding method of claim 1, wherein the filter is used for an interpolation for a 1/16 sub-reference sample for the target block, and
the 1/16 sub-reference sample is generated by the filter applied to one or more integer-reference samples.

3. The video decoding method of claim 1, wherein filter taps and filter coefficients of the plurality of the interpolation filters are different, and
wherein a filter tap and filter coefficients used for the filtering are determined based on the size of the target block.

4. The video decoding method of claim 1, wherein whether the horizontal filter is an 8-tap filter or not and whether the vertical filter is an 8-tap filter or not are determined based on the size of the target block.

5. The video decoding method of claim 1, wherein the horizontal filter and the vertical filter are determined based on whether the size of the target block is 4×4 or not.

6. The video decoding method of claim 1, wherein all pixels in the target block are generated based on both of the horizontal filter and the vertical filter.

7. A video encoding method, comprising:
determining whether to apply a filtering for a prediction block generated by an inter prediction for a target block;
selecting a filter for the prediction block generated by the inter prediction among a plurality of interpolation filters in a case that it is determined to apply the filtering for the inter prediction; and
generating the prediction block using the filter by performing the inter prediction for the target block in a case that it is determined to apply the filtering for the prediction block, wherein:
one of the plurality of the interpolation filters for the inter prediction is selected as the filter based on a size of the target block and based on whether a merge mode is used for the inter prediction for the target block or not,
the filter comprises a horizontal filter and a vertical filter for the inter prediction,
each of the horizontal filter and the vertical filter for the inter prediction is determined based on the size of the target block and whether the merge mode is used for the inter prediction for the target block or not,
a filter tap and filter coefficients of the horizontal filter for the inter prediction is determined based on a plurality of interpolation filters comprising an 8-tap filter based on the size of the target block, and
a filter tap and filter coefficients of the vertical filter for the inter prediction is determined based on a plurality of interpolation filters comprising an 8-tap filter based on the size of the target block.

8. The video encoding method of claim 7, wherein the selected filter is used for an interpolation for a 1/16 sub-reference sample for the target block, and
the 1/16 sub-reference sample is generated by the filter applied to one or more integer-reference samples.

9. The video encoding method of claim 7, wherein filter taps and filter coefficients of the plurality of the interpolation filters are different, and
wherein a filter tap and filter coefficients used for the filtering are determined based on the size of the target block.

10. The video encoding method of claim 7, wherein whether the horizontal filter is an 8-tap filter or not and whether the vertical filter is an 8-tap filter or not are determined based on the size of the target block.

11. The video encoding method of claim 7, wherein the horizontal filter and the vertical filter are determined based on whether the size of the target block is 4×4 or not.

12. The video encoding method of claim 7, wherein all pixels in the target block are generated based on both of the horizontal filter and the vertical filter.

13. A non-transitory computer-readable medium storing a bitstream generated by the video encoding method of claim 7.

14. A non-transitory computer-readable medium storing a bitstream, the bitstream comprising:
encoded information for a target block;
wherein:
decoding for the target block is performed using the encoded information,
whether to apply a filtering using a filter for a prediction block generated by an inter prediction for the target block is determined,
a filter for the prediction block generated by the inter prediction is selected among a plurality of interpolation filters for the inter prediction in a case that it is determined to apply the filtering for the inter prediction, and
the prediction block using the filter is generated by performing the inter prediction for the target block using the filter in a case that it is determined to apply the filtering for the prediction block,
one of the plurality of the interpolation filters is selected as the filter based on a size of the target block and based on whether a merge mode is used for the inter prediction for the target block or not, the filter comprises a horizontal filter and a vertical filter for the inter prediction, each of the horizontal filter and the vertical filter for the inter prediction is determined based on the size of the target block and whether the merge mode is used for the inter prediction for the target block or not, a filter tap and filter coefficients of the horizontal filter for the inter prediction is determined based on a plurality of interpolation filters comprising an 8-tap filter based on the size of the target block, and a filter tap and filter coefficients of the vertical filter for the inter prediction is determined based on a plurality of interpolation filters comprising an 8-tap filter based on the size of the target block.

15. The non-transitory computer-readable medium of claim 14, wherein the filter is used for an interpolation for a 1/16 sub-reference sample for the target block, and the 1/16 sub-reference sample is generated by the filter applied to one or more integer-reference samples.

16. The non-transitory computer-readable medium of claim 14, wherein filter taps and filter coefficients of the plurality of the interpolation filters are different, and a filter tap and filter coefficients used for the filtering are determined based on the size of the target block.

17. The non-transitory computer-readable medium of claim 14, wherein the filter is determined based on information about an affine motion compensation for the inter prediction.

18. The non-transitory computer-readable medium of claim 14, wherein whether the horizontal filter is an 8-tap filter or not and whether the vertical filter is an 8-tap filter or not are determined based on the size of the target block.

19. The non-transitory computer-readable medium of claim 14, wherein the horizontal filter and the vertical filter are determined based on whether the size of the target block is 4×4 or not.

20. The non-transitory computer-readable medium of claim 14, wherein all pixels in the target block are generated based on both of the horizontal filter and the vertical filter.

* * * * *